(12) United States Patent
Takakuwa et al.

(10) Patent No.: US 8,023,797 B2
(45) Date of Patent: *Sep. 20, 2011

(54) INFORMATION RECORD MEDIUM, INFORMATION RECORD APPARATUS AND METHOD, INFORMATION REPRODUCTION APPARATUS AND METHOD, INFORMATION RECORD REPRODUCTION APPARATUS AND METHOD, COMPUTER PROGRAM FOR RECORD OR REPRODUCTION CONTROL, AND DATA STRUCTURE CONTAINING CONTROL SIGNAL

(75) Inventors: Nobuyuki Takakuwa, Saitama (JP); Yasuko Fukuda, Saitama (JP); Takao Sawabe, Saitama (JP); Tohru Kanegae, Saitama (JP); Masanori Nakahara, Saitama (JP); Takeshi Koda, Saitama (JP); Akira Imamura, Saitama (JP)

(73) Assignee: Pioneer Corporation, Tokyo (JP)

( * ) Notice: Subject to any disclaimer, the term of this patent is extended or adjusted under 35 U.S.C. 154(b) by 1332 days.

This patent is subject to a terminal disclaimer.

(21) Appl. No.: 11/147,242

(22) Filed: Jun. 8, 2005

(65) Prior Publication Data

US 2005/0286866 A1 Dec. 29, 2005

Related U.S. Application Data

(62) Division of application No. 10/530,031, filed as application No. PCT/JP03/12578 on Oct. 1, 2003.

(30) Foreign Application Priority Data

Oct. 1, 2002 (JP) .................................. 2002-288252

(51) Int. Cl.
*H04N 9/80* (2006.01)
*H04N 5/77* (2006.01)
*H04N 5/89* (2006.01)
*H04N 5/76* (2006.01)

(52) U.S. Cl. ........ 386/248; 386/225; 386/332; 386/333; 386/334; 386/341

(58) Field of Classification Search .................... 386/95, 386/125, 248, 225, 332, 333, 334, 341
See application file for complete search history.

(56) References Cited

U.S. PATENT DOCUMENTS 5,729,516 A * 3/1998 Tozaki et al. .............. 369/53.21
(Continued)

FOREIGN PATENT DOCUMENTS

EP 1 041 556 10/2000
(Continued)

OTHER PUBLICATIONS

Taylor, "Application Details: DVD-Video andDVD-Audio," 2001, pp. 309-311, McGraw-Hill, New York.

*Primary Examiner* — Helen Shibru
(74) *Attorney, Agent, or Firm* — Young & Thompson

(57) ABSTRACT

A series of content information; menu information, which is to be displayed with the content information during reproduction of the content information; and play list information for defining reproduction sequence of the content information by a unit of item, which constitutes the content information and which is accessible upon reproducing, are recorded on the information record medium. The play list information includes: item information for specifying each item which constitutes the content information; and slave item information for specifying the menu information corresponding to the each item as a slave item.

7 Claims, 39 Drawing Sheets

U.S. PATENT DOCUMENTS

| | | | |
|---|---|---|---|
| 6,147,714 A * | 11/2000 | Terasawa et al. | 348/564 |
| 6,157,673 A * | 12/2000 | Cuccia | 375/240 |
| 6,389,221 B1 * | 5/2002 | Saeki et al. | 386/243 |
| 6,453,110 B1 * | 9/2002 | Kawamura et al. | 386/46 |
| 6,654,031 B1 * | 11/2003 | Ito et al. | 715/723 |
| 6,778,759 B1 * | 8/2004 | Yamada et al. | 386/244 |
| 6,952,521 B2 * | 10/2005 | Kelly et al. | 386/52 |
| 2001/0026561 A1 * | 10/2001 | Morris et al. | 370/487 |
| 2001/0043621 A1 * | 11/2001 | Anderson et al. | 370/516 |
| 2002/0127003 A1 * | 9/2002 | Mori et al. | 386/126 |
| 2003/0194213 A1 * | 10/2003 | Schultz et al. | 386/95 |
| 2005/0031311 A1 * | 2/2005 | Bak et al. | 386/95 |
| 2006/0114800 A1 * | 6/2006 | Takakuwa et al. | 369/275.1 |
| 2007/0286577 A1 * | 12/2007 | Kato et al. | 386/95 |

FOREIGN PATENT DOCUMENTS

| | | |
|---|---|---|
| EP | 1 134 986 | 9/2001 |
| JP | 6-189242 | 7/1994 |
| JP | 7-162817 | 6/1995 |
| JP | 2002 152641 | 5/2002 |
| JP | 2003-044507 | 2/2003 |
| WO | 95/12197 | 3/1995 |

* cited by examiner

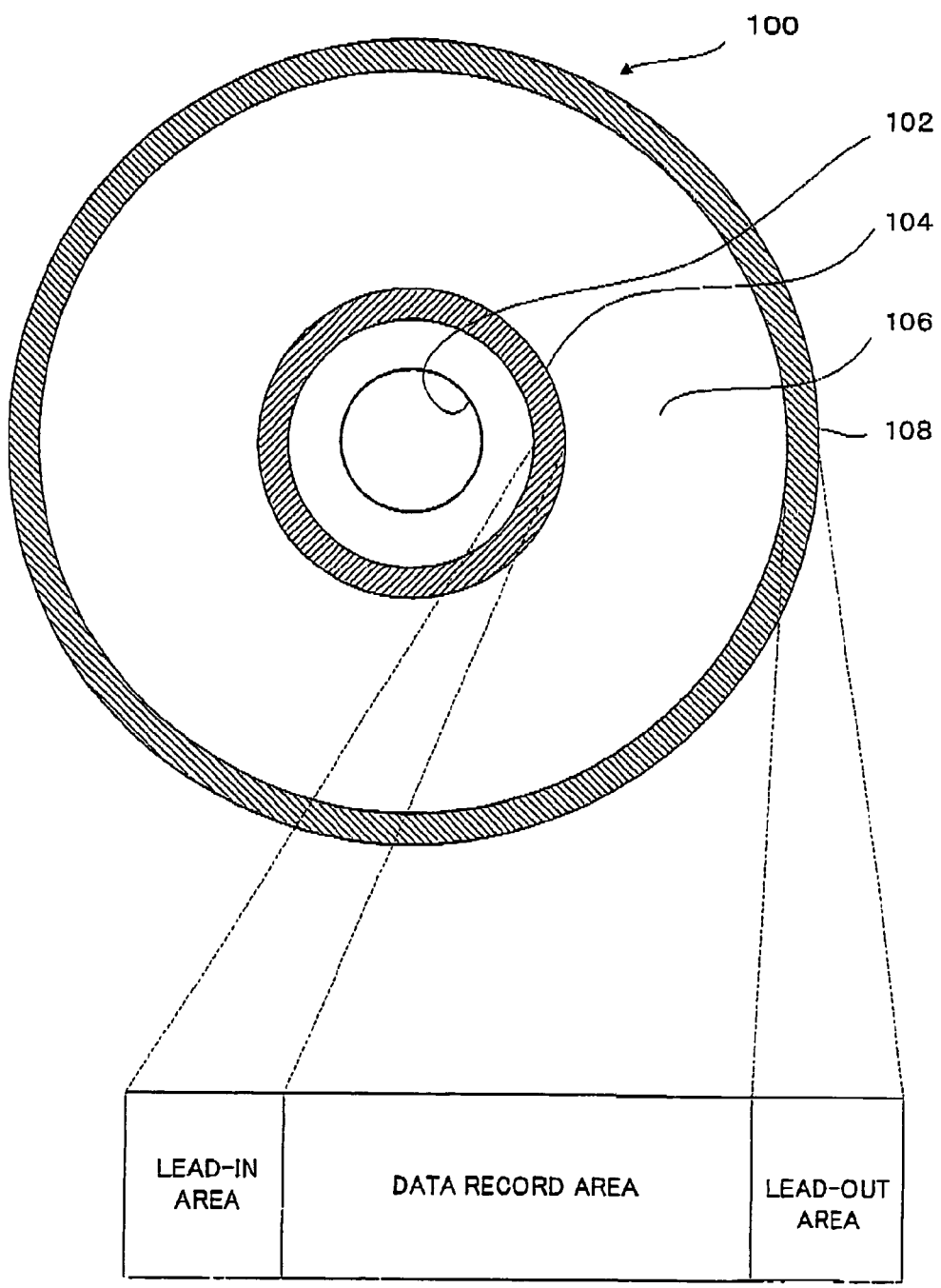

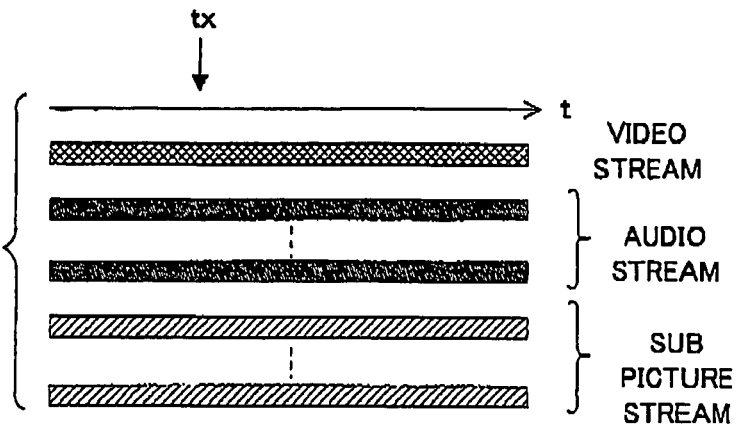
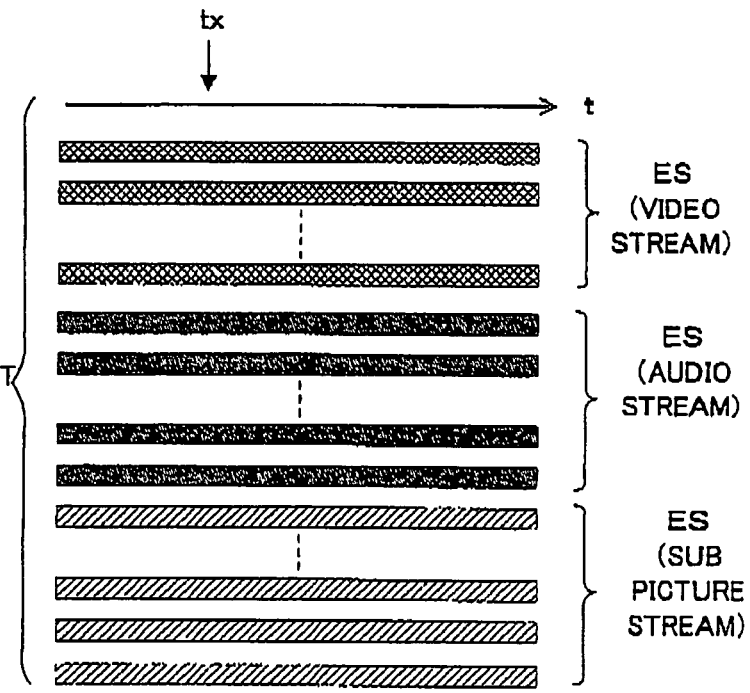
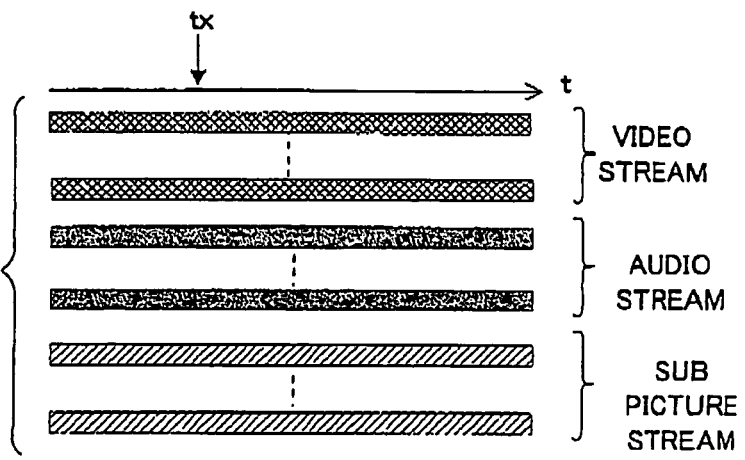

FIG. 20(a)

721 : SP CONTROL STRUCTURE

| SCP HEADER | SP DATA IDENTIFIER |
| --- | --- |
| | POSITION INFO. of SP DATA |
| | OTHER INFO. |
| SP CONTROL PARAMETER | DISPLAY START TIME POINT of SP DATA |
| | DISPLAY END TIME POINT of SP DATA |
| | OTHER INFO. |

FIG. 20(b)

722 : SP DATA STRUCTURE

| STRUCTURE INFO. | SP DATA IDENTIFIER |
| --- | --- |
| | LENGTH of SP DATA |
| | OTHER INFO. |
| SP DATA | IMAGE DATA (Bitmap, JPEG, etc.) |
| | OTHER INFO. |

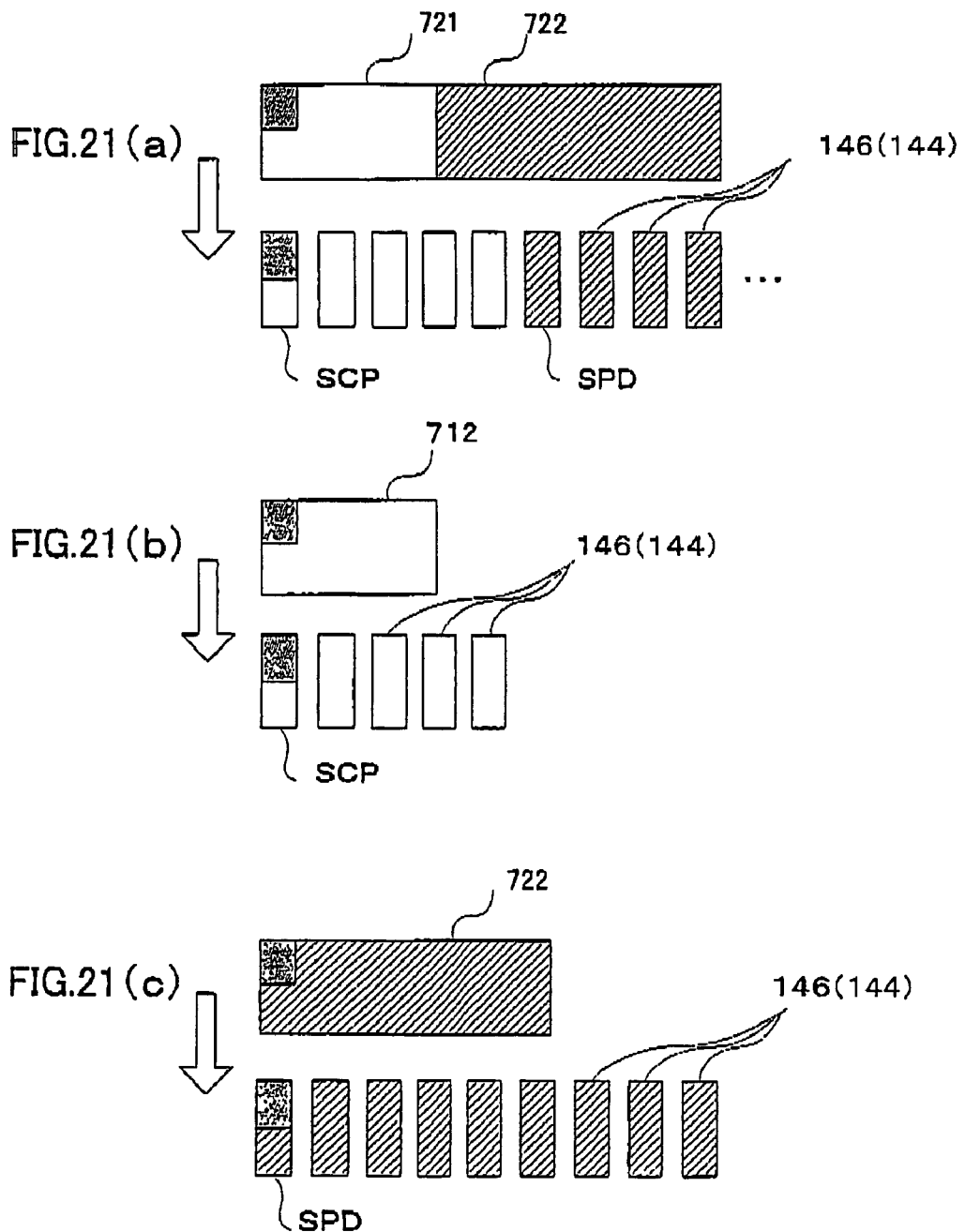

FIG. 23

| Comprehensive Info. | | the Number of Sub Frame Info. = n, etc. | |
|---|---|---|---|
| Sub Frame Information Table | Sub Frame #1 | Coordinates Info. of Sub Frame #1 | |
| | | the Number of Buttons = l | |
| | | Button Info. #1~#l | Coordinates Info. |
| | | | Button Command |
| | . . . | . . . | |
| | Sub Frame #n | Coordinates Info. of Sub Frame #n | |
| | | the Number of Buttons = m | |
| | | Button Info. #1~#m | Coordinates Info. |
| | | | Button Command |
| | Other Info. | | |
| SP Data | Image Data (Bitmap, JPEG, etc.) | | |
| | Other Info. | | |

FIG. 26

| Field Name | | | Described Contents |
|---|---|---|---|
| Play List Comprehensive Information | | | P List Size, the Total P List Number, Other Info. |
| Play List Pointer Table | Play List #1 Pointer | | Storage Address of P List #1 Info. |
| Play List #1 Info. Table | Play List #1 Comprehensive Information | | the Constitutional Item Total Number = 3, Default Dokodemo slave item info.=1, Other info. |
| | P List #1 Item Info. table | Item #1 Info. | Relevant AU No. in AU table in Object Info. File, Slave item Info.=none, Start Time Point, Display time length, Display coordinates Info., etc. |
| | | Item #2 Info. | Relevant AU No. in AU table in Object Info. File, Slave item Info.=3, Type of Slave Item Info.= Dokodemo Menu, Start Time Point, Display time length, Display coordinates Info., etc. |
| | | Item #3 Info. | Relevant AU No. in AU table in Object Info. File, Slave item Info.=2, Type of Slave Item Info.= Dokodemo Menu, Start Time Point, Display time length, Display coordinates Info., etc. |
| | P List #1 Slave Item Info. table | Slave Item #1 Info. | Type of Slave Item Info.= Dokodemo Menu, Relevant AU No. in AU table in Object Info. File, etc. |
| | | Slave Item #2 Info. | Type of Slave Item Info.= Dokodemo Menu, Relevant AU No. in AU table in Object Info. File, etc. |
| | | Slave Item #3 Info. | Type of Slave Item Info.= Dokodemo Menu, Relevant AU No. in AU table in Object Info. File, etc. |

FIG. 37

Object Information Table 131

AU Table

| Field Name | | | | Contents |
|---|---|---|---|---|
| AU Table Comprehensive Information | | | | the Number of AUs, Pointer to Each AU, etc. |
| AU#1 | PU#1 | ES_Table Index#1 | | Index Number of ES_map table=1 |
| | | ES_Table Index#2 | | 3 |
| 132I | PU#2 | ES_Table Index#1 | | 4 |
| | | ES_Table Index#2 | | 5 |
| AU#2 | PU#1 | ES_Table Index#1 | | 9 |
| | | ES_Table Index#2 | | 10 |
| | PU#2 | ES_Table Index#1 | | 12 |
| | | ES_Table Index#2 | | 13 |
| AU#3 | PU#1 | ES_Table Index#1 | | 14 |
| | | ES_Table Index#2 | | 15 |
| 302I | | ES_Table Index#3 | | 16 |
| | | ES_Table Index#4 | | 17 |
| | | ES_Table Index#5 | | 18 |
| Other Info. | | | | Position of ES_Map table, etc. |

134

ES_Map Table

| Field Name | Contents |
|---|---|
| ES_Map Table Comprehensive Information | Index Number, etc. |
| Index #1 | ES_PID Value=101 |
| | Address Information |
| Index #2 | ES_PID=102 |
| | Address Information |
| Index #3 | ES_PID=103 |
| | Address Information |
| Index #4 | ES_PID=201 |
| | Address Information |
| Index #5 | ES_PID=202 |
| | Address Information |
| Index #6 | ES_PID=301 |
| | Address Information |
| Index #7 | ES_PID=302 |
| | Address Information |
| Index #8 | ES_PID=303 |
| | Address Information |
| Index #9 | ES_PID=201 |
| | Address Information |
| Index #10 | ES_PID=202 |
| | Address Information |
| Index #11 | ES_PID=203 |
| | Address Information |
| Index #12 | ES_PID=101 |
| | Address Information |
| Index #13 | ES_PID=102 |
| | Address Information |
| Index #14 | ES_PID=101 |
| | Address Information |
| Index #15 | ES_PID=102 |
| | Address Information |
| Index #16 | ES_PID=103 (134d) |
| | Address Information |
| Index #17 | ES_PID=104 |
| | Address Information |
| | 134e — Index Number of ES_map table of SP Data Stream operated =16 |
| Index #18 | ES_PID=105 — 134d |
| | Address Information |
| | Index Number of ES_map table of SP Data Stream operated =16 |
| Other Info. | Other Info. |

FIG. 38

OBJECT INFORMATION table 131

AU Table

| Field Name | | | | | Contents |
|---|---|---|---|---|---|
| Object Comprehensive Info. 1321 | | | | | the Number of objects, Type of each object, Pointer to each object, etc. |
| Object #1 | AU Table | AU table Comprehensive Info | | | the Number of AU, Pointer to each AU, etc. |
| | | AU #1 | PU #1 | ES_Table Index #1 | Index Number of ES_map table = 1 |
| | | | | ES_Table Index #2 | 2 |
| | | | PU #2 | ES_Table Index #1 | 3 |
| | | | | ES_Table Index #2 | 4 |
| | | AU #2 3021 | PU #1 | ES_Table Index #1 | 5 |
| | | | | ES_Table Index #2 | 6 |
| | | | PU #2 | ES_Table Index #1 | 7 |
| | | | | ES_Table Index #2 | 8 |
| | Other Info. | | | | Position of ES_Map table #1, etc. |
| Object #2 | AU Table | AU table Comprehensive Info. | | | the Number of AU, Pointer to each AU, etc. |
| | | AU #1 | PU #1 | ES_Table Index #1 | 1 |
| | | | | ES_Table Index #2 | 2 |
| | | | | ES_Table Index #3 | 3 |
| | Other Info. | | | | Position of ES_Map table #2, etc. |
| Other Info. | | | | | |

ES_Map Table #1  134

| Field Name | | Contents |
|---|---|---|
| ES_Map Table #1 | ES_map table Comprehensive Info. | the Number of Index, etc. |
| | Index #1 | ES_PID Value = 101 |
| | | Address Information |
| | Index #2 | ES_PID = 102 |
| | | Address Information |
| | Index #3 | ES_PID = 103 |
| | | Address Information |
| | Index #4 | ES_PID = 201 |
| | | Address Information |
| | Index #5 | ES_PID = 202 |
| | | Address Information |
| | Index #6 | ES_PID = 301 |
| | | Address Information |
| | Index #7 | ES_PID = 302 |
| | | Address Information |
| | Index #8 | ES_PID = 303 |
| | | Address Information |
| | Other Info. | |

ES_Map Table #2  134

| Field Name | | Content |
|---|---|---|
| ES_Map Table #3 | ES_map table Comprehensive Info. | the Number of Index, etc. |
| | Index #1 | Address Information, Data Length, Data Format, etc. |
| | Index #2 | Address Information, Data Length, Data Format, etc. |
| | Index #3 | Address Information, Data Length, Data Format, etc. |
| | Other Info. | Other Info. |

US 8,023,797 B2

INFORMATION RECORD MEDIUM, INFORMATION RECORD APPARATUS AND METHOD, INFORMATION REPRODUCTION APPARATUS AND METHOD, INFORMATION RECORD REPRODUCTION APPARATUS AND METHOD, COMPUTER PROGRAM FOR RECORD OR REPRODUCTION CONTROL, AND DATA STRUCTURE CONTAINING CONTROL SIGNAL

This application is a division of U.S. application Ser. No. 10/530,031, which was filed on Apr. 1, 2005 as the 35 USC 371 national stage of international application PCT/JP2003/012578 filed on Oct. 1, 2003.

TECHNICAL FIELD

The present invention relates to: an information record medium, such as a high density optical disc, capable of recording thereon various information such as main picture information or video information, audio information, sub-picture information, reproduction control information, and so on, at high density; an apparatus for and a method of recording the information onto the information record medium; an apparatus for and a method of reproducing the information from the information record medium; an apparatus and a method capable of both recording and reproducing the information; a computer program for controlling the recording or reproduction; and a data structure including a control signal for controlling the reproduction.

BACKGROUND ART

According to a DVD in a so-called "DVD video standard", a plurality of title domains (TT_DOM), provided with a series of content information, and a title set menu domain (VTSM_DOM), controlling a menu of the plurality of title domains, are recorded in a Video Title Set space (VTS_Space). Here, the "series of content information" indicates the video information, the audio information, the sub picture information, and the like, which constitute one title, such as one show and one movie, for example. It is recorded in the VTS space as the title domain. Moreover, the menu in the title domain is to select or set whether the subtitle of a show, constituting one title, is English or Japanese, for example, or to select or set an angle if the angle can be reproduced, and the like. It is recorded in the VTS space as a menu domain corresponding to each title. In short, a title menu domain is to individually set in what condition each title will be reproduced, or is being reproduced. Moreover, the "space" is a unit of record information in a record area, which corresponds to a treatment unit in a reproduction operation with a player.

A disc menu about a plurality of VTS spaces or the entire disc is recorded in a Video ManaGer space (VMG_Space), recorded in a different area from the VTS space in the record area on the disc, as a VMG menu domain (VMGM_DOM). Here, the "disc menu" is to select or set whether the audio on the entire disc is Japanese or English, for example, or to select or set a title menu in the disc, and the like. It is recorded in the VMG space, as the VMG menu domain which is a common menu domain in the entire disc. In short, the VMG menu domain is to integrally or collectively set in what condition every title will be reproduced, or is being reproduced.

Moreover, the VTS space and the VGM space being "recorded in different areas", means that the VTS and VGM spaces are recorded in the record area such that the domain recorded in the VTS space and the domain recorded in the VMG space cannot be changed and reproduced, at the same time or immediately, or such that the domains cannot be reproduced in parallel.

DISCLOSURE OF INVENTION

However, in the reproduction of the DVD constructed in this manner with a player, if a menu display operation is performed, for example, during the reproduction of the title, the player firstly stops the title reproduction. Then, it displays a menu screen having a blue background, which is unrelated to the title reproduction, and induces a menu selection or specification by a user. This eventually discourages the user's interest in contents. On the contrary, an attempt to display the menu screen in some format, with the title reproduction continued, causes a necessity to perform a reproduction transition between the title domain and the menu domain, to thereby complicate a reading operation on the player. Then, in fact, it is basically difficult to immediately perform the reproduction transition or a changing operation, so that after all, there is such a problem information as for the content information are recorded thereon. The menu information is information to be displayed with the content information during the reproduction of the content information. Moreover, the play list information, which defines the reproduction sequence of the content information by the unit of item, is recorded. This play list information includes the item information and the slave item information. The slave item information means information associated with one of the item information. Particularly, the item information specifies each item which constitutes the content information. The slave item information specifies the menu information corresponding to the each item as the slave item.

Therefore, at the reproduction of the information record medium, it is possible to reproduce the content information, such as the video information and the audio information, by reproducing a content information part specified by the item information in order, in accordance with the item information owned by the play list information. In parallel with the reproduction of the content information, by reproducing a menu information part specified by the slave item information in order, in accordance with the slave item information owned by the play list information, it is possible to reproduce the menu information. Such parallel reproductions of the content information and the menu information can be performed, technically with little problem, if a reproduction rate is reduced moderately on an information reproduction apparatus.

Here, it is assumed, for example, that a user who is watching that it is technically difficult to display the menu screen with the title reproduction continued.

The present invention has been accomplished in view of the above problems for example. It is therefore an object of the present invention to provide an information record medium, an information record apparatus and method, an information reproduction apparatus and method, an information record reproduction apparatus and method, a computer program for a record or reproduction control, and a data structure including a control signal for controlling the reproduction, which enable the display of a menu screen, such as small window display, semitransparent superimpose display or the like, with the title reproduction continued, during the title reproduction.

An information record medium of the present invention is provided with: a series of content information; menu information as for the content information, which is to be displayed with the content information during reproduction of the content information; and play list information for defining reproduction sequence of the content information by a unit of item, which constitutes the content information and which is accessible upon reproducing, the play list information including: item information for specifying each item which constitutes the content information; and slave item information for specifying the menu information corresponding to said each item as a slave item According to the information record medium of the present invention, the series of content information and the menu the content information desires the display of a proper menu screen to perform a desired operation, such as changing audio language, changing subtitle language, angle change, and a reproduction transition to another title. In this case, it is possible to immediately or instantly display the menu information that has been being reproduced by using the slave item information but has never been being displayed, selectively by the external specification, such as a remote operation and a panel operation, on the content information which is being reproduced and displayed by using the item information. On the contrary, for example, if a user who is watching the content information does not desire the display of the menu screen, it is possible not to display the menu information that is being reproduced by using the slave item information, on the content information which is being reproduced and displayed by using the item information. Namely, in the latter case, even if the menu information exists correspondingly to the content information, the menu information is continuously reproduced in a non-display condition and is in a condition that the menu information can be immediately displayed anytime by a user's desire. Then, as in the former case, the menu information that is in such a readily displayable condition is actually displayed and outputted as the menu screen.

As a result, it is possible to display the menu screen, such as small window display and semitransparent superimpose display, with the title reproduction continued, during the title reproduction.

In one aspect of the information record medium of the present invention, the menu information specified by the slave item information is further recorded in the play list information, as common information commonly used by a plurality of slave items.

According to this aspect, a predetermined operation can be performed on the information reproduction apparatus, without reducing the reproduction rate of each item information which uses the common menu information, by reading and maintaining the common menu information before the reproduction of the play list.

In another aspect of the information record medium of the present invention, it is further recorded on the information record medium, reproduction control information for controlling such that the menu information specified by the slave item information is displayed with being superimposed on or in place of one portion of the content information corresponding to the menu information specified by the slave item information or is not displayed at all, selectively in accordance with external specification, in reproducing.

According to this aspect, performing the control based on the reproduction control information stored in a navigation packet or the like, for example, the information reproduction apparatus displays the menu information specified by the slave item information as the menu screen by superimposing the menu information onto one portion of the corresponding content information corresponding to the reproduced menu information, or replacing the one portion with the menu information, selectively in accordance with the external specification. Alternatively, it does not display the menu information at all selectively in accordance with the external specification. Particularly, in displaying the menu screen, the proper menu screen corresponding to the content information can be immediately displayed, on the basis of the menu information, which is being reproduced in parallel with the reproduction of the content information before being displayed and is in a readily displayable condition.

In another aspect of the information record medium of the present invention, the slave item information further specifies a reproduction time point of the menu information, with a reproduction time point of the content information as a standard. According to this aspect, on the basis of the reproduction time point of the menu information, which is specified by the slave item information with the reproduction time point of the menu information as a standard, the information reproduction apparatus can display the menu information as the menu screen, as occasion demands. Thus, even if the menu information in a non-display condition is displayed as the menu screen any time in accordance with a remote control operation and the like, for example, it is possible to display the menu screen properly corresponding to the content information which is being reproduced, regardless of the timing of the display start.

In another aspect of the information record medium of the present invention, the slave item information further specifies a display position and a size of a small window, in displaying the menu information as the small window on a display of the content information.

According to this aspect, in accordance with the display position and the size of the small window specified by the slave item information, the information reproduction apparatus can display the menu information as the small window on the display of the content information. Namely, by adjusting or changing the display position and the size of the small window which is described into the slave item information, it is possible to display the menu screen in the small window with a desired size at a desired display position.

In another aspect of the information record medium of the present invention, the menu information is recorded together with the content information, in a content space in which the content information is recorded and which occupies one area of a record area.

According to this aspect, the content information and the menu information are recorded in the same content space, so that the parallel or concurrent reproduction of the both is relatively easy. For example, the parallel reproduction of the both is performed by using the same system parameter or parameters. Then, normally, the content information among them is always reproduced, displayed and outputted, while the menu information is, if present, always reproduced and selectively displayed and outputted.

Incidentally, another menu information, such as the disc menu and the title menu, about the content information may be recorded in a system space occupying a different area from the content space in the record area.

In another aspect of the information record medium of the present invention, the content information and the menu information are multiplexed and recorded by a unit of packet, which is a physically accessible unit and which stores a piece of the menu information and the content information respectively.

According to this aspect, the content information and the menu information are multiplexed and recorded by the unit of packet in the content space. The reproduction in the content space is performed by reproducing the content information and the menu information of such a packet unit through reproduction processes, such as demultiplexing and decoding. Normally, the packet associated with the content information among them is always reproduced, displayed and outputted, and the packet associated with the menu information is, if present, always reproduced and selectively displayed and outputted.

In another aspect of the information record medium of the present invention, the menu information is recorded by a predetermined packet unit, as another object different from an object constructed by the content information.

According to this aspect, in the reproduction in the content space, the corresponding menu information is read, and maintained in the reproduction apparatus before the reproduction of the item information. The menu information is selectively displayed and outputted in accordance with the specification.

An information record apparatus of the present invention is provided with: a first record device for recording a series of content information and menu information as for the content information, which is to be displayed with the content information during reproduction of the content information; and a second record device for recording play list information for defining reproduction sequence of the content information by a unit of item, which constitutes the content information and which is accessible upon reproducing, the second record device recording the play list information such that the play list information includes: item information for specifying each item which constitutes the content information; and slave item information for specifying the menu information corresponding to said each item as a slave item.

According to the information record apparatus of the present invention, the first record device, such as a controller, an encoder, a TS object generator mentioned later, an optical pickup, a cutting device or the like, records the series of content information and the menu information as for the content information, into the recording area of the information record medium, such as a DVD. For example, the second record device, such as a controller, an encoder, a TS object generator mentioned later, an optical pickup, a cutting device or the like, records the play list information which defines the reproduction sequence of the content information by the unit of item. Particularly, the second record device records the play list information such that the play list information includes: the item information and the slave item information.

Therefore, the information record medium of the invention mentioned above (including various aspects thereof) can be recorded relatively efficiently.

Incidentally, the information record apparatus according to the present invention may also take various aspects, corresponding to various aspects of the information record medium according to the present invention as mentioned above.

An information record method of the present invention is provided with: a first record process of recording a series of content information and menu information as for the content information, which is to be displayed with the content information during reproduction of the content information; and a second record process of recording play list information for defining reproduction sequence of the content information by a unit of item, which constitutes the content information and which is accessible upon reproducing, the second record process recording the play list information such that the play list information includes: item information for specifying each item which constitutes the content information; and slave item information for specifying the menu information corresponding to said each item as a slave item.

According to the information record method of the present invention, by using a controller, an encoder, a TS object generator mentioned later, an optical pickup, a cutting device or the like, the first record process records the series of content information and the menu information as for the content information, into the record area of the information record medium, such as a DVD. The second record process records the play list information which defines the reproduction sequence of the content information by the unit of item. Particularly, the second record device records the play list information such that the play list information includes: the item information and the slave item information.

Therefore, the information record medium according to the present invention as mentioned above (including various aspects thereof) can be recorded relatively efficiently.

Incidentally, the information record method according to the present invention may also take various aspects, corresponding to various aspects of the information record medium according to the present invention.

An information reproduction apparatus of the present invention is an information reproduction apparatus for reproducing the above-described information record medium of the present invention (including its various aspects), said information reproduction apparatus comprising: a reproduction device capable of reproducing said content information, said menu information and said play list information; a displaying and outputting device capable of displaying and outputting said content information and said menu information; a specifying device capable of externally specifying whether to display or not to display said menu information on said displaying and outputting device; and a control device for controlling said reproduction device to reproduce said content information and said menu information, in accordance with the item information and the slave item information included in said play list information reproduced by said reproducing device, and for controlling said displaying and outputting device such that said reproduced menu information is displayed and outputted with being superimposed on or in place of one portion of said reproduced content information corresponding to said reproduced menu information or is not displayed at all, selectively in accordance with external specification by said specifying device.

According to the information reproduction apparatus of the present invention, the reproduction device such as a controller, a decoder, a demultiplexer, an optical pickup and the like, reproduces the play list information. Then, under the control of the control device, such as a controller, the reproduction device reproduces the content information and the menu information in accordance with the item information and the slave item information included in the reproduced play list information. At this time, for example, the reproduced content information is reproduced as the main pass, while the reproduced menu information is reproduced as the sub pass. Along with the reproduction described above, the displaying and outputting device displays and outputs the content information. At this time, if there is the external specification by the specifying device, such as desire or not desire to display the menu screen, the displaying and outputting device displays and outputs the reproduced menu information with superimposing the reproduced menu information onto one portion of the content information corresponding to the reproduced menu information or replacing the one portion with the reproduced menu information, selectively in accordance with the content of the specification, under the control of the control device. Alternatively, the displaying and outputting device does not display it at all.

Therefore, the information record medium according to the present invention as mentioned above (including various aspects thereof) can be reproduced relatively efficiently.

Incidentally, the information reproduction apparatus according to the present invention may also take various aspects, corresponding to various aspects of the information record medium according to the present invention.

In one aspect of the information reproduction apparatus of the present invention, the control device controls the displaying and outputting device so as to display and output the reproduced menu information as a small window on the reproduced content information, in accordance with a display position and a size of the small window, which are further specified by the slave item information included in the reproduced play list information.

According to this aspect, under the control of the control device, the displaying and outputting device displays and outputs the menu information as the small window on the content information, at the display position and with the size of the small window, which are further specified by the slave item information, as occasion demands.

In another aspect of the information reproduction apparatus of the present invention, it is further provided with a buffer memory for maintaining the reproduced menu information in a readily displayable and outputtable condition, for a predetermined period, regardless of whether or not the reproduced menu information is displayed and outputted by the displaying and outputting device.

According to this aspect, the buffer memory, such as a ring buffer, maintains the reproduced menu information in a readily displayable and outputtable condition for a predetermined period, regardless of whether or not the reproduced menu information is displayed and outputted by the displaying and outputting device. Thus, by taking out the menu information from the buffer memory in accordance with a remote control or the like, it is possible to immediately display the menu information any time as the menu screen. Incidentally, "to readily or immediately display" in the present invention conceptually and broadly includes not only the case where after an instruction for display is inputted, the menu information can be displayed in such a short time that a user cannot recognize it, but also the case where the menu information can be displayed in such a short time that a user can recognize it.

An information reproduction method of the present invention is an information reproduction method of reproducing the above-described information record medium of the present invention (including its various aspects) on an information reproduction apparatus provided with: (i) a reproduction device capable of reproducing said content information, said menu information and said play list information; (ii) a displaying and outputting device capable of displaying and outputting said content information and said menu information; and (iii) a specifying device capable of externally specifying whether to display or not to display said menu information on said displaying and outputting device, said information reproduction method comprising: a first control process of controlling said reproducing device to reproduce said content information and said menu information, in accordance with the item information and the slave item information included in said play list information reproduced by said reproducing device; and a second control process of controlling said displaying and outputting device such that said reproduced menu information is displayed and outputted with being superimposed on or in place of one portion of said reproduced content information corresponding to said reproduced menu information or is not displayed at all, selectively in accordance with external specification by said specifying device.

According to the information reproduction method of the present invention, the first control process controls the reproducing device to reproduce the content information and the menu information, in accordance with the item information and the slave item information included in the play list information reproduced by the reproducing device, by using a controller or the like, for example. Moreover, the second control process controls the displaying and outputting device such that the reproduced menu information is displayed and outputted, or not displayed nor outputted at all, with superimposing the reproduced menu information onto one portion of the content information corresponding to the reproduced menu information or replacing the one portion with the reproduced menu information, selectively in accordance with the external specification by the specifying device.

Therefore, the information record medium of the invention mentioned above (including various aspects thereof) can be reproduced relatively efficiently.

Incidentally, the information reproduction method according to the present invention may also take various aspects, corresponding to various aspects of the information record medium according to the present invention as mentioned above.

An information record reproduction apparatus of the present invention is provided with: a first record device for recording a series of content information and menu information as for said content information, which is to be displayed with said content information during reproduction of said content information; a second record device for recording play list information for defining reproduction sequence of said content information by a unit of item, which constitutes said content information and which is accessible upon reproducing, said second record device recording said play list information such that said play list information includes: item information for specifying each item which constitutes said content information; and slave item information for specifying said menu information corresponding to said each item as a slave item; a reproduction device capable of reproducing said content information, said menu information, and said play list information; a displaying and outputting device capable of displaying and outputting said content information and said menu information; a specifying device capable of externally specifying whether to display or not to display said menu information on said displaying and outputting device; and a control device for controlling said reproduction device to reproduce said content information and said menu information, in accordance with the item information and the slave item information included in said play list information reproduced by said reproducing device, and for controlling said displaying and outputting device such that said reproduced menu information is displayed and outputted with being superimposed on or in place of one portion of said reproduced content information corresponding to said reproduced menu information or is not displayed at all, selectively in accordance with external specification by said specifying device.

According to the information record reproduction apparatus of the invention, since it has both of the above described information record apparatus of the present invention and the above described information reproduction apparatus of the present invention, the information record medium of the invention (including various aspects thereof) can be recorded and reproduced relatively efficiently.

Incidentally, the information record reproduction apparatus according to the present invention may also take various aspects, corresponding to various aspects of the information record medium according to the present invention.

An information record reproduction method of the present invention on an information reproduction apparatus provided with: (i) a reproduction device capable of reproducing content information, menu information and play list information; (ii) a displaying and outputting device capable of displaying and outputting said content information and said menu information; and (iii) a specifying device capable of externally specifying whether to display or not to display said menu information on said displaying and outputting device, said information record reproduction method comprising: a first record process of recording a series of content information and menu information as for said content information, which is to be displayed with said content information during reproduction of said content information; a second record process of recording play list information for defining reproduction sequence of said content information by a unit of item, which constitutes said content information and which is accessible upon reproducing, said second record process recording said play list information such that said play list information includes: item information for specifying each item which constitutes said content information; and slave item information for specifying said menu information corresponding to said each item as a slave item; a first control process of controlling said reproducing device to reproduce said content information and said menu information, in accordance with the item information and the slave item information included in said play list information reproduced by said reproducing device; and a second control process of controlling said displaying and outputting device such that said reproduced menu information is displayed and outputted with being superimposed on or in place of one portion of said reproduced content information corresponding to said reproduced menu information or is not displayed at all, selectively in accordance with external specification by said specifying device.

According to the information record reproduction method of the invention, since it has both of the above described information record method of the present invention and the above described information reproduction method of the present invention, the information record medium of the invention (including various aspects thereof) can be recorded and reproduced relatively efficiently.

Incidentally, the information record reproduction method according to the present invention may also take various aspects, corresponding to various aspects of the information record medium according to the present invention.

The computer program for a record control according to the present invention is to control a computer disposed at the information record apparatus according to the present invention (including various aspects thereof), the program making the computer function as at least a part of the first record device and the second record device.

According to the computer program for a record control of the invention, the information record apparatus according to the present invention mentioned above may be realized relatively easily, by reading and running the computer program from a record medium, such as a ROM, a CD-ROM, a DVD-ROM, a hard disk and so on, storing the computer program therein/thereon, or by downloading the computer program to the computer via the communication device and running it.

Incidentally, the computer program for a record control according to the present invention may also take various aspects, corresponding to various aspects of the information record medium according to the present invention as mentioned above.

The computer program for a reproduction control according to the present invention is to control a computer disposed at the information reproduction apparatus according to the present invention as mentioned above (including various aspects thereof), the program making the computer function as at least a part of the reproduction device, the displaying and outputting device, the specifying device and the control device.

According to the computer program for a reproduction control of the invention, the information reproduction apparatus according to the present invention mentioned above may be realized relatively easily, by reading and running the computer program from a record medium, such as a ROM, a CD-ROM, a DVD-ROM, a hard disk and so on, storing the computer program therein/thereon, or by downloading the computer program to the computer via the communication device and running it.

Incidentally, the computer program for a reproduction control according to the present invention may also take various aspects, corresponding to various aspects of the information record medium according to the present invention as mentioned above.

The computer program for a record reproduction control according to the present invention is to control a computer disposed at the information record reproduction apparatus according to the present invention as mentioned above (including various aspects thereof), the program making the computer function as at least a part of the first record device, the second record device, the reproduction device, the displaying and outputting device, the specifying device and the control device.

According to the computer program for a record reproduction control of the invention, the information record reproduction apparatus according to the present invention mentioned above may be embodied relatively easily, by reading and running the computer program from a record medium, such as a ROM, a CD-ROM, a DVD-ROM, a hard disk and so on, storing the computer program therein/thereon, or by downloading the computer program to the computer via the communication device and running it.

Incidentally, the computer program for a record reproduction control according to the present invention may also take various aspects, corresponding to various aspects of the information record medium according to the present invention as mentioned above.

A data structure including a control signal of the present invention is provided with: a series of content information; menu information as for said content information, which is to be displayed with said content information during reproduction of said content information; and play list information for defining reproduction sequence of said content information by a unit of item, which constitutes said content information and which is accessible upon reproducing, said play list information including: item information for specifying each item which constitutes said content information; and slave item information for specifying said menu information corresponding to said each item as a slave item.

According to the data structure including the control signal of the invention, similarly to the case of the information record medium according to the present invention as mentioned above, it is possible to display the menu screen, such as small window display and semitransparent superimpose display, with the title reproduction continued, during the title reproduction.

Incidentally, the data structure including the control signal according to the present invention may also take various aspects, corresponding to various aspects of the information record medium according to the present invention as mentioned above.

The above object of the present invention is achieved by a computer program product for a record control in a computer-readable medium for tangibly embodying a program of instructions executable by a computer disposed at the aforementioned information record apparatus according to the present invention (including various aspects), the program making the computer function as at least a part of the first record device and the second record device.

The above object of the present invention is achieved by a computer program product for a reproduction control in a computer-readable medium for tangibly embodying a program of instructions executable by a computer disposed at the information reproduction apparatus according to the present invention (including various aspects), the program making the computer function as at least a part of the reproduction device, the displaying and outputting device, a specifying device and the control device.

The above object of the present invention is achieved by a computer program product for a record reproduction control in a computer-readable medium for tangibly embodying a program of instructions executable by a computer disposed at the information record reproduction apparatus according to the present invention (including various aspects), the program making the computer function as at least a part of the first record device, the second record device, the reproduction device, the displaying and outputting device, a specifying device and the control device.

According to the computer program product for the record control, the reproduction control, or the record reproduction control of the invention, at least a part of the first record device, the second record device, the reproduction device, the displaying and outputting device, a specifying device and the control device according to the present invention mentioned above may be embodied relatively easily, by reading and running the computer program product from a record medium, such as a ROM, a CD-ROM, a DVD-ROM, a hard disk and so on, storing the computer program therein/thereon, or by downloading the computer program product to the computer via the communication device and running it. More specifically, the computer program product may be made of computer readable codes (or computer readable commands) to make the computer function as at least a part of the first record device, the second record device, the reproduction device, the displaying and outputting device, a specifying device and the control device.

These effects and other advantages of the present invention become more apparent from the following embodiments and examples.

BRIEF DESCRIPTION OF DRAWINGS

FIG. 1 illustrates, in its upper part, a general plan view of an optical disc as an embodiment of the information record medium of the present invention; and illustrates, in its lower part, a schematic conceptual diagram of an area structure in a radius direction corresponding to the general plan view in the upper part.

FIG. 2 illustrates a schematic conceptual diagram (FIG. 2(a)) of a conventional program stream of MPEG2; a schematic conceptual diagram (FIG. 2(b)) of a transport stream of MPEG2 used in the embodiment; and a schematic conceptual diagram (FIG. 2(c)) of a program stream of MPEG2 used in the embodiment.

FIGS. 20 are conceptual diagrams showing one specific example of: a data structure of SP control information for controlling sub picture data (FIG. 20(a)); and a SP data structure including SP data as being still-picture data, which mainly constitutes the sub-picture data (FIG. 20(b)).

FIG. 21 are conceptual diagrams showing three types of sub-picture structures, constructed from the SP control information and the SP data structure shown in FIGS. 20.

FIG. 23 is a conceptual diagram showing a structure of object data related to a sub frame, in the embodiment.

FIG. 26 is a conceptual diagram showing one specific example of a play list information file, which can display the "Dokodemo menu".

FIG. 37 is a diagram schematically showing a specific example of a data structure in an AU table constructed in the object information file and an ES map table associated with the AU table, in a specific example of the embodiment.

FIG. 38 is a diagram schematically showing a specific example of a data structure in an AU table constructed in the object information file and an ES map table associated with the AU table, in a specific example of the embodiment.

Figure 3:
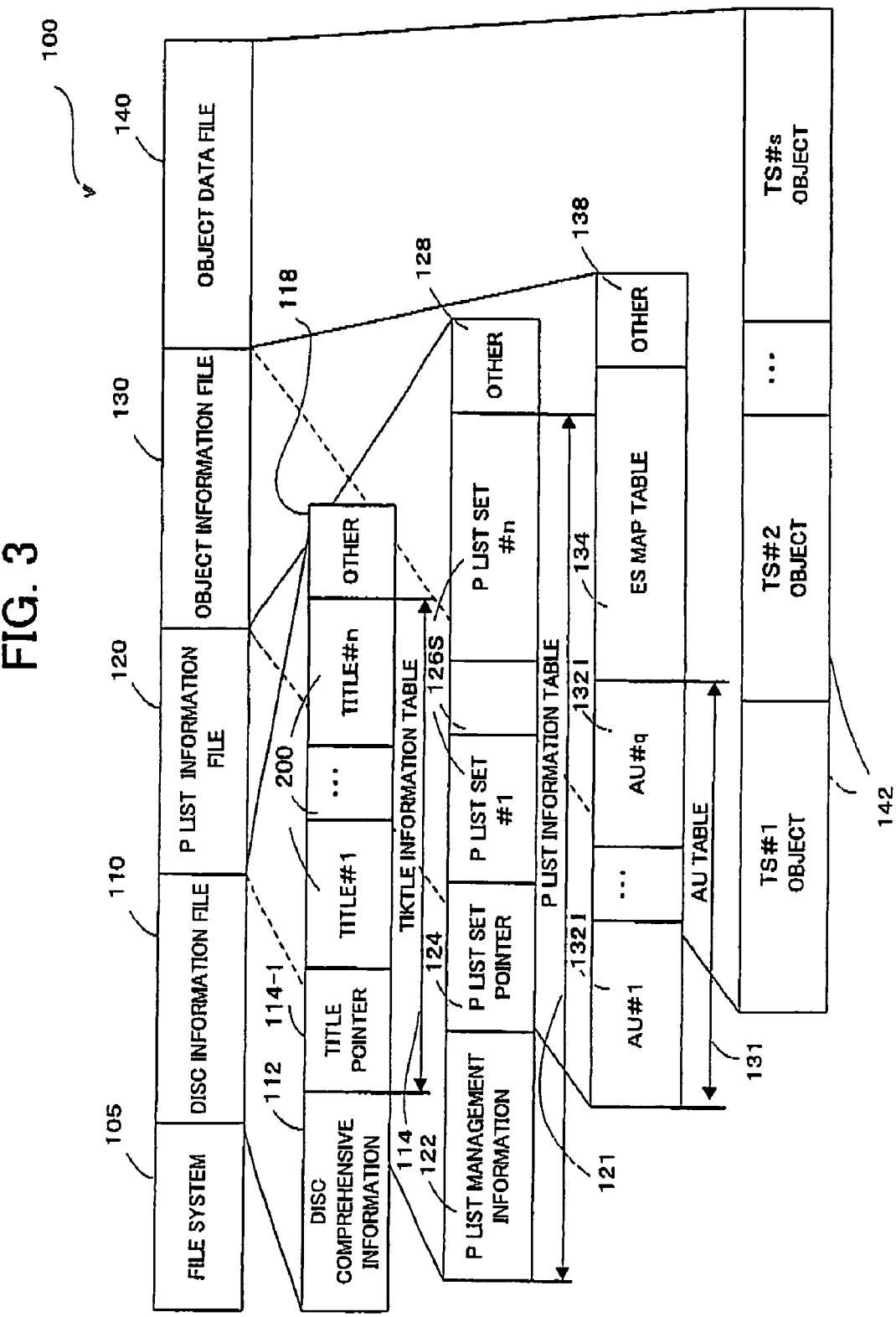
FIG. 3 is a diagram schematically illustrating a data structure recorded on the optical disc in the embodiment.

BEST MODE FOR CARRYING OUT THE INVENTION (Information Record Medium)

The information record medium of the present invention is discussed, with reference to its embodiments, as well as FIG. 1 to FIG. 13. In these embodiments, the information record medium of the present invention is applied to an optical disc capable of recording (writing) and reproducing (reading).

Firstly, with reference to FIG. 1, a fundamental structure of the optical disc in an embodiment is discussed. FIG. 1 illustrates, in its upper part, a general plan view of the optical disc structure having a plurality of areas, and illustrates conceptually, in its lower part, an area structure in the radius direction corresponding to the upper part.

As shown in FIG. 1, the optical disc 100 may be recorded by various record methods, such as a magneto-optical method, a phase change method, capable of recording (writing) only once or a plurality of times. Similarly to DVDs, the optical disc 100 has a lead-in area 104, a data area 106 and a lead-out area 108, from the inner circumference around a center hole 102 to the outer circumference, on the record surface of the disc body measuring about 12 cm in diameter. In each area, groove tracks and land tracks may be alternately arranged, concentrically or spirally around the center hole 102. The groove tracks may be wobbled. Furthermore, pre-pits may be formed on one or both of these tracks. Incidentally, the present invention is not exclusively limited to the optical disc having three areas mentioned above.

Next, with reference to FIG. 2, the structures of the transport stream (TS) and the program stream (PS) to be recorded onto the optical disc in the embodiment are discussed. FIG. 2(a) schematically illustrates a MPEG2 program stream of a conventional DVD for a comparison, FIG. 2(b) schematically illustrates a MPEG2 transport stream (TS) structure. Furthermore, FIG. 2(c) schematically illustrates a MPEG2 program stream structure in the present invention.

In FIG. 2(a), one program stream to be recorded in the conventional DVD includes only one video stream for video data as main picture information, along the time axis t, and further includes up to 8 audio streams of audio data as audio information, up to 32 sub-picture streams for sub-picture data as sub-picture information. That is, the video data to be multiplexed at an arbitrary time point tx relates to only one video stream. For example, a plurality of video stream corresponding to a plurality of TV programs or a plurality of movies can not be included at the same time in the program stream. It is not possible to multiplex a plurality of TV programs and transfer or record them, in a program stream format of a DVD having only one video stream, because at least one video stream is required for each TV program, in order to transfer or record the multiplexed TV program or the like involving a video image.

In FIG. 2(b), one transport stream (TS) to be recorded in the optical disc 100 of the present invention includes a plurality of video streams as elementary streams (ES) for video data as main picture information, and further includes a plurality of audio streams as elementary streams (ES) for audio data as audio information and a plurality of sub-picture streams as elementary streams (ES) for sub-picture as sub-picture information. That is, the video data to be multiplexed at an arbitrary time point tx relates to a plurality of video streams. For example, a plurality of video streams that may correspond to a plurality of TV programs or a plurality of movies can be included at the same time in the transport stream. Thus, it is possible to multiplex a plurality of TV programs and transfer or record them, in the transport stream format having a plurality of video streams. However, the sub-picture stream is not transferred in a digital broadcasting employing the existing transport stream.

In FIG. 2(c), one program stream (PS) to be recorded onto the optical disc 100 of the present invention includes a plurality of video streams for video data as main picture information, and further includes a plurality of audio streams for audio data as audio information and a plurality of sub-picture streams for sub-picture data as sub-picture information. That is, the video data to be multiplexed at an arbitrary time point tx relates to a plurality of video streams. For example, a plurality of video streams that may correspond to a plurality of TV programs or a plurality of movies can be included at the same time in the program stream.

Incidentally, for convenience of explanation, the video stream, the audio stream and the sub-picture stream are arranged in this order from the top in FIG. 2(a) to FIG. 2(c). Nevertheless, this order or sequence does not correspond to an order or sequence for multiplexing packet by packet as mentioned below. In the transport stream, conceptually, a set of one video stream, two audio streams and two sub-picture streams corresponds to one program for example.

The optical disc 100 in the aforementioned embodiment is adapted to multi-record the transport stream (TS) as shown in FIG. 2(b), i.e. to record a plurality of programs at the same time. Furthermore, instead of or in addition to this transport stream, the program stream (PS) as shown in FIG. 2(c) can be multi-recorded onto the same optical disc 100.

Figure 4:
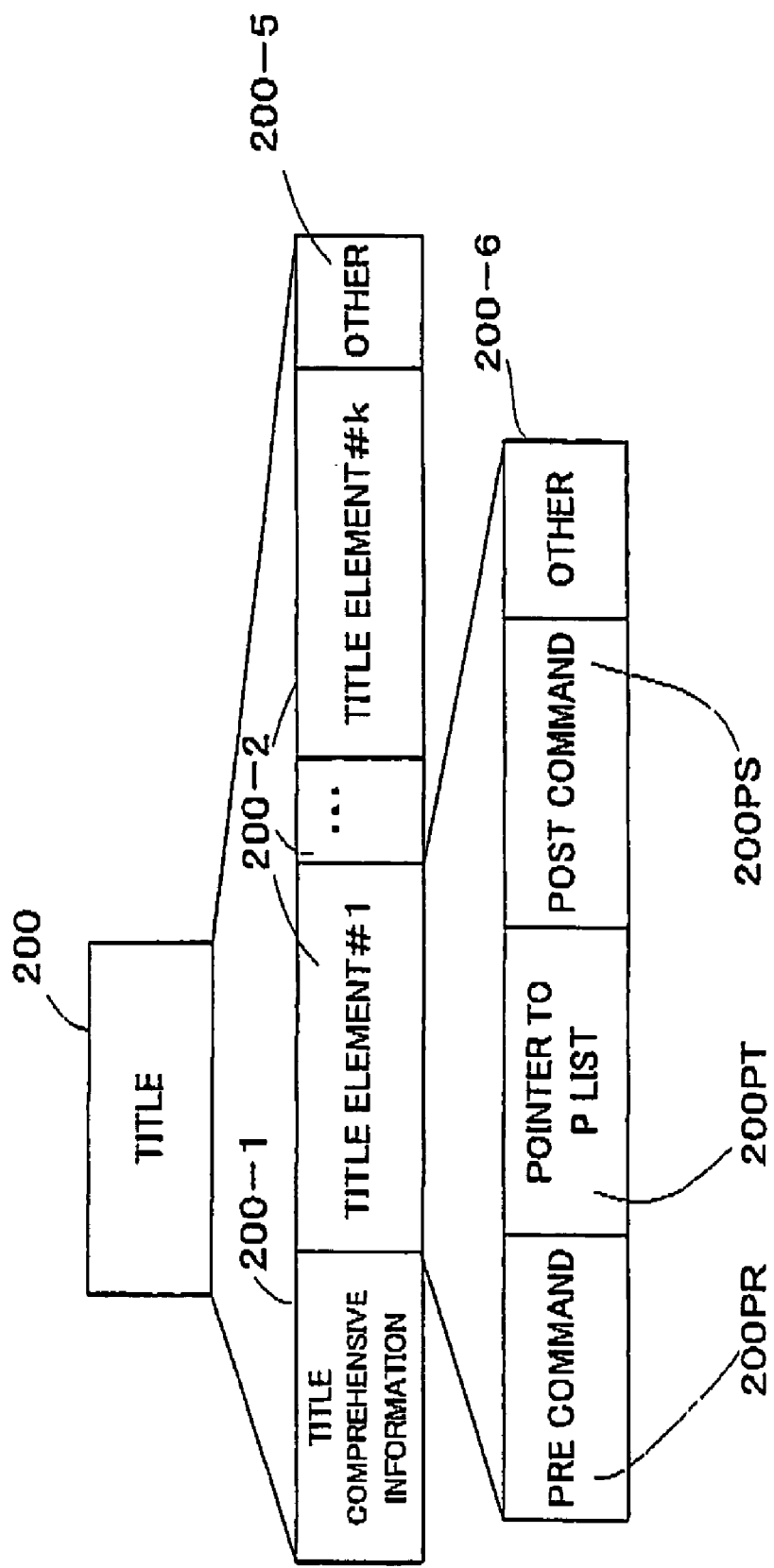
FIG. 4 is a conceptual diagram hierarchically illustrating a detail of a data structure in each title shown in FIG. 3.
Figure 5:
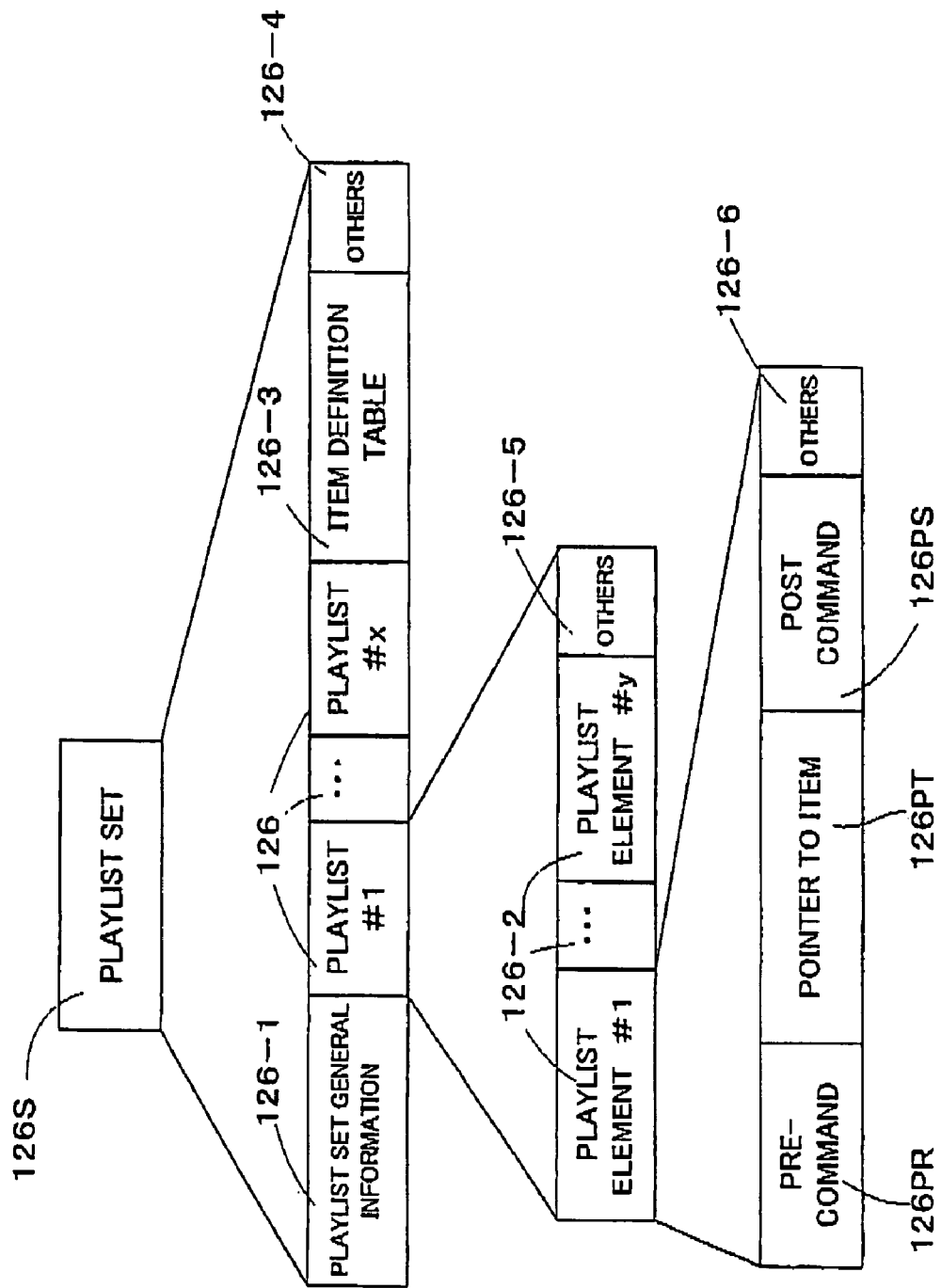
FIG. 5 is a conceptual diagram hierarchically illustrating a detail of a data structure in each play list set shown in FIG. 3.
Figure 6:
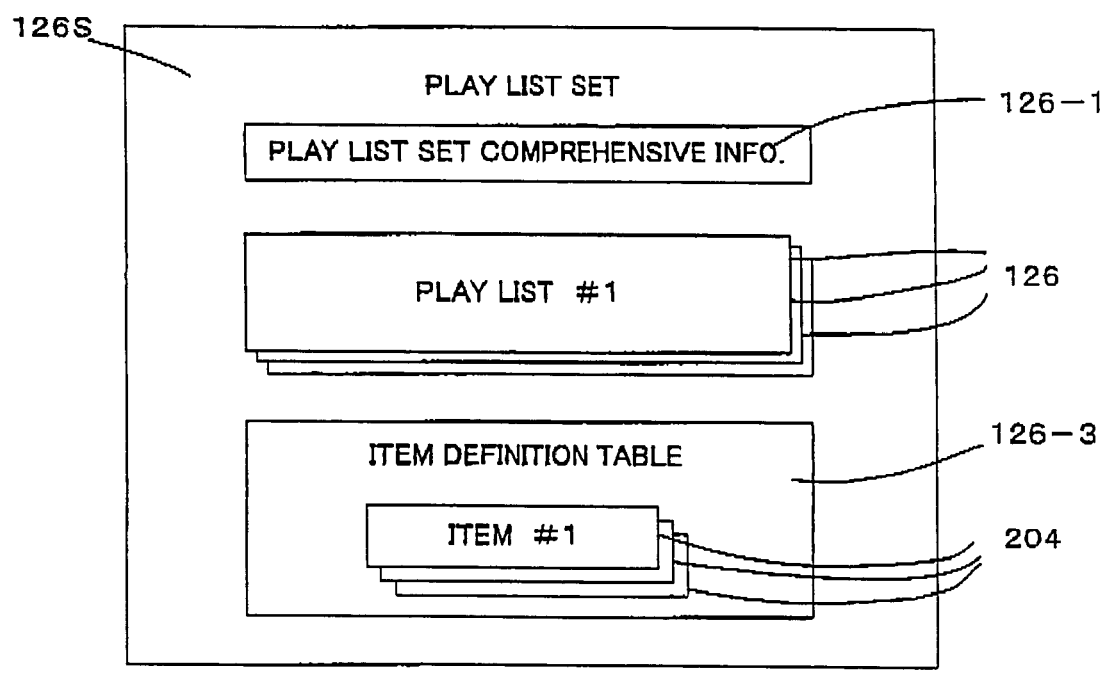
FIG. 6 is a conceptual diagram schematically illustrating a detail of a data structure in each play list set shown in FIG. 3.
Figure 7:
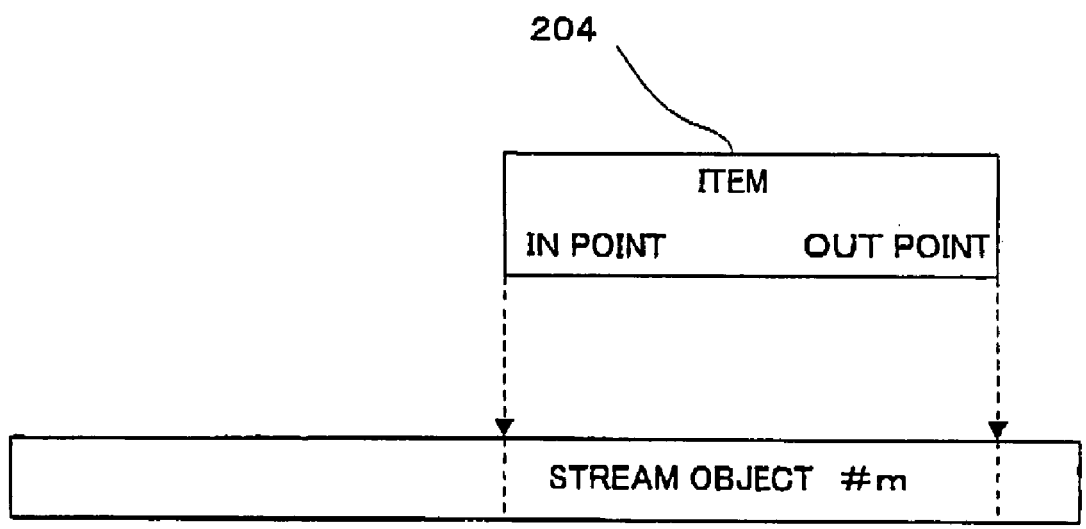
FIG. 7 is a conceptual diagram schematically illustrating a detail of a data structure of each item shown in FIG. 6.
Figure 8:
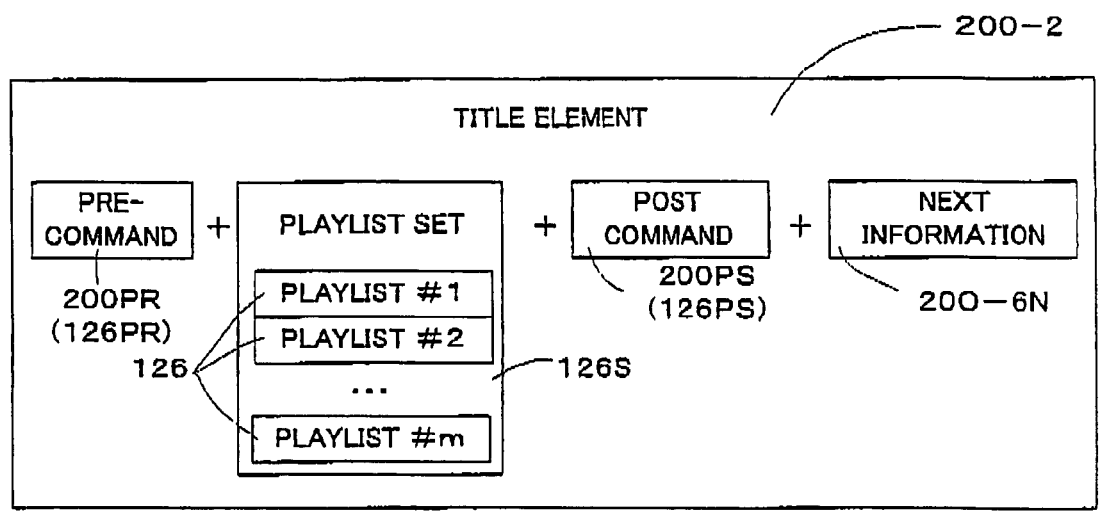
FIG. 8 is a conceptual diagram schematically illustrating a logic structure of data in each title element shown in FIG. 4.
Figure 9:
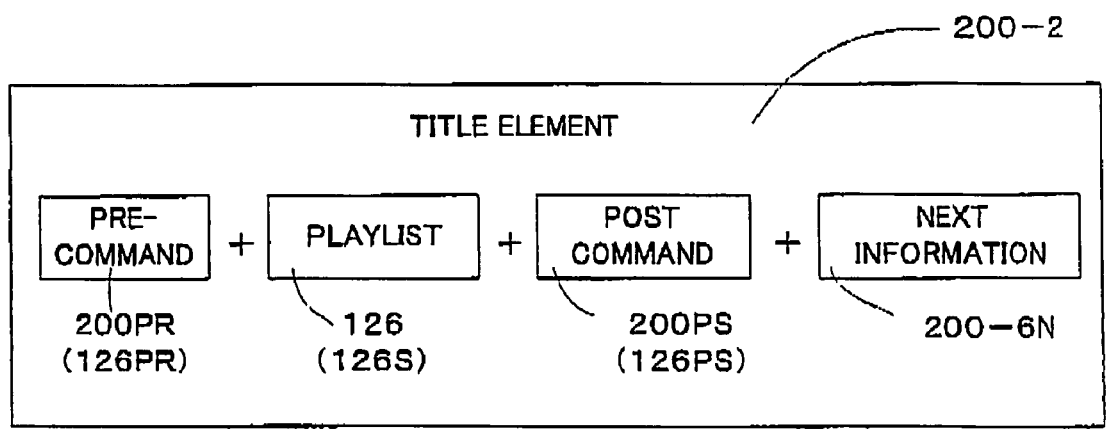
FIG. 9 is a conceptual view schematically illustrating a logic structure of data in each title element shown in FIG. 4, in a case that each play list set is composed of one play list.
Figure 10:
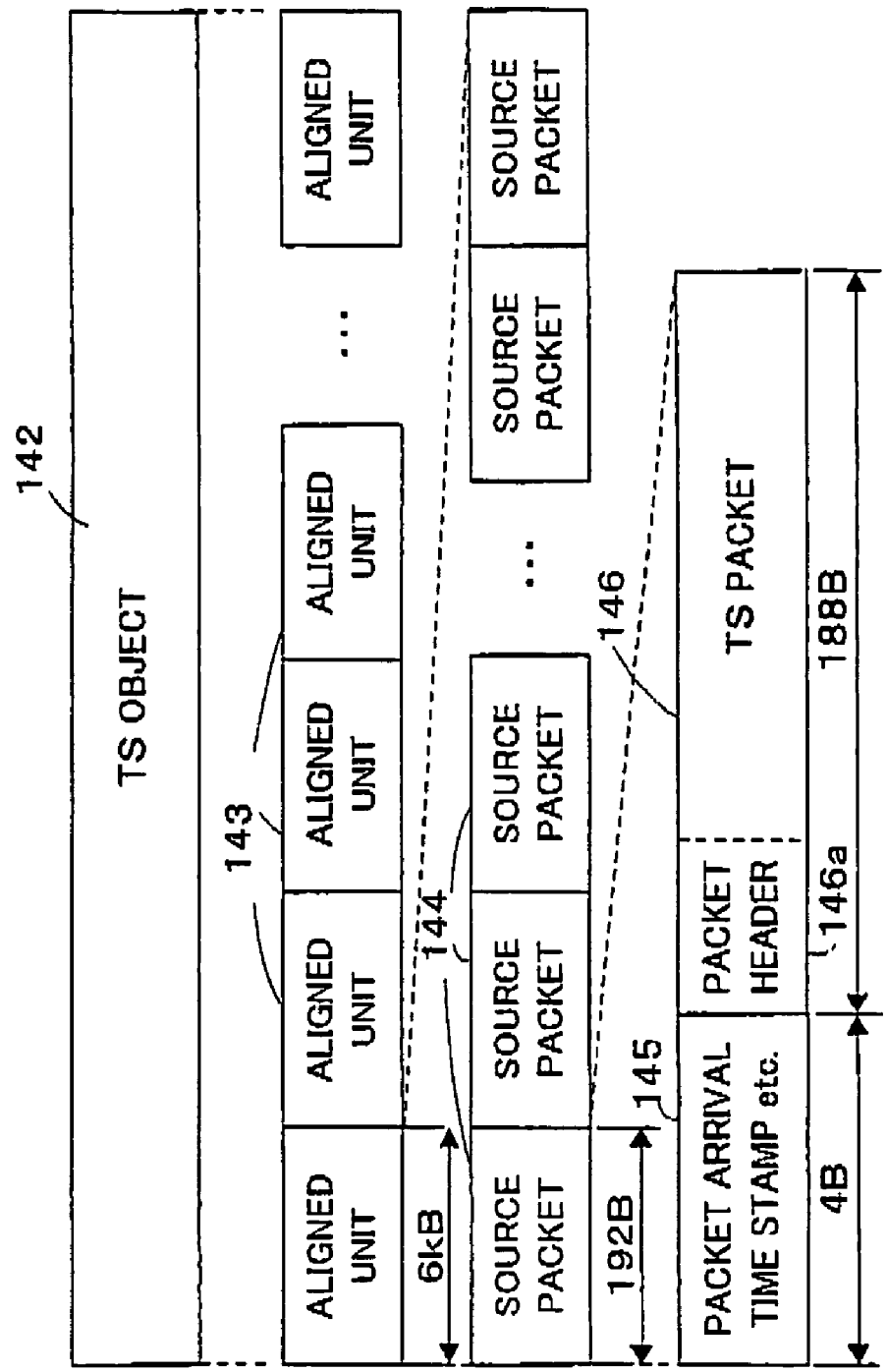
FIG. 10 is a conceptual view schematically illustrating a detail of a data structure in each object shown in FIG. 3.

Next, with reference to FIG. 3 and FIG. 10, a structure of data to be recorded onto the optical disc 100 is discussed. FIG. 3 schematically illustrates the data structure to be recorded onto the optical disc 100. FIG. 4 schematically illustrates in detail the data structure in each object shown in FIG. 3. FIG. 5 and FIG. 6 schematically show a data structure in detail respectively in each play list (P list) set shown in FIG. 3. FIG. 7 schematically shows a detail of the data structure of each item shown in FIG. 6. FIG. 8 schematically shows a logic structure of data in each title element shown in FIG. 4. FIG. 9 schematically shows a logic structure of data in each title element, in a case that each play list set is composed of one play list. FIG. 10 schematically shows a detail of a data structure in each object shown in FIG. 3.

In the following explanation, the "title" means a reproduction unit, on the basis of which a plurality of "play lists" are executed continuously or sequentially, and which is a logically large grouped unit, such as one movie or one TV program. The "play list set" means a bundle of "play lists". For example, it may be a bundle of play lists to reproduce a plurality of content information having a special relationship switchable to each other in an angle reproduction or a parental reproduction, or may be a bundle of play lists to reproduce content information relating to a plurality of programs broadcasted in the same time zone and collectively recorded. Alternatively, it may be a bundle of play lists to reproduce various content information, in one title, prepared on the basis of required function, for example on the basis of video performance or audio performance required for the information reproduction system, such as a high vision compatibility, a display resolution, a surround speaker compatibility, a speaker layout and so on. The "play list" is information for storing the information required to reproduce the "object" and consists of a plurality of "items" each storing the information about a reproduction range of the object to access the object. The "object" is the entity information of contents constructing the aforementioned MPEG2 transport stream.

In FIG. 3, the optical disc 100 is provided with four files as a logical structure: a disc information file 110; a play list (P list) information file 120; an object information file 130; and an object data file 140. The disc 100 is further provided with a file system 105 for managing these files. Incidentally, although FIG. 3 does not show directly the physical data arrangement on the optical disc 100, it is possible to perform the recording in such a manner that the arrangement shown in FIG. 3 corresponds to another arrangement shown in FIG. 1. That is, it is possible to record the file system 105 or the like in the data record area 106 following the lead-in area 104 and further record the object data file 140 or the like in the data record area 106. The file structure shown in FIG. 3 can be constructed, even without the lead-in area 104 or the lead-out area 108 shown in FIG. 1.

The disc information file 110 is a file for storing general information about the entire optical disc 100, and stores the disc general information 112, the title information table 114 and other information 118. The disc general information 112 may store the total numbers of titles or the like in the optical disc 100. The title information table 114 includes a title pointer 114-1 and a plurality of titles 200 (title #1-#m) whose ID (identification) number or record address is indicated by the title pointer. In each title 200, each title type (e.g. sequential reproduction type, branch type and so on), or the play list (P list) number constructing each title is recorded for each title, as the logical information.

More specifically, for example, as shown in FIG. 4, each title 200 is made of a title general information 200-1, a plurality of title elements 200-2 and other information 200-5. Furthermore, each title element 200-2 is made of a pre-command 200PR, a pointer 200PT to a play list set, a post command 200PS and other information 200-6.

The pointer 200PT as an example of the first pointer information according to the present invention indicates an ID number of the play list set 126S stored in the play list information file 120 corresponding to content information to be reproduced on the basis of the title element 200-2 including the pointer 200PT. Incidentally, the pointer 200PT may be information to indicate a record position of the play list set 126S corresponding to the content information to be reproduced on the basis of the title element 200-2. The pre-command 200PR as an example of the first pre-command according to the present invention indicates a command to be executed before reproducing the content information whose reproduction sequence is defined by one play list set 126S designated by the pointer 200PT. The post command 200PS as an example of the first post command according to the present invention is a command to be executed after reproducing the content information whose reproduction sequence is defined by said one play list set. Other information 200-5 included in the title element 200-2 may include next information to designate a title element for a next reproduction after the present reproduction of the present title element, for example.

Therefore, when the information reproduction apparatus reproduces the information record medium, the desired content information can be reproduced as a title element 200-2, by making access to the play list set 126S in accordance with the pointer 200PT and performing a control to select play list corresponding to the desired program or the like from among a plurality of play lists 126 in the play list set 126S. Furthermore, reproducing such a title element 200-2 solely or sequentially makes it possible to reproduce one title 200. Furthermore, it is possible to execute commands to be executed before reproduction, in the content information whose reproduction sequence is defined by one play list set 126S designated by the pointer 200PT, according to the pre-command 200PR. Furthermore, it is possible to execute commands to be executed after the reproduction, in the content information whose reproduction sequence is defined by one play list set 126S designated by the pointer 200PT, according to the post command 200PS. The post command 200PS may be a command to branch the content information, a command to select a next title and so on. Additionally, it is possible to reproduce a next title element 200-2 to be reproduced after the presently reproduced title element 200-2, according to the "next information" included in other information 200-5.

Again in FIG. 3, the play list information file 120 stores the play list (P list) information table 121 indicating the logical structure of each play list. This table 121 is divided into the play list (P list) management information 122, the play list (P list) set pointer 124, a plurality of play list (P list) sets 126S (P list set #1-#n), and other information 128. In this play list information table 121, the logical information of each play list set 126S is stored in the order of the play list set number. In other words, the order for storing the each play list set 126S is the play list set numbers. Furthermore, in the aforementioned title information table 114, the same play list set 126S can be referred from a plurality of titles 200. That is, the play list set #p in the play list information table 121 may be pointed on the title information table 114, even in the case that title #q and title #r use the same play list set #p.

As shown in FIG. 5, the play list set 126S includes play list set general information 126-1, a plurality of play lists 126 (play list #1-#x), an item definition table 126-3, and other information 126-4. Each play list 126 includes a plurality of play list elements 126-2 (play list element #1-#y), and other information 126-5. Furthermore, each play list element 126-2 includes a pre-command 126PR, a pointer 126PT to item, a post command 126PS and other information 126-6.

The pointer 126PT as an example of the second pointer information according to the present invention indicates an item identification number defined by the item definition table 126-3 corresponding to the content information to be reproduced on the basis of the play list element 126-2 including the pointer 126PT. Incidentally, the pointer 126PT may be an item record position defined by the item definition table 126-3.

As shown in FIG. 6, in the play list set 126S, a plurality of items 204 are defined in the item definition table 126-3. They are commonly belonged to a plurality of play lists 126. Furthermore, as the play list set general information 126-1, a name of each play list 126 included in the play list set 126S, UI (user interface information) such as a reproduction time, address information to each item definition table 126-3 and so on are recorded.

Again in FIG. 5, the pre-command 126PR as an example of the second pre-command according to the present invention indicates a command to be executed before reproduction of one item 204 designated by the pointer 126PT. The post command 126PS as an example of the second post command according to the present invention indicates a command to be executed after the reproduction of said one item 204. Other information 126-6 included in the play list element 126-2 may include the next information to designate the play list element 126-2 relating to the next reproduction of the reproduction of the play list element 126-2.

As shown in FIG. 7, the item 204 is a minimum unit to be displayed. In the item 204, "in-point information" to indicate a start address of an object and "out-point information" to indicate an end address of the object are recorded. Incidentally, each of these "in-point information" and "out-point information" may indicate the address directly or indirectly as a time period or time point on the reproduction time scale. In the figure, if a plurality of ESs (Elementary Streams) are multiplexed for the object designated by "stream object #m", designating the item 204 means designating a special ES or special combination of ESs.

As shown in FIG. 8, the title element 200-2 logically consists of the pre-command 200PR or 126PR, the play list set 126S selected by the pointer 200PT, the post command 200PT or 126PS, and the next information 200-6N. Therefore, a processing to select the play list 126 from among the play list set 126S is executed, according to any condition reproducible in a system, such as video resolution.

As shown in FIG. 9, however, if the play list set designated by the pointer 200PT consists of only one play list, i.e. if the play list set 126S shown in FIG. 3 is replaced by a single play list 126, the title element 200-2 logically consists of the pre-command 200PR or 126PR, the play list 126 to be reproduced during the reproduction operation, the post command 200PS or 126PS, and the next information 200-6N. In this case, once the play list set is designated for the reproduction, the single play list 126 is reproduced, regardless of the condition reproducible in the system.

Again in FIG. 3, in the object information file 130, the storage position (i.e. the logical address of the reproduction object) in the object data file 140 for each item constructed in each play list 126, and/or various attribute information relating to the reproduction of the item are stored. Particularly in this embodiment, the object information file 130 stores the AU table 131 including a plurality of AU (Associate Unit) information 1321 (AU #1-#q) as mentioned below, the ES (Elementary Stream) map table 134 and other information 135.

The object data file 140 stores a plurality of TS objects 142 for each transport stream (TS #1 object-TS #s object), i.e. entity data of contents to be actually reproduced.

Incidentally, four kinds of file discussed with reference to FIG. 3 can be further divided into a plurality of files respectively to be stored. All these files may be managed by the file system 105. For example, the object data file 140 can be divided into a plurality of files such as object data file #1, object data file #2 and so on.

As shown in FIG. 10, the TS object 142 shown in FIG. 3, as a logically reproducible unit, may be divided into a plurality of aligned units 143 each having 6 kB of data amount. The head of the aligned units 143 is aligned with the head of the TS object 142. Each aligned unit 143 is further divided into a plurality of source packets 144 each having 192B of data amount. The source packet 144 is a physically reproducible unit, on the basis of which (i.e. packet by packet) at least the video data, the audio data and the sub-picture data from among the data on the optical disc 100 are multiplexed, and other information may be multiplexed in the same manner. Each source packet 144 includes the control information 145 having 4B of data amount to control the reproduction, such as the packet arrival time stamp or the like indicating the reproduction start time point of the TS (Transport Stream) packet on the reproduction time scale, and includes the TS packet 146 having 188B of data amount. The TS packet 146 (also referred to as "TS packet payload") has a packet header 146a at its head portion. The video data may be packetized as the "video packet", the audio data may be packetized as the "audio packet", or the sub-picture data may be packetized as the "sub-picture packet", otherwise other data may be packetized.

Figure 11:
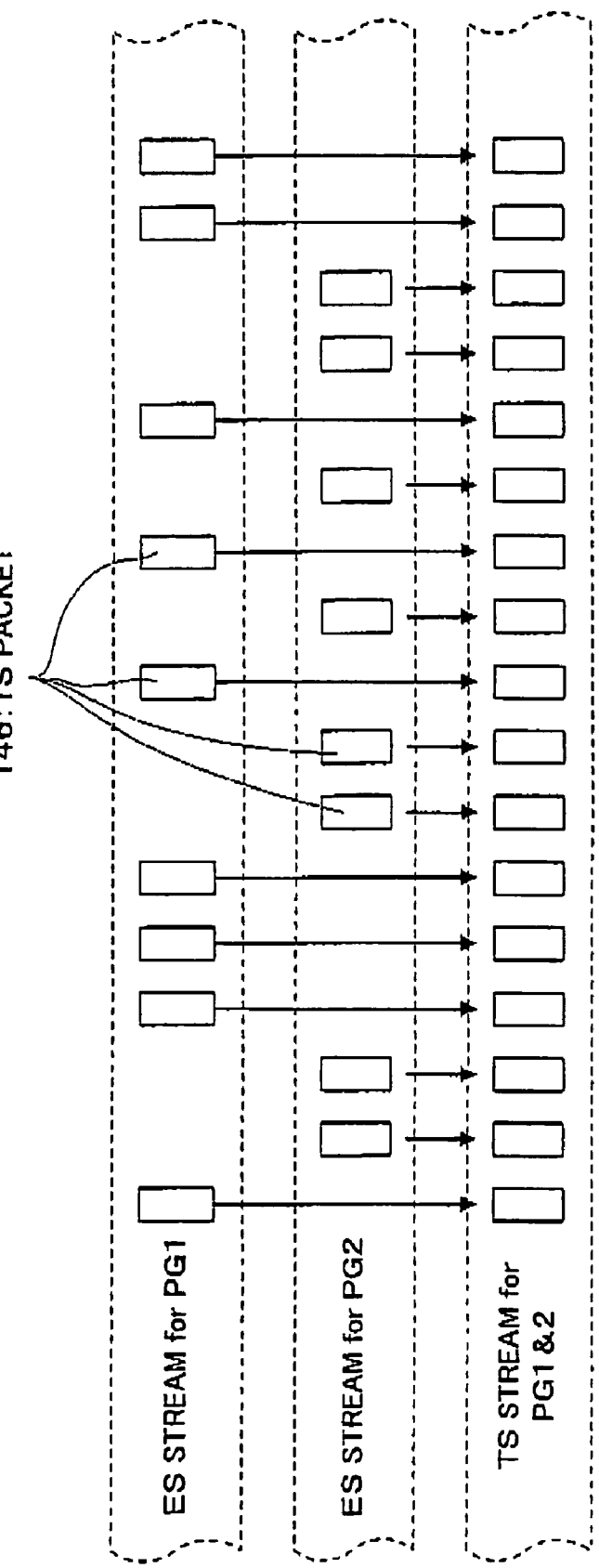
FIG. 11 is a view schematically illustrating a situation that an elementary stream for a program #1, shown in the upper column, and an elementary stream for a program #2, shown in the middle column, are multiplexed to form a transport stream for these two programs, on the basis of a time scale in a horizontal direction.
Figure 12:
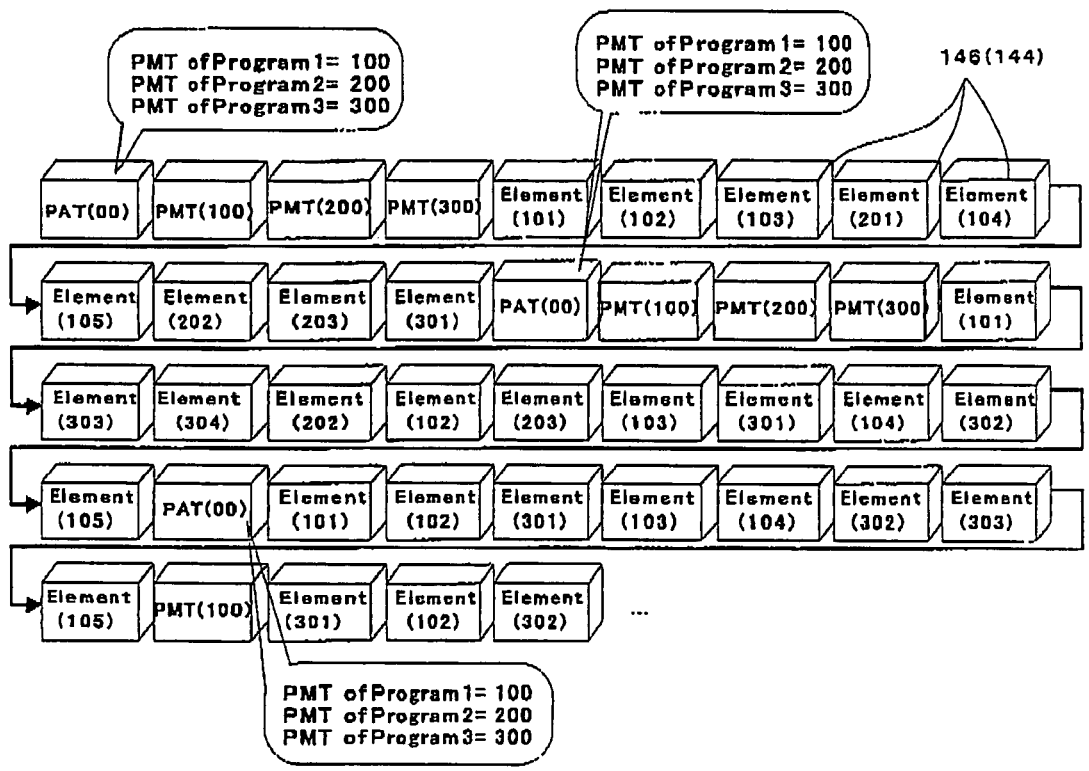
FIG. 12 is a conceptual view conceptually illustrating an image of TS packets multiplexed in one transport stream in the embodiment, as a packet arrangement based on the time scale.

Next, with reference to FIG. 11 and FIG. 12, an explanation is made on the multi-recording of the video data, the audio data, the sub-picture data and the like in the transport stream format as shown in FIG. 2(b), by the TS packet 146 shown in FIG. 4. FIG. 11 conceptually illustrates that the elementary stream (ES) for program #1 (PG1) in the upper stage and the elementary stream (ES) for program #2 (PG2) in the middle stage are multiplexed, and the transport stream (TS) for these two programs (PG1&2) is formed, under an assumption that a horizontal axis is defined as a time axis. FIG. 12 conceptually illustrates an image of the TS packets multiplexed in one transport stream (TS), as a packet array along the time (sic).

As shown in FIG. 11, the elementary stream for program #1 (in the upper stage) may be formed by discretely arranging TS packets 146 obtained by packetizing the video data for program #1, along the time axis. The elementary stream for program #2 (in the middle stage) may be formed by discretely arranging TS packets obtained by packetizing the video data for program #2, along the time axis. Then, these TS packets 146 are multiplexed so that the transport stream (in the lower stage) for two programs is made. Incidentally, omitted for convenience of explanation in FIG. 11, the elementary stream made of TS packets obtained by packetizing the audio data as the elementary stream for program #1, and/or the sub-picture stream made of TS packets obtained by packetizing the sub-picture data may be multiplexed similarly, as shown in FIG. 2(b). In addition to this, the elementary stream made of TS packets obtained by packetizing the audio data, as the elementary stream for program #2, and the sub-picture stream made of TS packets obtained by packetizing the sub-picture data may be multiplexed similarly.

As shown in FIG. 12, in this embodiment, a plurality of TS packets 146 multiplexed as such forms one TS stream. Then, a plurality of TS packets 146 in the multiplexed form is multi-recorded onto the optical disc 100, with the information such as the packet arrival time stamp 145 and the like being added. Incidentally, in FIG. 12, the TS packet 146 consisting of the data forming program #i (i=1, 2, 3) is indicated by "element (i0j)", wherein, j (j=1, 2, . . . ) is a sequential number for each stream composing the program. This (i0j) is defined as a packet ID which is an identification number of the TS packet 146 for each elementary stream. This packet ID is fixed at an inherent value for a plurality of TS packets 146 to be multiplexed at the same time point, so that the plurality of TS packets 146 are distinguished from each other even if multiplexed at the same time point.

Furthermore, in FIG. 12, the PAT (Program Association Table) and the PMT (Program Map Table) are also packetized by the TS packet 146 unit and multiplexed. The PAT among them stores a table indicating a plurality of PMT packet IDs. Particularly, the PAT is defined by MPEG2 standard so that (000) is given as a predetermined packet ID, as shown in FIG. 12. That is, from among a plurality of packets multiplexed at the same time point, the TS packet 146 obtained by packetizing the PAT is detected, as the TS packet 146 whose packet ID is (000). The PMT stores a table indicating the packet ID for each elementary stream forming each program in one or more programs. Any packet ID can be given to the PMT, their packet IDs are indicated by the PAT detectable with the packet ID (000) as mentioned above. Therefore, among a plurality of packets multiplexed at the same time point, the TS packets 146 obtained by packetizing the PMT (i.e. TS packets 146 to which packet IDs (100), (200) and (300) are given in FIG. 12) are detected on the basis of the PAT.

In the case that the transport stream as shown in FIG. 12 is transferred digitally, the tuner refers to the PAT and the PMT constructed as such and thereby extracts the multiplexed packets corresponding to the desired elementary stream and decodes the extracted packets.

In this embodiment, these PAT and PMT are included as the TS packets 146 to be stored in the TS object 142 shown in FIG. 10. That is, when the transport stream as shown in FIG. 12 is transferred, the transferred stream can be directly recorded onto the optical disc 100, which is a great advantage.

Furthermore in this embodiment, these PAT and PMT recorded as such are not referred to when the optical disc 100 is reproduced. Instead, referring to the AU table 131 and the ES map table 134, shown in FIG. 3 and mentioned in detail later, makes it possible to perform the reproduction effectively and apply to the complicated multi-vision reproduction or the like. For this, in this embodiment, a relationship between packets and the elementary stream obtained by referring to the PAT and the PMT on decoding or recording for example is stored in the object information file 130, in a form of AU table 131 and ES map table 134, without packetizing or multiplexing.

Figure 13:
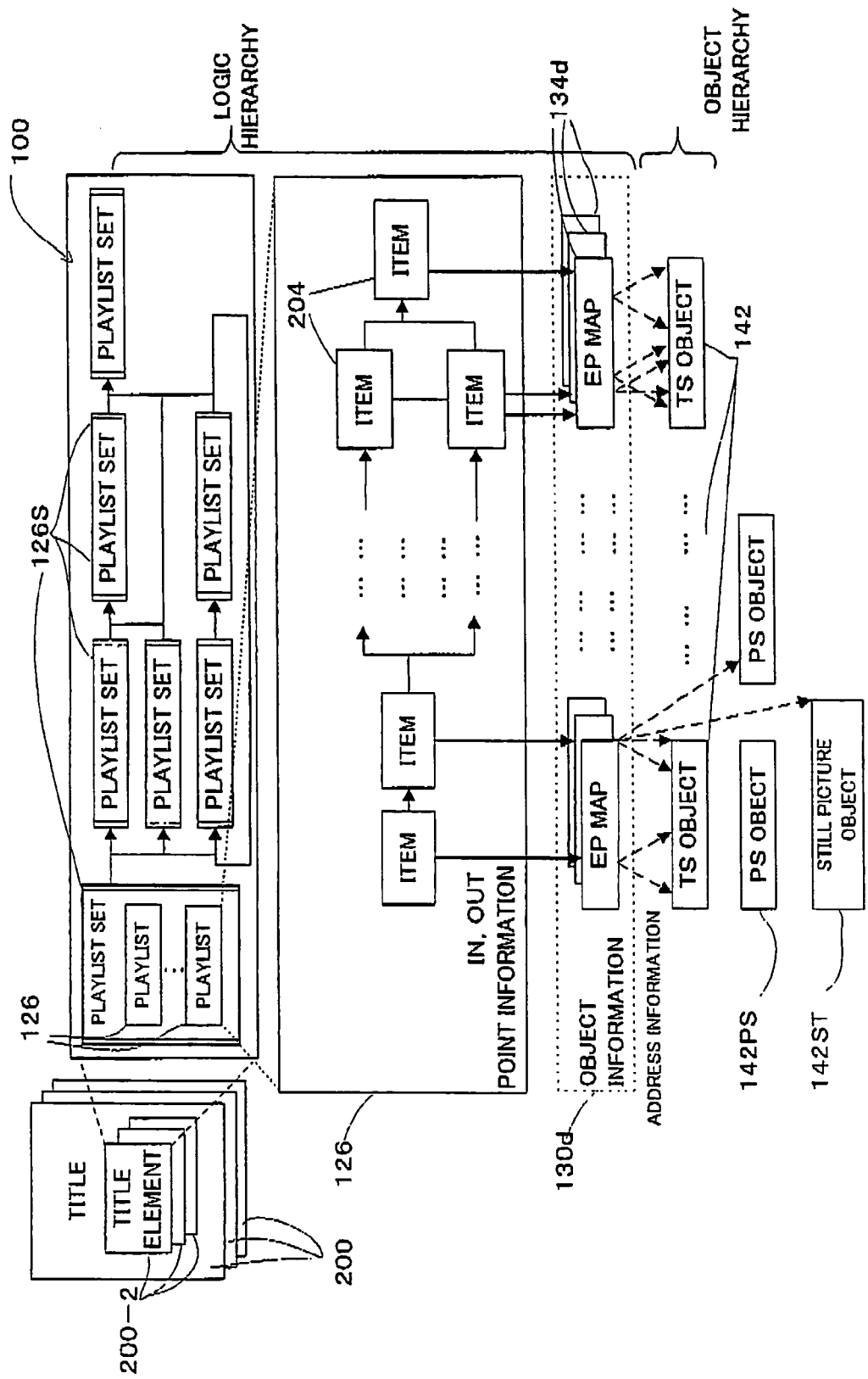
FIG. 13 is a view schematically illustrating a logic structure of data on an optical disc in the embodiment, focusing on development from a logic hierarchy to an object hierarchy or an entity hierarchy.

Next, with reference to FIG. 13, the logical structure of data on the optical disc 100 is discussed. FIG. 13 schematically illustrates the logical structure of data on the optical disc 100, focusing on the development from the logic hierarchy to the object hierarchy or the entity hierarchy.

In FIG. 13, one or more titles 200 that are a logical large unit such as one movie or one TV program are recorded on the optical disc 100. Each title 200 includes one or more title elements 200-2. Each title element 200-2 logically consists of a plurality of play list sets 126S. In each title element 200-2, the plurality of play list sets 126S may have a sequential structure or may have a branch structure.

Incidentally, in the case of a simple logical structure, one title element 200-2 consists of one play list set 126S. Furthermore, one play list set 126S consists of one play list 126. On the other hand, it is possible to refer to one play list set 126S by a plurality of title elements 200-2 or a plurality of titles 200.

Each play list 126 is logically made of a plurality of items (play items) 204. In each play list 126, a plurality of items 204 may have the sequential structure or may have the branch structure. On the other hand, it is possible to refer to one item 204 by a plurality of play lists 126. The aforementioned in-point information and out-point information recorded on/in the item 204 logically designates the reproduction range of the TS object 142. Then, the object information 130d of the logically designated reproduction range is referred to and thereby the reproduction range of the TS object 142 is physically designated, via the file system finally. Here, the object information 130d includes various information to reproduce the TS object 142, such as the attribute information of the TS object 142, the ES address information 134d and the like required for the data search in the TS object 142 (Incidentally, the ES map table 134 shown in FIG. 3 includes a plurality of ES address information 134d).

Then, when the information record and reproduce apparatus reproduces the TS object 142 as mentioned below, a physical address to be reproduced in the TS object 142 is obtained from the item 204 and the object information 130d so that a desired elementary stream is reproduced.

Incidentally, the EP (Entry Pass) map including a plurality of ES address information 134d, shown within the object information of FIG. 13, herein indicates an object information table in which the AU table 131 and the ES map table 134 are listed.

Thus, in this embodiment, the in-point information and out-point information recorded on/in the item 204, as well as the ES address information 134d recorded in the ES map table 134 (see FIG. 3) of the object information 130d make it possible to perform the association from the logic hierarchy to the object hierarchy in the reproduction sequence so that the elementary stream is reproduced.

As discussed above, in this embodiment, units of the TS packet 146 are multiplexed and recorded on the optical disc 100. Thereby, the transport stream including a plurality of elementary streams as shown in FIG. 2(b) can be recorded onto the optical disc 100. In this embodiment, in the case that digital broadcasting is recorded onto the optical disc 100, a plurality of programs can be recorded at the same time, within the restriction of the record rate. Nevertheless, a record method is employed herein, in which a plurality of programs are multiplexed and recorded for one TS object 142. Now, an explanation is made on an embodiment of the information record reproduction apparatus capable of performing such a record processing.

(Information Record Reproduction Apparatus)

Figure 14:
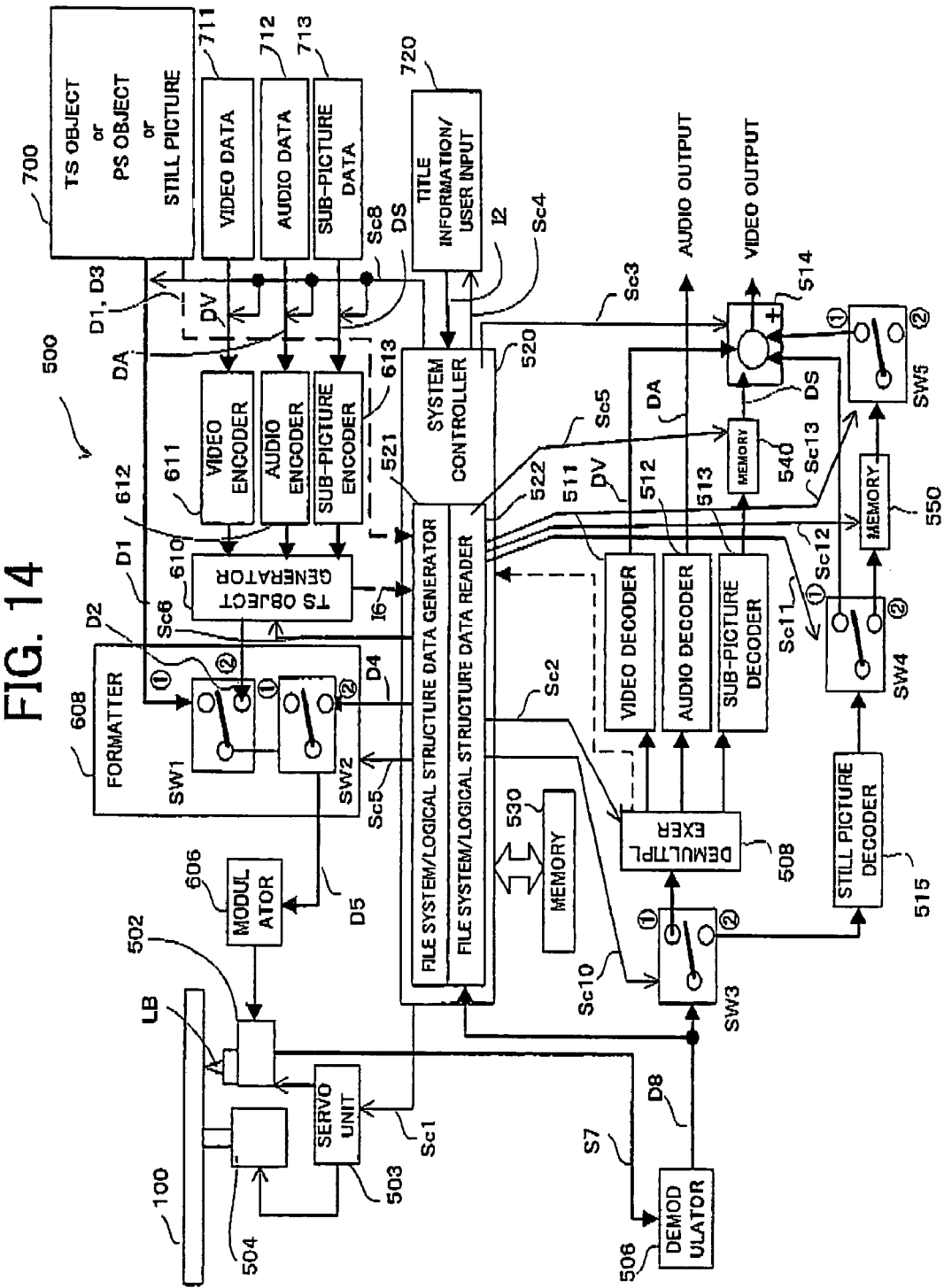
FIG. 14 is a block diagram schematically illustrating an information record reproduction apparatus in the embodiment.

Next, with reference to FIG. 14 to FIG. 19, an embodiment of the information record reproduction apparatus of the present invention is discussed. Here, FIG. 14 is a block diagram of the information record reproduction apparatus, and FIGS. 15 to 19 illustrate the operational flow.

In FIG. 14, the information record reproduction apparatus 500 is roughly divided into a reproduction system and a record system. The apparatus 500 is constructed to record the information onto the optical disc 100 mentioned above and reproduce the information recorded thereon/therein. In this embodiment, the information record reproduction apparatus 500 is thus for recording and reproduction. Nevertheless, an embodiment of the information record apparatus according to the present invention can be constructed basically with the record system of the apparatus 500 and an embodiment of the information reproduction apparatus according to the present invention can be constructed basically with the reproduction system of the apparatus 500.

The information record reproduction apparatus 500 is provided with: an optical pickup 502; a servo unit 503; a spindle motor 504; a decoder 506; a demultiplexer 508; a video decoder 511; an audio decoder 512; a sub-picture decoder 513; an adder 514; a still picture decoder 515; a system controller 520; a memory 530; a memory 540; a memory 550; a modulator 606; a formatter 608; a TS object generator 610; a video encoder 611; an audio encoder 612; and a sub-picture encoder 613. The system controller 520 includes a file system/logical structure data generator 521 and a file system/logical structure data reader 522. Furthermore, the memory 530 and a user interface 720 to give a user input such as title information are connected to the system controller 520.

Among these constitutional elements, the decoder 506, the demultiplexer 508, the video decoder 511, the audio decoder 512, the sub-picture decoder 513, the adder 514, the still picture decoder 514, the memory 540 and the memory 550 mainly constructs the reproduction system. On the other hand, among these constitutional elements, the modulator 606, the formatter 608, the TS object generator 610, the video encoder 611, the audio encoder 612 and the sub-picture encoder 613 mainly constructs the record system. The optical pickup 502, the servo unit 503, the spindle motor 504, the system controller 520, the memory 530 and the user interface 720 to give the user input such as title information are generally shared for both the reproduction system and the record system. Furthermore, for the record system, a TS object data source 700 (or a PS object data source 700, or a still picture data source 700 such as bit map data, JPEG data and the like); a video data source 711; an audio data source 712; and a sub-picture data source 713 are prepared. Furthermore, the file system/logical structure data generator 521 disposed in the system controller 520 is used mainly in the record system, and the file system/logical structure reader 522 is used mainly in the reproduction system.

The optical pickup 502 irradiates the optical disc 100 with a light beam LB such as a laser beam, at the first power as reading light for the reproduction, and at the second power with the light beam LB being modified as writing light for recording. The servo unit 503 performs the focus servo, the tracking servo and the like for the optical pickup 502, as well as the spindle servo for the spindle motor 504, under control of the control signal Sc1 outputted from the system controller 520, during the reproduction and recording. The spindle motor 504 is controlled under the spindle servo by the servo unit 503, for rotating the optical disc 100 at a predetermined speed.

(i) Structure and Operation of Record System

Next, with reference to FIG. 14 to FIG. 18, a specific structure and the operation of each constitutional element constructing the record system of the information record and reproduction system 500 is explained in each case.

(i-1) In the Case that the Already Generated Object is Used

Figure 15:
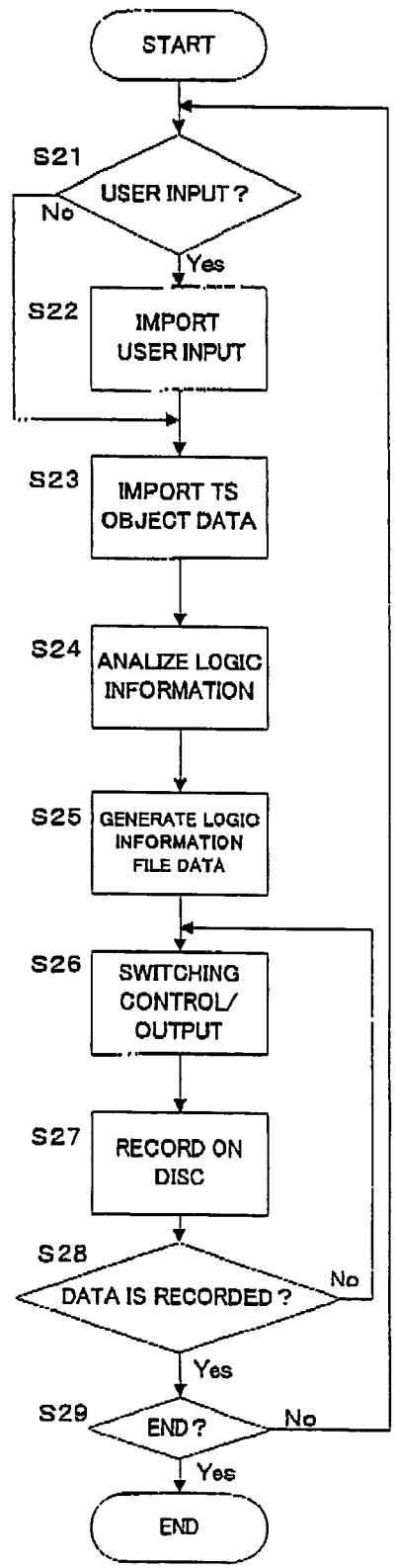
FIG. 15 is a flow chart indicating a recording operation (part 1) of the information record reproduction apparatus in the embodiment.

This case is discussed, with reference to FIG. 14 and FIG. 15.

In FIG. 14, the TS object data source 700 may be made of the memory storage such as a video tape, a memory, for storing the TS object data D1.

Firstly in FIG. 15, each title information (e.g. play list contents etc.) to be logically constructed on the optical disc 100 using the TS object data D1 is inputted into the system controller 520, as the user input I2 such as the title information, via the user interface 720. Then, the system controller 520 imports the user input I2 such as the title information via the user interface 720 (step S21: Yes, and step S22). In this case, the user interface 720, under control of the control signal Sc4 from the system controller 520, can perform the input operation in response to the contents to be recorded, such as the selection via the title menu screen. Incidentally, if the user input is already performed (step S21: No), these processings are omitted.

Next, the TS object data source 700 outputs the TS object data D1, under control of the control signal Sc8 to indicate the data reading from the system controller 520. Then, the system controller 520 imports the TS object data D1 from the TS object data source 700 (step S23), and performs the data array analysis (e.g. a record data length and the like) of the TS object data D1, the analysis of each elementary stream structure (e.g. understanding of ES_PID (elementary stream/packet identification number)), on the basis of the PAT, the PMT and the like packetized with the video data as mentioned above, due to the TS analysis feature in the file system/logical structure data generator 521 (step S24).

Next, the system controller 520 makes the file system/logical structure data generator 521 generate the disc information file 110, the play list information file 120, the object information file 130 and the file system 105 (see FIG. 3), as the logical information file data D4, on the basis of the analysis result of each elementary stream and the TS object data D1 data array, as well as the user input I2 such as the imported title information (step S25). The memory 530 is used to generate this logical information file data D4.

Incidentally, variations in which the data about each elementary stream structure information and the TS object data D1 data array may be prepared in advance are naturally understood or suggested, all of which are encompassed within a scope of the embodiment.

In FIG. 14, the formatter 608 is for formatting the data array to store both the TS object data D1 and the logical information file data D4 on the optical disc 100. More specifically, the formatter 608 is provided with a switch Sw1 and a switch Sw2 and is switching-controlled by a switch control signal Sc5 from the system controller 520. When formatting the TS object data D1, it connects the switch Sw1 to a ① side and the switch Sw2 to the ① side so as to output the TS object data D1 from the TS object data source 700. Incidentally, the transmission control of the TS object data D1 is performed by the control signal Sc8 from the system controller 520. On the other hand, when formatting the logical information file data D4, the formatter 608 is switching-controlled by the switch control signal Sc5 from the system controller 520, and connects the switch Sw2 to a ② side so as to output the logical information file data D4.

At step S26 in FIG. 15, (i) the logical information file data D4 from the file system/logical structure data generator 521 at the step S25 or (ii) the TS object data D1 from the TS object data source 700 is outputted through the formatter 608, under the switching-control by the formatter 608 as constructed above (step S26).

The selection output from the formatter 608 is transmitted to the modulator 606 as disc image data D5, and modulated by the modulator 606, and recorded onto the optical disc 100 through the optical pickup 502 (step S27). The system controller 520 also executes the disc record control in this case.

Then, if both the logical information file data D4 generated at the step S25 and the corresponding object data D1 have not been completely recorded yet, the operational flow returns to the step S26 to continue the recording (step S28: No). Incidentally, there is no preference in the record sequence of the logical information file data D4 and the corresponding object data D1.

On the other hand, if the both have been already recorded, it is judged whether or not the recording onto the optical disc 100 is to be ended, on the basis of the presence or absence of an end command (step S29). If it is not to be ended (step S29: No), the operational flow returns to the step S21 to continue the recording. On the other hand, if it is to be ended (step S29: Yes), a series of record processing ends.

As described above, the information record reproduction apparatus 500 performs the record processing in the case of using the already prepared TS object.

Incidentally, the example in FIG. 15 shows that the logical information file data D4 and the corresponding object data D1 are outputted at the step S26, after preparing the logical information file data D4 at the step S25. However, it is also possible to output the object data D1 and/or record the object data D1 onto the optical disc 100 before the step S25, so that the logical information file data D4 is generated and/or recorded after or in parallel with this recording.

Additionally, a PS object data source or a still picture data source may be used instead of the TS object data source 700. In this case, the recording processing the same as in the case of the TS object data D1 as mentioned above is performed for the PS object data, or the sill picture data such as bit map data, JPEG data and the like, instead of the TS object data D1. Furthermore, instead of the TS object 142, the PS object data or the still picture data is stored in the object data file 140. Then, various logic information about the PS object data or the still picture data is generated under control of the system controller 520, and stored in the disc information file 110, the play list information file 120, the object information file 130 and the like.

(i-2) The Case of Receiving and Recording the Transport Stream On Air

Figure 16:
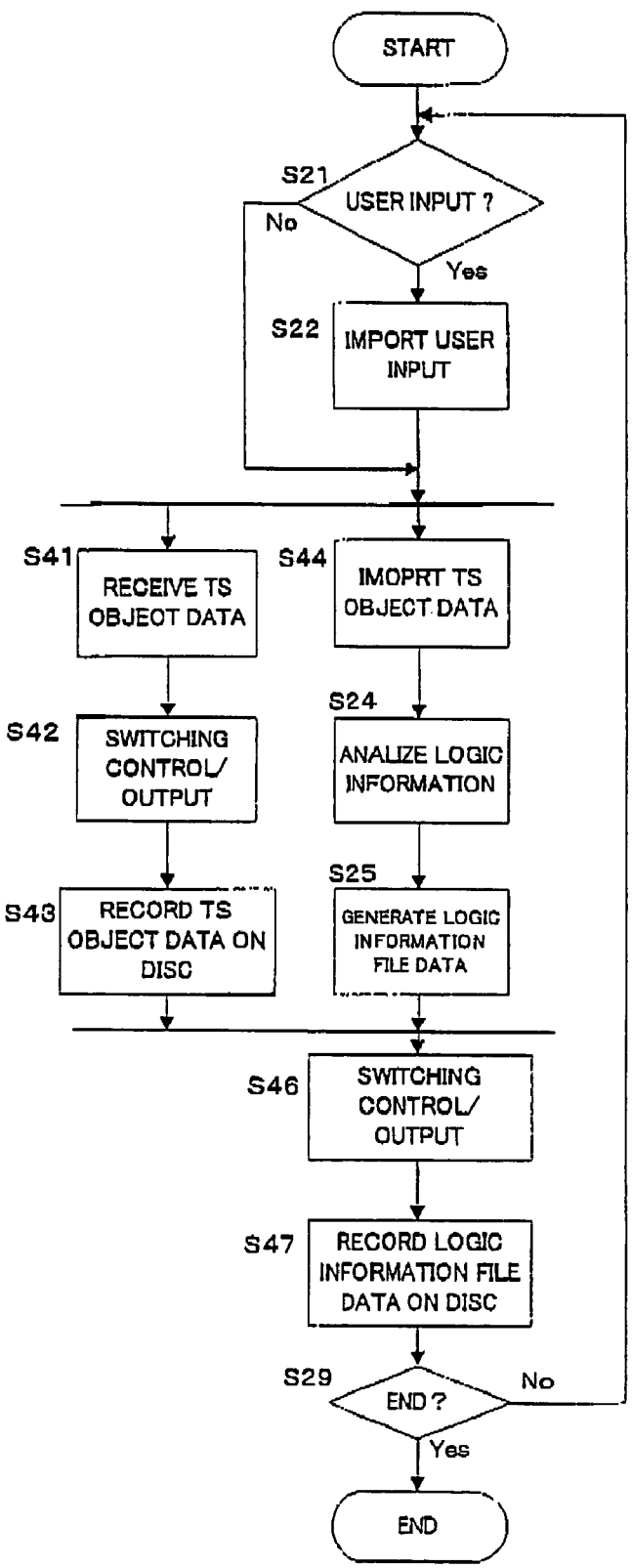
FIG. 16 is a flow chart indicating a recording operation (part 2) of the information record reproduction apparatus in the embodiment.

This case is explained with reference to FIG. 14 and FIG. 16. Incidentally, in FIG. 16, the same steps as those in FIG. 15 have the same step reference numbers, and their explanation is omitted as occasion demands.

Again, in this case, the similar processing is performed, as is "the case of using the already prepared object" described above. Therefore, the following explanation is focused on the differences from this case.

In the case of receiving and recording the transport stream on air, the TS object data source 700 is provided with a receiver (set top box) for receiving the digital broadcast on air, for example, receives the TS object data D1, and transmits it to the formatter 608 in real time (step S41). At the same time, reception information D3 (i.e. information corresponding to the data transmitted through the receiver and the interface of the system controller 520) including the program construction information and the belowmentioned ES_PID information, which are deciphered upon receiving, is imported into the system controller 520 and is stored into the memory 530 (step S44).

In the meantime, the TS object data D1 outputted to the formatter 608 is outputted to the modulator 606 under the switching-control by the formatter 608 (step S42), and is recorded onto the optical disc 100 (step S43).

Along with these operations, using the program construction information and the ES_PID information included in the reception information D3 imported upon receiving and stored in the memory 530, the file system/logical structure data generator 521 prepares the logical information file data D4 (step S24 and step S25). Then, after the completion of recording a series of the TS object data D1, this logical information file data D4 is additionally recorded onto the optical disc 100 (step S46 and step S47). Incidentally, these steps S24 and S25 may be performed after the step S43.

Moreover, as the occasion demands (e.g. in the case of editing one portion of the title, or the like), by adding the user input I2 of the title information and the like from the user interface 720 to the program construction information and the ES_PID information stored in the memory 530, it is possible to prepare the logical information file data D4 by the system controller 520 and additionally record this onto the optical disc 100.

As described above, the information record reproduction apparatus 500 performs the record processing in the case of receiving the transport stream on air and recording it in real time.

Incidentally, if all the reception data obtained when broadcasting is once stored into an archive apparatus, and then, if this is used as the object source 700, the same processing as that in "the case of using the already prepared object" will do.

Figure 17:
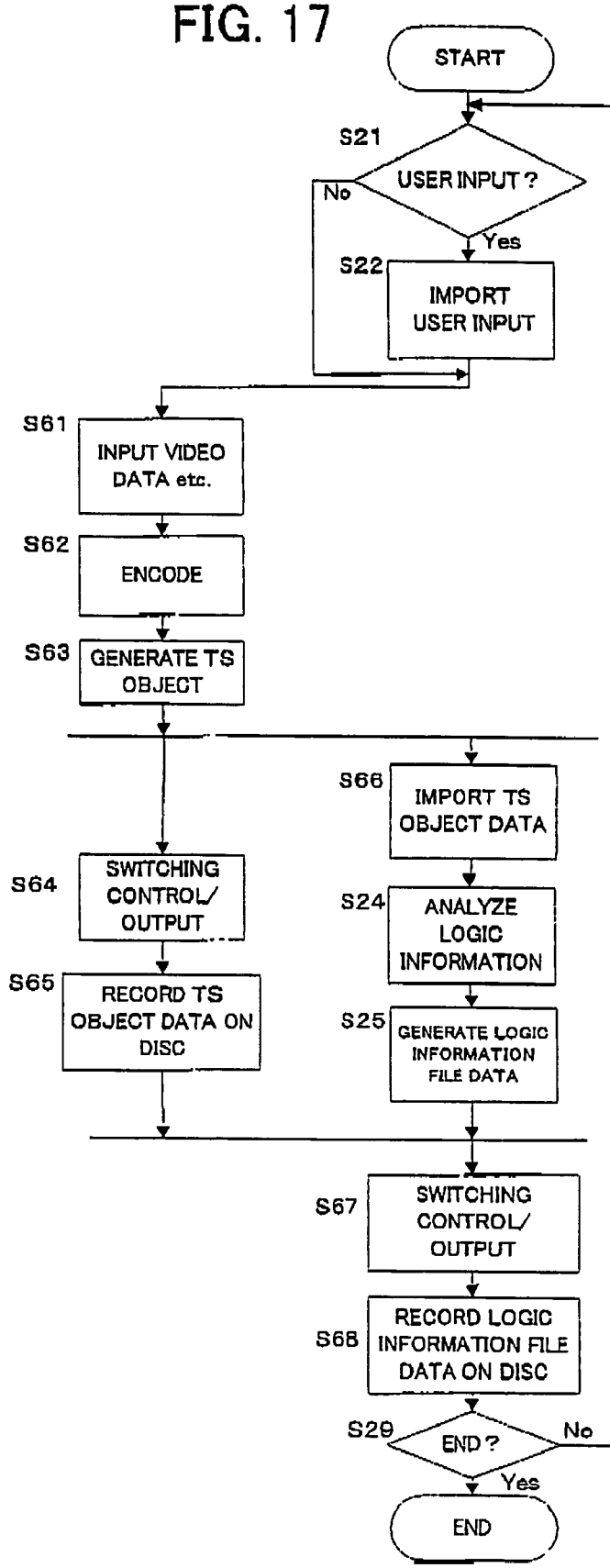
FIG. 17 is a flow chart indicating a recording operation (part 3) of the information record reproduction apparatus in the embodiment.

(i-3) The Case of Recording the Video Data, the Audio Data and the Sub-picture Data This case is explained with reference to FIG. 14 and FIG. 17. Incidentally, in FIG. 17, the same steps as those in FIG. 15 have the same step reference numbers, and their explanation is omitted as occasion demands.

In the case of recording the video data, the audio data, and the sub-picture data, which are individually prepared in advance, the video data source 711, the audio data source 712, and the sub-picture data source 713 are individually provided with the memory storage, such as a video tape and a memory, and store a video data DV, an audio data DA, and a sub-picture data DS, respectively.

These data sources are controlled by the control signal Sc8 giving an instruction for reading out the data from the system controller 520, and they transmit the video data DV, the audio data DA, and the sub-picture data DS, to the video encoder 611, the audio encoder 612, and the sub-picture encoder 613, respectively (step S61). Then, the video encoder 611, the audio encoder 612, and the sub-picture encoder 613 execute a predetermined type of encode processing (step S62).

The TS object generator 610 is controlled by a control signal Sc6 from the system controller 520 and converts the data encoded in this manner to the TS object data constituting the transport stream (step S63). In this case, the data array information of each TS object data (e.g. a record data length and the like) and the construction information of each elementary stream (e.g. the ES_PID, as described later, and the like) are transmitted as information I6 from the TS object generator 610 to the system controller 520 and are stored into the memory 530 (step S66).

On the other hand, the TS object data generated by the TS object generator 610 is transmitted to the ② side of the switch Sw1 of the formatter 608. Namely, when formatting the TS object data from the TS object generator 610, the formatter 608 is switching-controlled by the switch control signal Sc5 from the system controller 520 to shift the switch Sw1 to the ② side and the switch Sw2 to the ① side, thereby outputting the TS object data (step S64). Then, this TS object data is recorded onto the optical disc 100 through the modulator 606 (step S65).

Along with these operations, using the data array information of each TS object data and the construction information of each elementary stream imported as the information I6 into the memory 530, the file system/logical structure data generator 521 prepares the logical information file data D4 (step S24 and step S25). Then, after the completion of recording a series of the TS object data D2, the logical information file data D4 is additionally recorded onto the optical disc 100 (step S67 and step S68). Incidentally, the step S24 and the step S25 may be processed after the step S65.

Moreover, as the occasion demands (e.g. in the case of editing one portion of the title), by adding the user input I2 such as the title information and the like from the user interface 720 to these information stored in the memory 530, it is possible to prepare the logical information file data D4 by the file system/logical structure generator 521 and additionally record this onto the optical disc 100.

As described above, the information record reproduction apparatus 500 performs the record processing in the case of recording the video data, the audio data, and the sub-picture data, which are individually prepared in advance.

Incidentally, this record processing is applicable even when recording an arbitrary content the user has.

(i-4) The Case of Recording the Data by Authoring

Figure 18:
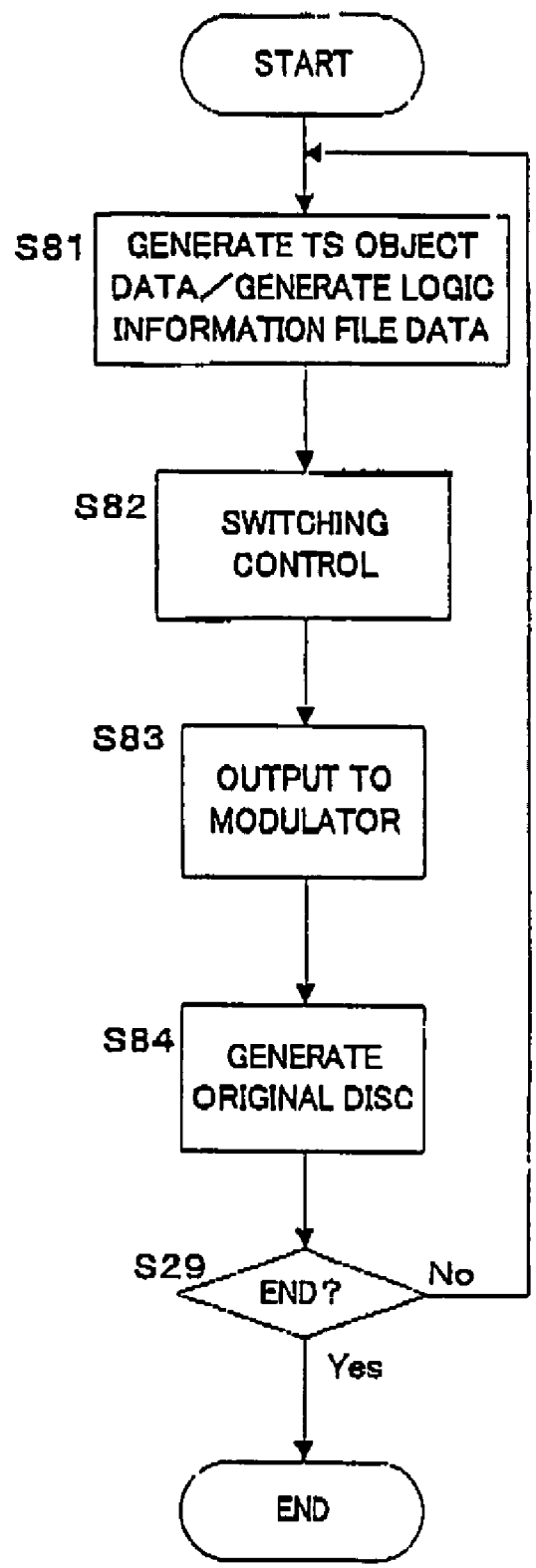
FIG. 18 is a flow chart indicating a recording operation (part 4) of the information record reproduction apparatus in the embodiment.

This case is explained with reference to FIG. 14 and FIG. 18. Incidentally, in FIG. 18, the same steps as those in FIG. 15 have the same step reference numbers, and their explanation is omitted as occasion demands.

In this case, by combining the above described three types of record processing in the three cases, an authoring system generates the TS object, the logical information file data, and the like in advance (step S81), and then completes the processing until switching-control performed at the formatter 608 (step S82). Then, the information obtained by this operation is transmitted, as the disc image data D5, to the modulator 606 equipped in front of and/or behind an original disc cutting machine (step S83), and this cutting machine prepares the original disc (step S84).

(ii) Structure and Operation in Reproduction System

Next, the specific structure and operation of each constitutional element constituting the reproduction system of the information record reproduction apparatus 500 is explained with reference to FIG. 14 and FIG. 19.

In FIG. 14, via the user interface 720, the title to be reproduced from the optical disc 100, its reproduction condition and the like are inputted to the system controller 520, as the user input I2 such as the title information and the like. In this case, under control of the control signal Sc4 from the system controller 520, the input processing suitable for the content to be reproduced, such as a selection on a title menu screen, can be achieved by the user interface 720.

Responding to this, the system controller 520 controls the disc reproduction with respect to the optical disc 100, and the optical pickup 502 transmits a reading signal S7 to the demodulator 506.

The demodulator 506 demodulates a recorded signal recorded onto the optical disc 100 from this reading signal S7, and outputs it as demodulated data D8. The logical information file data (i.e. the file system 105, the disc information file 110, the P list information file 120, and the object information file 130, shown in FIG. 3) included in this demodulated data D8 as being a not-multiplexed information part is supplied to the system controller 520. On the basis of this logical information file data, the system controller 520 executes various reproduction control, such as processing of determining a reproduction address and controlling the optical pickup 502.

On the other hand, depending on whether the TS object data is included as the multiplexed information part in the demodulated data D8, or whether the still picture data is included, or whether both data are included, the shift switch Sw3 is shifted to ① side (demultiplexer 508 side) or shifted to ② side (still decoder 515 side), under control of the control signal Sc10 from the system controller 520. Thereby, the TS object data is selectively supplied to the demultiplexer 508, and the still picture data is selectively supplied to the still picture decoder 515.

Then, as for the TS object data included as the multiplexed information part in the demodulated data D8, the demultiplexer 508 demultiplexes the TS object data, under control of the control signal Sc2 from the system controller 520. Here, when the access to the reproduction position address is terminated under the reproduction control by the system controller 520, the control signal Sc2 is transmitted to start the demultiplexing.

The video packet, the audio packet and the sub-picture packet are transmitted respectively from the demultiplexer 508 and supplied respectively to the video decoder 511, the audio decoder 512 and the sub-picture decoder 513. Then, the video data DV, the audio data DA and the sub-picture data DS are decoded, respectively. In this case, the sub-picture data DS is supplied to the adder 514 via the memory 540. The sub-picture data DS is outputted from the memory 540, selectively or at a predetermined timing, under control of the control signal Sc5 from the system controller 520, so as to be super-imposed on the video data DV, if needed. That is, in comparison with a case that the sub-picture data outputted from the sub-picture decoder 513 is directly super-imposed, it is easy to control the timing of the super-imposing, or to judge the need for the super-imposing. For example, under output control of the control signal Sc5, it is possible to select whether or not a caption using the sub-picture is displayed over the main picture, or whether or not a menu screen using the sub-picture is displayed.

Incidentally, although the packets obtained by packetizing the PAT or the PMT, included in the transport stream shown in FIG. 6, are included as a part of the demodulated data D8, respectively, they are discarded or abandoned at the demultiplexer 508.

The adder 514 is controlled by a control signal Sc3 giving an instruction of the mixing from the system controller 520, and mixes or superimposes in a predetermined timing the video data DV and the sub-picture data DS, which are respectively decoded at the video decoder 511 and the sub-picture decoder 513. The result is outputted as a video output from the information record reproduction apparatus 500 to a TV monitor, for example.

On the other hand, the audio data DA decoded at the audio decoder 512 is outputted as an audio output from the information record reproduction apparatus 500 to an external speaker, for example.

In the case that the still picture data is included in the decoded data D8, the still picture data is supplied to the still picture decoder 515, via the shift switch Sw3 controlled by the control signal Sc10 from the system controller 520, instead of or in addition to such a reproduction operation or processing of the video data DV or the sub-picture data DS. Then, the still picture data such as the decoded bit map data, JPEG data and the like is added to the adder 514 via the shift switch Sw4, without subjected to any processing, under control of the control signal Sc1 from the system controller 520. Alternatively, it may be temporarily stored in the memory 550 via the shift switch Sw4. The still picture data is outputted from the memory 550, selectively or at a predetermined timing, under control of the control signal Sc12 from the system controller 520, and then supplied to the adder 514 via the shift switch Sw5. Thereby, if needed, the video data DV or the sub-picture data DS is super-imposed over the still picture data or vice versa. That is, in comparison with a case that the still picture data outputted from the still picture decoder 515 is directly super-imposed, it is easy to control the timing of the super-imposing, or to judge the need for the super-imposing. For example, under output control of the control signal Sc12, it is possible to select whether or not a still picture such as a menu screen or a window screen using the still picture data or a still picture as a background image using the still picture data is displayed on the main picture of the sub-picture.

Additionally, under control of the control signal Sc13 from the system controller 520, the still picture data may be outputted via another route (not shown), with the aid of the shift switch Sw5 shifted to ② side. Alternatively, no still picture data may be outputted from the shift switch Sw5 shifted to ② side.

Here, the specific example of a reproduction processing routine by the system controller 520 is explained with reference to a flow chart of FIG. 19.

Figure 19:
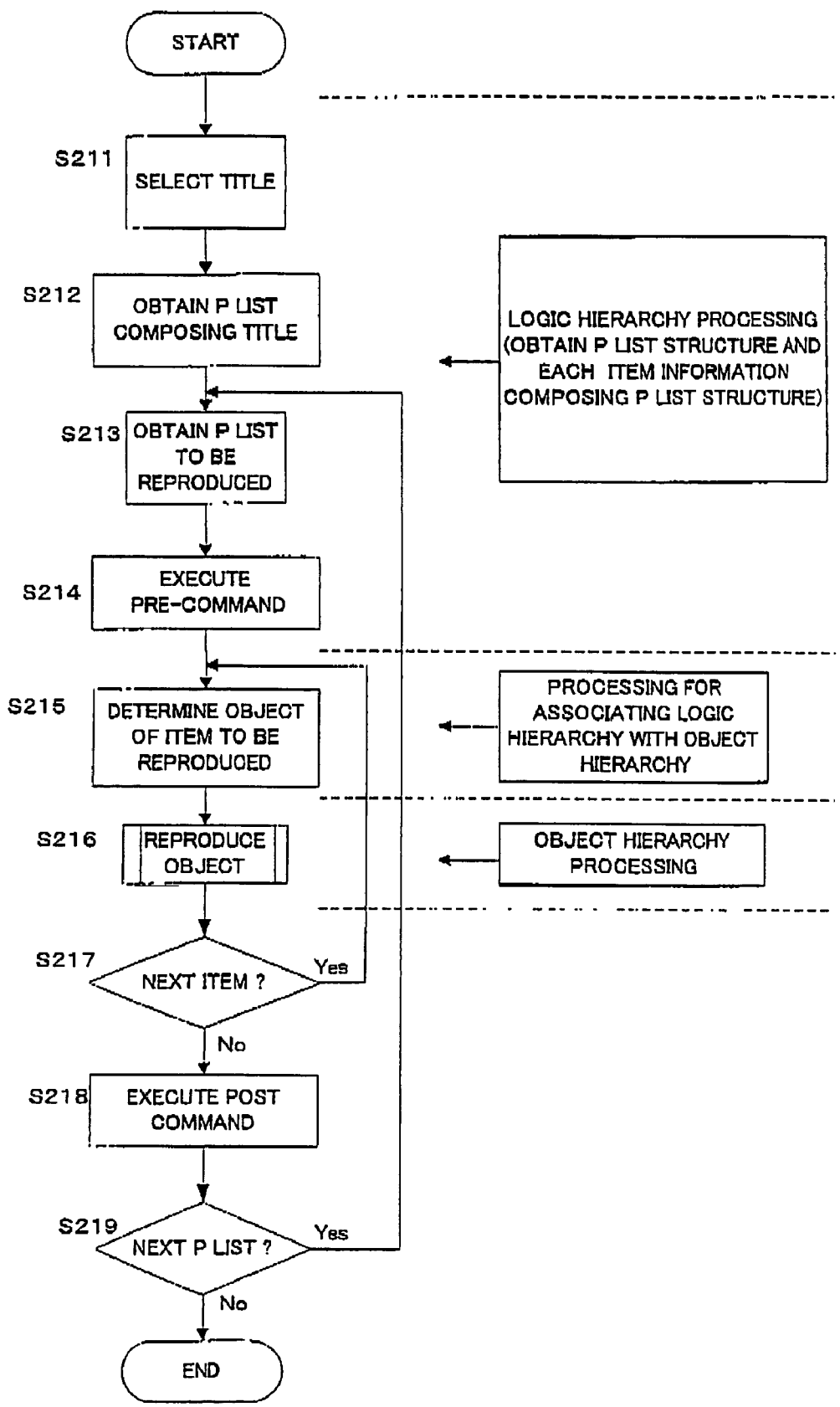
FIG. 19 is a flow chart indicating a reproduction operation of the information record reproduction apparatus in the embodiment.

In FIG. 19, it is assumed that as an initial condition, the recognition of the optical disc 100 in the reproduction system and the recognition of a volume structure and a file structure by the file system 105 (see FIG. 3) have been already completed by the system controller 520 and the file system/logical structure data reader 522 inside of the system controller 520. Here, an explanation is made on the operational flow after obtaining the total number of the total titles from the disc general information 112 in the disc information file 110 and then choosing or selecting one title from among them.

Firstly, the choice or selection of the title is performed via the user interface 720 (step S211). Responding to this, the system controller 520 obtains the information about the reproduction sequence from a reading result of the file system/logical structure data reader 522. Incidentally, in the selection of the title 200, the desired title element(s) 200-2 (see FIG. 4) may be selected from among a whole title elements 200-2 composing the title 200, with the aid of an external input operation by the user with using a remote controller and the like, or one title element 200-2 may be selected automatically depending on a system parameter or the like adjusted for the information record reproduction apparatus 500.

Then, contents of a plurality of play lists 126 composing a play list set 126S corresponding to the selected title 200 (title element 200-2) are obtained. Here, as a processing at a logic hierarchy, the information about the each play list 126 structure and each item composing each play list (see FIG. 5, FIG. 6 and FIG. 13) is obtained (step S212).

Then, contents of the play list 126 to be reproduced is obtained from among a plurality of play lists 126 obtained at step S212. For example, herein, the reproduction is started from a play list #1, and the contents of the corresponding play list 126 is obtained (step S213). The contents of the play list 126 may be one or more play list elements 126-2 (see FIG. 5), which are obtained by the obtaining processing at step S213.

Then, the pre-command 126PR (see FIG. 5) included in this play list 126 is executed (step S214). Incidentally, it is possible for the pre-command 126PR to select one from among a plurality of play lists 126, which composes the play list set 126S with a certain relationship of the plurality of play lists 126. If the play list element 126-2 composing the play list 126 does not have the pre-command 126PR, this processing is omitted.

Then, the TS object 142 (see FIG. 3 and FIG. 10) to be reproduced is determined (step S215), on the basis of the item 204 (see FIG. 5 to FIG. 7) identified by the play list 126 obtained at step S213. More specifically, on the basis of the item 204, the object information file 130 (see FIG. 3) relating to the TS object 142 as the reproduction target is obtained and a stream number, address and the like of the TS object 142 to be reproduced are identified.

Incidentally, in this embodiment, also the belowmentioned AU (Association Unit) information 132I and PU (Presentation Unit) information 302I are obtained as the information stored in the object information file 130. On the basis of these informations, the aforementioned logic hierarchy is associated with the object hierarchy (see FIG. 13).

Then, the reproduction of the TS object 142 determined at step S215 is actually started. That is, on the basis of the processing at the logic hierarchy, the processing at the object hierarchy is started (step S216).

During the reproduction of the TS object 142, it is judged whether or not the next item 204 composing the play list 126 to be reproduced exists (step S217). Then, insofar as the next item 204 exists (step S217: Yes), the process goes back to the step S215 to repeat the aforementioned determination and the reproduction of the TS object 142.

On the other hand, at the judgement at step S217, if it is judged that the next item 204 does not exist (step S217: No), the post command 126PS (see FIG. 5) corresponding to the presently executed play list 126 is executed (step S218). Incidentally, if the play list element 126-2 composing the play list 126 does not have the post command 126PS, this processing is omitted.

Then, it is judged whether or not the next play list 126 composing the selected title 200 exists (step S219). If exists (step S219: Yes), the process goes back to the step S213 to repeat the processings following obtaining the play list 126 to be reproduced.

On the other hand, at the judgement at step S219, if it is judged that the next play list 126 does not exist (step S219: No), i.e. if the all play lists 126 to be reproduced corresponding to the title 200 selected at step S211 are completely reproduced, a series of reproduction operations or processings is terminated.

As discussed above, the information record reproduction apparatus 500 in this embodiment reproduces the optical disc 100.

Particularly in the embodiment, in (i) Structure and Operation in Record System, explained above, the play list information file 120 is recorded such that the play list 126 includes the Item 204, which specifies the content information, and a slave Item, which specifies the menu information corresponding to each Item 204.

Particularly in the embodiment, in (ii) Structure and Operation in Reproduction System, explained above, the determination of the Item and the slave item associated with the reproduction is performed in determining the object in the step S215. Following this step, in the reproduction of the object in the step S216, while the menu is in a readily displayable condition by reproducing the menu by using the corresponding slave item during the title reproduction by the Item and the display output, the menu is displayed and outputted in response to the specification by the user and the like. By these, the menu display, such as small window display and semitransparent superimpose display, is immediately performed if the user desires or the similar case, with the title reproduction continued. On the other hand, if the user does not desire or the similar case, such a menu display is not performed. The selective menu display on a title screen performed by using the slave item, the sub picture, and the like as described above, will be described later in detail.

(Selection Method of Play List in Play List Set)

In the embodiment, the play list 126 corresponding to the desired content information is selected, as occasion demands, from the play list set 126S which is included in the reproduced play list information file 120.

With respect to such selection of the play list, the pre command 200PR (see FIG. 4) may be provided with a play list selection command group list in which a selection condition is described, for each play list 126, and the selection of the play list may be performed in accordance with this selection condition. It may be also performed in accordance with the attribute information appended to each play list 126 which is stored in the play list set 126S (e.g. information for indicating the attribute of the content information related to the play list, such as video resolution about a video function, distinction of progressive/interleave, a video codec, the number of audio channels, and an audio codec). Alternatively, it may be also performed in accordance with play list set control information, which is included in the title element 200-2, for storing the selection condition for each play list. By such selection, it is possible to select what corresponds to the desired content information, such as a desired show, a desired parental block, and a desired angle block. Alternatively, for example, it is possible to select such a play list that can be reproduced by the information reproduction system and that fully uses or maximizes the video reproduction function and the audio reproduction function owned by the information reproduction system.

(Control of Menu Display On Video Screen)

Next, with reference to FIG. 20 to FIG. 28, a menu which is selectively and immediately displayed according to a command (hereinafter referred to as a "menu display command" as appropriate) for indicating that the menu is displayed by a user's remote control operation or the like in an arbitrary area on the video screen by the title reproduction, will be explained.

In the embodiment, as occasion demands, such a menu is referred to as a "Dokodemo menu" (or "wherever and/or whenever displayable menu"). Namely, the "Dokodemo menu" is a menu displayed and outputted at an arbitrary position or in an arbitrary area specified in advance by the producer (or the author) of the contents or the like, on the video screen which is being displayed and outputted, by the title reproduction typically based on the video stream. The "Dokodemo menu" is a title menu directly related to the content of the title which is being reproduced (e.g. a menu for selecting and changing subtitle language, an angle, audio language, and the like, with respect to the title such as a movie which is being reproduced). Alternatively, the "Dokodemo menu" is indirectly related to the title which is being reproduced, such as a disc menu or the like associated with the entire optical disc 100 which is being reproduced or the entire titles (e.g. a menu for displaying the entire titles, performing audio selection and setting, which is to be default about the entire titles). The display or non-display of the "Dokodemo menu" on the video screen can be changed according to the menu display command by a user. Moreover, the "Dokodemo menu" is displayed on the basis of the object data for the "Dokodemo menu", which will be described later, and is a menu which is readily displayed according to the menu display command or the like by a user. Incidentally, the object data for the "Dokodemo menu" may be multiplexed and recorded as the sub picture stream together with the video stream of the video. Upon the reproduction of the "Dokodemo menu", typically, the title reproduction based on the video stream is continued as it is. However, this can be stopped temporarily.

Figure 22:
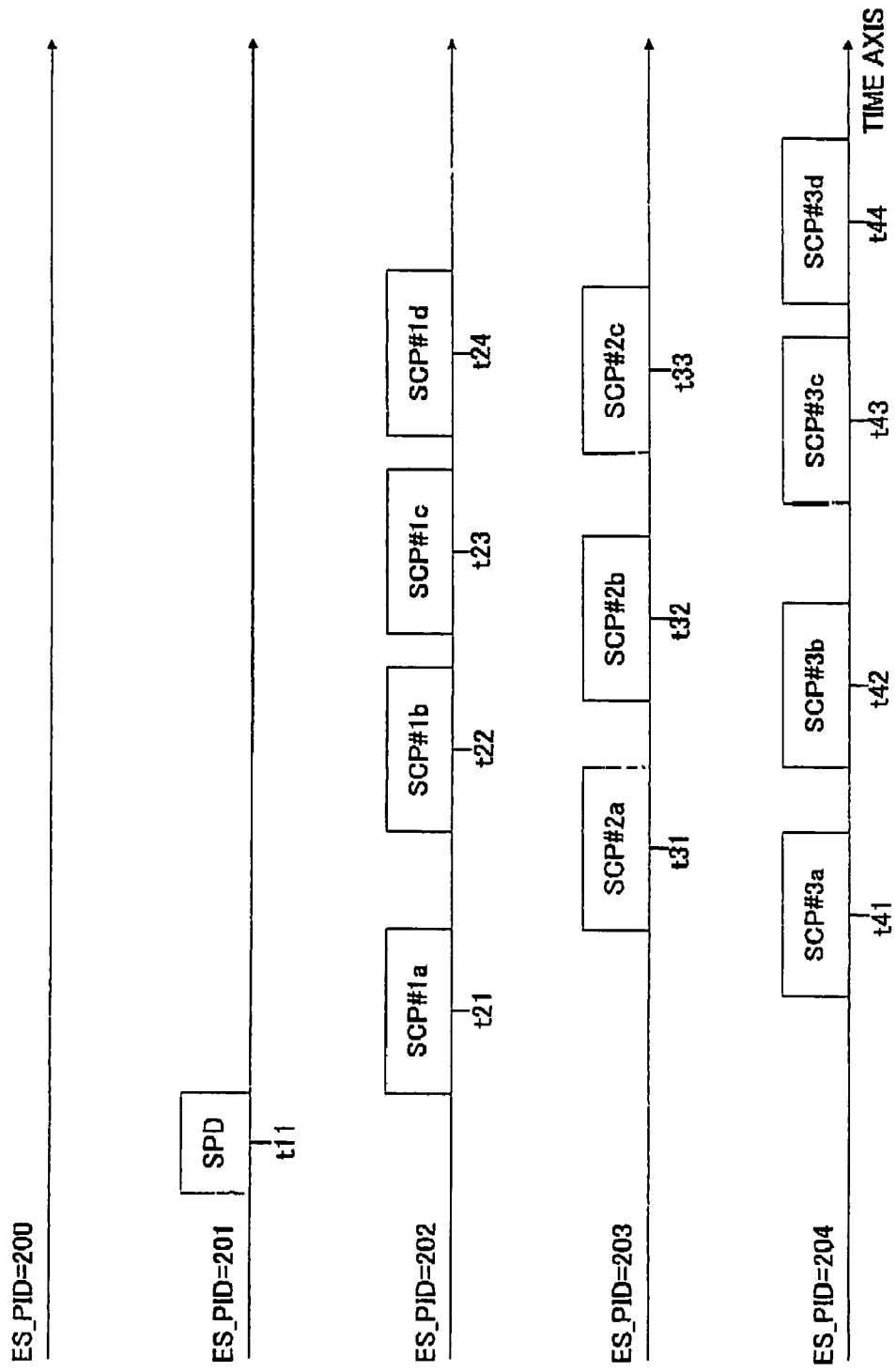
FIG. 22 is a schematic diagram showing a relationship among a SPD stream and a plurality of SCP streams, with respect to a reproduction time axis.

Firstly, with reference to FIG. 20 to FIG. 22, the structure and control of the sub picture data, which is used for display of such a "Dokodemo menu", will be explained. FIGS. 20 are conceptual diagrams showing one specific example of: a data structure of SP control information for controlling the sub picture data (FIG. 20(*a*)); and a SP data structure including SP data as being still-picture data, which constitutes a main body of the sub-picture data (FIG. 20(*b*)). FIGS. 21 are conceptual diagrams showing three types of sub-picture structures, constructed from the SP control information and the SP data structure shown in FIGS. 20. FIG. 22 is a schematic diagram showing a relationship between a SPD stream and a plurality of SCP streams, with respect to a reproduction time axis.

In the embodiment, in FIG. 14, the sub picture data decoded by the sub picture decoder 513 is temporarily stored in the memory 540 which functions as a buffer. Then, at least one of the SP data (Still Picture data) and the SP control information (Still Picture control data), which are included in the temporarily stored sub picture data, are controlled by the control signal Sc5 from the system controller 520, to be thereby read out. Then, by operating the SP control information onto the SP data, the display of a still picture is performed as part or all of the video output.

As shown in FIG. 20(*a*), SP control information 721 has a SCP header and a SF control parameter. The "SCP header" is provided with a SP data identifier for identifying the SP data which is regarded as a control object by the SP control information 721, information for indicating a record position of the SP data, and the like. The "SF control parameter" is provided with various parameters for controlling the SP data by a unit of sub frame (SF) which is an image portion cut out as at least one portion of the image defined by the SP data. More specifically, it has parameters for indicating a display start time point and a display end time point of the SF data by using PTS (Presentation Time Stamp) or the like. Moreover, it has various parameters for indicating conditions, such as a display time length, a cut out range of the sub picture and its configuration in displaying, magnification and reduction in scale, rotation and so on.

As shown in FIG. 20(*b*), a SP data structure 722 has structure information and SP data (an entity of the still picture data). The "structure information" is provided with a SP data identifier, information about the length of the SP data, and the like. The "SP data" has image data or the like, in a bit map data format or in a JPEG format, which is run length encoded for example.

Thus, at the reproduction of the sub picture data, various reproduction controls using the sub frame are performed on the basis of the SF control parameter shown in FIG. 20(*a*), by the unit of sub frame in which at least one portion of the SP data shown in FIG. 20(*b*) is cut out.

As shown in FIGS. 21, the SP control information 721 and the SP data structure 722 are packetized into a plurality of TS packets 146 (refer to FIG. 10) and multiplexed. The TS packet 146 for storing therein the head portion of the SP control information 721 in the sub picture structure is referred to as a "SCP", and the TS packet 146 for storing therein the head portion of the SP data structure 722 in the sub picture structure is referred to as a "SPD".

As shown in FIG. 21(*a*), both the SP control information 721 including the SCP and the SP data structure 722 may be regarded as one sub picture structure and divided into the plurality of TS packets 146. As shown in FIG. 21(*b*), the SP control information 721 including the SCP may be regarded as one sub picture structure and divided into the plurality of TS packets 146. As shown in FIG. 21(*c*), the SP data structure 722 including the SPD may be regarded as one sub picture structure and divided into the plurality of TS packets 146.

In the embodiment, for example, with respect to the SP data in the SP data structure 722 recorded on a SPD stream, the SP control information recorded on a SCP stream different from this SPD stream is operated, to thereby perform the reproduction control of the still picture. In this case, there may be only one or a plurality of SCP streams which operates with respect to one SPD stream. Recording the two types of streams onto mutually different elementary streams allows efficient reproduction control. Moreover, operating a plurality of SP control information on a plurality of SCP streams, with respect to the SP data on one SPD stream, allows more efficient reproduction control.

More specifically, as shown in FIG. 22, at a time point t11 during the reproduction of a video stream (Video 1) of "ES_PID=200", the reading of the SP data (SPD1) on a SPD stream of "ES_PID=201" is started, and it is stored into the memory 540 of the information record reproduction apparatus 500 (refer to FIG. 14). Then, the stored SP data is stored until a set end time point, for example, or is stored until the reading a next sub picture is started.

In FIG. 22, on a SCP stream (SCP1) of "ES_PID=202", SCP#1a, SCP#1b, SCP#1c, and SCP#1d are provided in timing of a time point t21, a time point t22, a time point t23, and a time point t24, respectively. On a SCP stream (SCP2) of "ES_PID=203", SCP#2a, SCP#2b, and SCP#2c are provided in timing of a time point t31, a time point t32, and a time point t33, respectively. On a SCP stream (SCP3) of "ES_PID=204", SCP#3a, SCP#3b, SCP#3c, and SCP#3d are provided in timing of a time point t41, a time point t42, a time point t43, and a time point t44, respectively.

However, in addition to such reproduction control of the still picture, it is possible that with respect to the SP data in the sub picture data structure recorded on the sub picture stream, the SP control information in the sub picture structure recorded on the same stream is operated, to thereby perform the reproduction control of the still picture. Namely, both the SP control information 721 and the SP data structure 722 may be recorded into only one sub picture stream, to thereby operate the SP control information 721 to the SP data structure 722.

In any case, by sharing or using many times the SP data provided as the bit map data and JPEG data which have a large data amount, it is possible to save a limited recording capacity on the disc, which allows more efficient reproduction and display processing. In addition, in any case, it is possible to superimpose such a sub picture onto a moving picture or video which is based on the video data recorded in another video stream.

Figure 24:
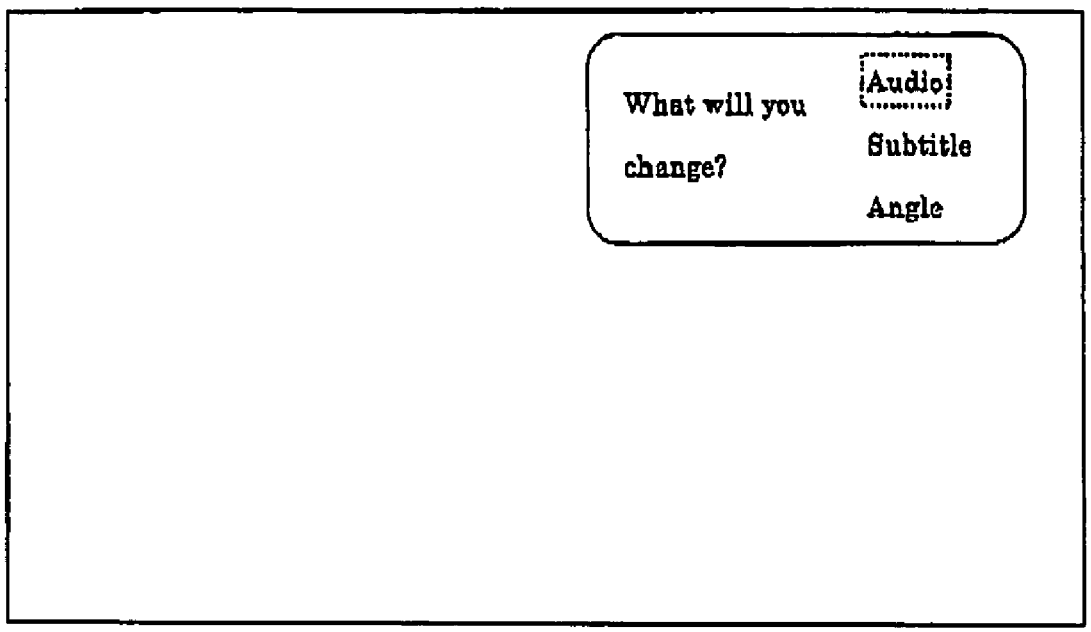
FIG. 24 is a plan view showing a display example on a "Dokodemo menu (i.e. wherever and/or whenever (anytime) menu)" screen in the embodiment.
Figure 25:
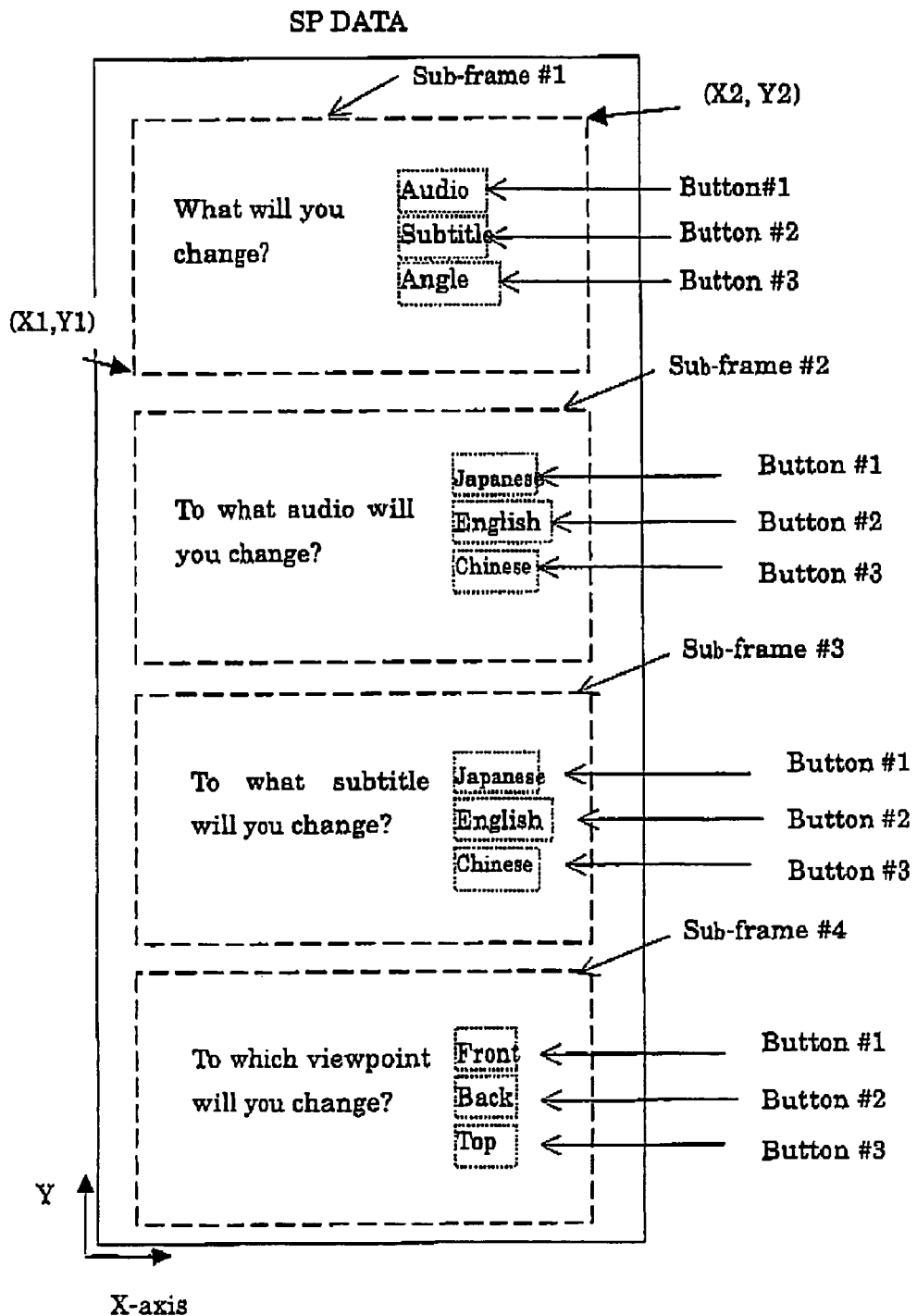
FIG. 25 is a conceptual diagram showing that the sub frame is cut out of the SP data (the still-picture data), on the basis of the SP control information, in order to reproduce and display the "Dokodemo menu" shown in FIG. 24, in the embodiment.

Next, with reference to FIG. 23 to FIG. 25, the sub frame (SF), used to display such a "Dokodemo menu", will be explained. FIG. 23 is a conceptual diagram showing the structure of object data related to the sub frame. FIG. 24 is a plan view showing a display example on a "Dokodemo menu" screen. FIG. 25 is a conceptual diagram showing that the sub frame is cut out of the still-picture data, on the basis of the control information, in order to reproduce and display the "Dokodemo menu" shown in FIG. 24.

As shown in FIG. 23, the object data for the "Dokodemo menu" includes: (i) comprehensive information related to the entire object data; (ii) one still picture data; and (iii) a sub frame information table provided with a plurality of sub frame informations each being information for cutting out one portion of the still picture data as the sub frame and performing various control processing with respect to the cut sub frame. Incidentally, if the object data for the "Dokodemo menu" is recorded as the sub picture stream, for example, the above-described information (i) and (iii) are recorded as the SP control information, and the above-described information (ii) is recorded as the SP data structure.

Among them, the "comprehensive information" has the total number (n) of the sub frames and the like.

The "sub frame information table" is constructed as an information table which includes: various sub frame information for each of the sub frame #1, . . . , the sub frame #n; and other information. For each sub frame #i (i=1, . . . , n), it has coordinates information for specifying a cut out range of the still picture data of the sub frame #i (e.g. coordinates information about opposite two corners and four corners with respect to a rectangle sub frame), information for indicating the total number 1 of buttons for menu selection and setting, button information 1 to #1, and the like. Here, the "button information" has coordinates information for specifying an area which functions as the button for menu selection and setting in the sub frame, and a button command for indicating a command to be executed if the button is operated.

Moreover, the "SP data" is a main body of the still picture data, such as bit map data and JPEG data.

One sub frame constructed in the above manner corresponds to the "Dokodemo menu" screen displayed at a time.

For example, as shown in FIG. 24, on the basis of one sub frame, the "Dokodemo menu" screen is displayed as a small window, on the display screen of the information record/reproduction apparatus 500. Here, the "Dokodemo menu" provided with the sub frame is superimposed and displayed around an upper right corner of the video screen provided with contents, such as a movie. In addition, on this "Dokodemo menu", three buttons for changing "audio", "subtitles", and "angle" as a title menu are displayed in order from the top in FIG. 24. Upon the display of such a "Dokodemo menu", the content, such as a movie (e.g. angle-changeable contents), which is being reproduced when a menu display command or the like is issued by a user are continuously displayed, as it is, without stopping the operation. This is because the content, such as a movie, constituting the video screen is specified by the (master) Item 204 and is displayed by the video stream as a main pass, while the "Dokodemo menu" is displayed as a sub pass by the sub picture stream which is another stream specified by the slave item, or for similar reasons. A specific data structure related to the (master) Item 204 and the slave item as described above will be described in detail later (refer to FIG. 25, FIG. 35, and FIG. 36).

A plurality of the "Dokodemo menus" which use such a sub frame can be prepared from one SP data.

Namely, it is assumed that there is the object data for the "Dokodemo menu" related to one still picture data as shown in FIG. 25. In this case, with respect to the one still picture data, four sub frames are defined in different areas. Namely, sub frames #1, #2, #3, and #4 are defined in order from the top in FIG. 25. In each of these sub frames, three buttons are defined. Namely, buttons #1, #2, and #3 are defined in each sub frame in order from the top in FIG. 25.

Here, for example, it is assumed that the sub frame #1 is used when the "Dokodemo menu" is firstly displayed according to the menu display command by a user or the like. In this case, in the button command of the button #1 of the sub frame #1, a command for "displaying the sub frame #2" is set. In the button command of the button #2 of the sub frame #1, a command for "displaying the sub frame #3" is set. In the button command of the button #3 of the sub frame #1, a command for "displaying the sub frame #4" is set.

If each information is set as described above, if as shown in FIG. 24, the button #1 (i.e. an "audio" button) is selected by a user when the "Dokodemo menu" by the sub frame #1 is displayed on an actual screen, the display is changed to the "Dokodemo menu" by the sub frame #2. Moreover, if in this condition, the button #2 (i.e. an English button) is selected by the user, the change to an English sound can be performed in accordance with the button operation on the "Dokodemo menu", by writing in advance a command for indicating "the change of the audio stream number to an audio stream number corresponding to the English sound", for example. Even during the button operation on the "Dokodemo menu" described above, the contents, such as a movie, constituting the video are continuously reproduced without interruption. Moreover, at this time, a change may be applied to the contents which are being reproduced, according to the button operation, such as an audio change, a subtitle change, and an angle change, on the "Dokodemo menu". Alternatively, various changes according to such a button operation may be applied collectively when the "Dokodemo menu" is finished.

Next, with reference to FIG. 26, a specific structure of the play list information table, used to display such a "Dokodemo menu", will be explained. FIG. 26 is a conceptual diagram showing one specific example of the play list information file, which can particularly display the "Dokodemo menu".

In FIG. 26, the play list information table includes: play list comprehensive information; a play list pointer table; and a play list #i (1, 2, . . . ) information table.

Among them, the "play list comprehensive information" has overall information about the entire play list information table, such as a play list size and the total number of the play lists.

The "play list pointer table" has a play list #i (1, 2, . . . ) pointer for indicating the storage address of play list #i (1, 2, . . . ) information.

The "play list #i information table" has: (i) play list #i (1, 2, . . . ) comprehensive information; (ii) a play list #i (1, 2, . . . ) Item information table; and (iii) a play list #i (1, 2, . . . ) slave item information table.

Namely, in the embodiment, particularly, the play list #i information table is divided into: the play list #i (1, 2, . . . ) Item table, provided with Item information which constitutes the play list information for defining a reproduction sequence about the video stream for display of the video; and the play list #i (1, 2, . . . ) slave item table, provided with Item information (or slave item information, if needed, in the embodiment) which constitutes the play list information for defining a reproduction sequence for display of the "Dokodemo menu" or the like. In other words, in the embodiment, the play list for displaying the video as the main pass is provided with a plurality of Items (or master Items). On the other hand, the play list for displaying the "Dokodemo menu" as the sub pass is constructed from a plurality of slave items.

The "play list #i comprehensive information" has the total number (which is "3" in this example) of Items which constitute the play list #i, and information for specifying the "Dokodemo menu" which is default. In this example, the "Dokodemo menu" which is default is maintained as a slave item information number (which is #1 in this example). Incidentally, "the "Dokodemo menu" which is default" indicates default that is commonly used in a plurality of (master) Items or a (master) Item in which the slave item related to the "Dokodemo menu" is not registered.

The "play list #i Item information table" is provided with Item information #i (three Item information in this example). Each Item information has information for indicating a relevant AU number in the AU table in the object information file 130, the presence or absence of the slave item information or its number, the type of the slave item information if there is the slave item information (e.g. a type having the "Dokodemo menu", and other types), a start time point of the object data corresponding to the relevant Item, a display time length, and relative display coordinates with respect to the video screen.

The "play list #i slave item information table" is provided with slave item information #i (three slave item information in this example). Each slave item information has information for indicating the type of the slave item information (e.g. a type having the "Dokodemo menu", and other types), and the relevant AU number in the AU table in the object information file 130.

As described above, if the object data is reproduced on the basis of the play list information table which is divided into the Item information (i.e. the master Item information) and the slave item information, the "Dokodemo menu" can be displayed, if desired, on the video screen as the sub pass, in accordance with the menu display command or the like by a user, while the content, such as a movie, constituting the video screen is displayed as the main pass.

Moreover, in writing the sub frame information (refer to FIG. 23), it is possible to arbitrarily set a range (coordinates) in which the sub frame is cut out on the still picture data, in accordance with the contents author's will. Furthermore, in writing the play list information (refer to FIG. 26), it is possible to arbitrarily set a range (coordinates) in which the sub frame is to be displayed with respect to the video, in accordance with the contents author's will. These allow various types of menus (i.e. the "Dokodemo menus") to be displayed in various places.

Figure 27:
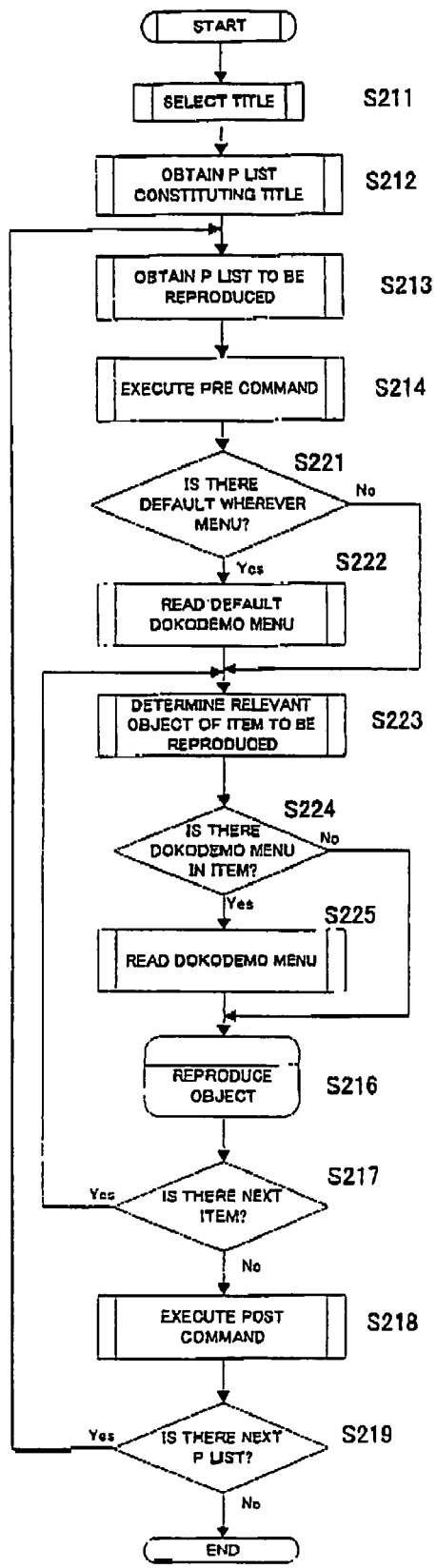
FIG. 27 is a flowchart showing processes for determining the object of the Item to be reproduced, in the embodiment.
Figure 28:
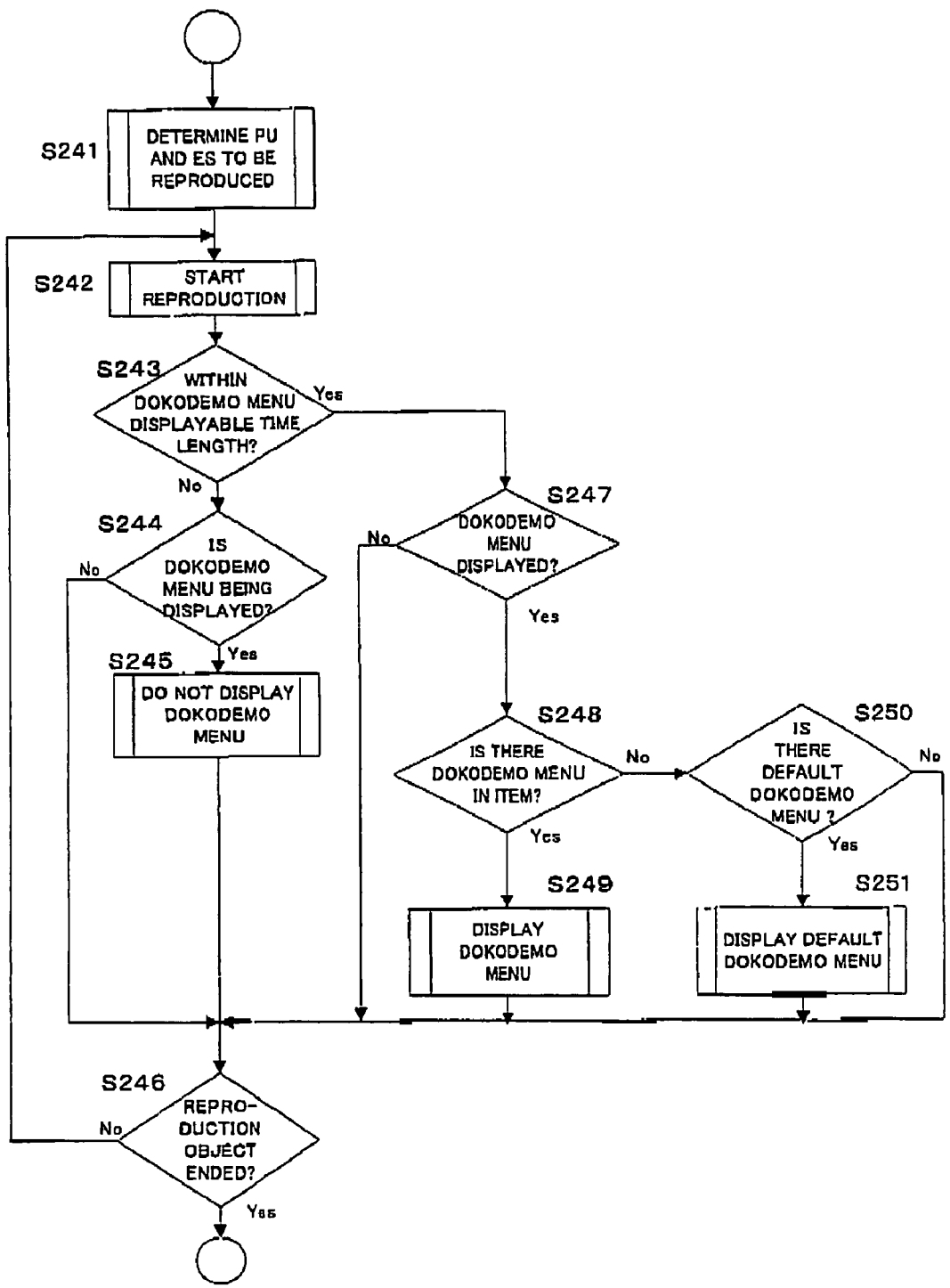
FIG. 28 is a flowchart showing processes for reproducing the object, in the embodiment.

Next, with reference to FIG. 27 and FIG. 28, processes on the information record reproduction apparatus 500 which are performed in displaying such a "Dokodemo menu" will be explained. FIG. 27 is a flowchart showing the detail of the processes for determining the object of the Item to be reproduced (including the Item and the slave item), which are performed as a part of the process in the step S215 shown in FIG. 19. FIG. 28 is a flowchart showing the processes for reproducing the object (including those individually specified by the Item and the slave item), which are performed as a part of the process in the step S216 shown in FIG. 19 and FIG. 27. Incidentally, in FIG. 27, the same steps as those shown in FIG. 19 carry the same reference numerals and the detailed explanations of them are omitted.

In FIG. 27, after the processes in the same steps S211 to S214 as those shown in FIG. 19 are performed, it is judged whether or not there is the "Dokodemo menu" which is default, by referring to the play list information table illustrated in FIG. 26 (step S221). If there is the "Dokodemo menu" which is default (the step S221: Yes), the object data for the "Dokodemo menu", illustrated in FIG. 23 to FIG. 25, is read as the "Dokodemo menu" which is default (step S222). Then, the operational flow goes to a step S223. On the other hand, in the step S221, if there is not any "Dokodemo menu" which is default (the step S221: No), the operational flow directly goes to the step S223.

Then, on the basis of the play list Item information illustrated in FIG. 26, the relevant object of the Item to be reproduced is determined (the step S223). Then, it is judged whether or not there is the "Dokodemo menu" in the Item (step S224). If there is the "Dokodemo menu" (the step S224: Yes), the slave item corresponding to the existing "Dokodemo menu" is read (step S225). Then, the operational flow goes to a step S216. In the judgment in the step S224, if there is not any "Dokodemo menu" (the step S224: No), the operational flow directly goes to the step S216.

Then, the reproduction of the relevant object is performed (the step S216). More specifically, the contents, such as a movie, constituting the video are reproduced as the main pass in accordance with the Item information (the master Item information), and if there is the "Dokodemo menu" this is reproduced as the sub pass. Incidentally, if the object data for the "Dokodemo menu" is multiplexed and recorded as the sub picture stream together with the video stream constituting the video, the object data for the "Dokodemo menu" may be read at the same time of the reproduction of the relevant object data (the step S216) in place of the step 222 and the step S225.

Then, the same judgment in the step S217 as that shown in FIG. 19 is performed, and if there is a next Item (the step S217: Yes), the operational flow returns to the step S223 and subsequent processes are repeated in the embodiment.

Next, with reference to FIG. 28, the detail of processes related to the reproduction of the object in the embodiment (i.e. the processes in the step S217 in FIG. 19 and FIG. 27) will be explained.

In FIG. 28, firstly, the PU (Presentation Unit) and ES (Elementary Stream) to be reproduced are determined by referring to the AU table 131 and the ES map table 134 (refer to FIG. 3) (step S241). Then, the reproduction of the TS object is started in accordance with the determined PU and ES (step S242).

Then, it is judged whether or not it is within a "Dokodemo menu" displayable time length, by referring to the play list illustrated in FIG. 26 (step S243). If it is not within the "Dokodemo menu" displayable time length (the step S243: No), then, it is judged whether or not the "Dokodemo menu" is currently being displayed in accordance with the menu display command by a user or the like (step S244). Here, if the "Dokodemo menu" is being displayed (the step S244: Yes), the currently-displayed "Dokodemo menu" is set not to display it (step S245). Then, the operational flow goes to a step S246. On the other hand, in the judgment in the step S244, if the "Dokodemo menu" is not being displayed (the step S244: No), the operational flow directly goes to the step S246.

On the other hand, in the judgment in the step S243, if it is within the "Dokodemo menu" displayable time length (the step S243: Yes), then, it is judged whether or not the "Dokodemo menu" is currently to be displayed in accordance with the menu display command by a user or the like (step S247). Here, if the "Dokodemo menu" is to be displayed (the step S247: Yes), it is judged whether or not there is the "Dokodemo menu" by referring to the play list (step S248). Here, if there is the "Dokodemo menu" (the step S248: Yes), this "Dokodemo menu" is displayed (step S249). Namely, the "Dokodemo menu" constructed form the sub picture which is continuously reproduced as the sub pass is displayed and outputted. Then, the operational flow goes to the step S246. On the other hand, in the judgment in the step S247, if the "Dokodemo menu" is not to be displayed (the step S247: No), the operational flow directly goes to the step S246.

On the other hand, in the judgment in the step S248, if there is not any "Dokodemo menu" (the step S248: No), then, it is judged whether or not there is the "Dokodemo menu" which is default (step S250). If there is the "Dokodemo menu" which is default (the step S250: Yes), this "Dokodemo menu" which is default is displayed (step S251). Then, the operational flow goes to the step S246. On the other hand, in the judgment in the step S250, if there is not any "Dokodemo menu" which is default (the step S250: No) the operational flow directly goes to the step S246.

Then, in the step S246, it is judged whether or not the reproduction of the object to be reproduced is ended. If it is not ended (the step S246: No), the operational flow returns to the step S242, and the subsequent processes are repeated. On the other hand, if it is ended (the step S246: Yes), a series of processes is ended.

As explained with reference to FIG. 28, in the embodiment, if in the reproduction of the object, there is "the Dokodemo menu" which is default or for each Item, this is continuously reproduced as the sub pass, so that the display and output thereof can be immediately performed in accordance with the menu display command by a user or the like. Moreover, if it is unnecessary to display and output the object data for the "Dokodemo menu", it is continuously only reproduced or maintained as the sub pass, and does not particularly interrupt the display of the video.

As explained in detail with reference to FIG. 20 to FIG. 28, according to the embodiment, it is possible to display the "Dokodemo menu", such as small window display or semitransparent superimpose display, while the title is continuously displayed and outputted, for example. Obviously, the menu selection on the displayed "Dokodemo menu" is also allowed. Such a "Dokodemo menu" can be displayed at an arbitrary position on the title screen in accordance with the contents author's will or the like. Moreover, it is possible to display it only when needed, in accordance with the menu display command by a user or the like. Furthermore, it is possible to display it immediately with respect to the menu display command or the like.

(Access Flow On Reproduction)

Figure 29:
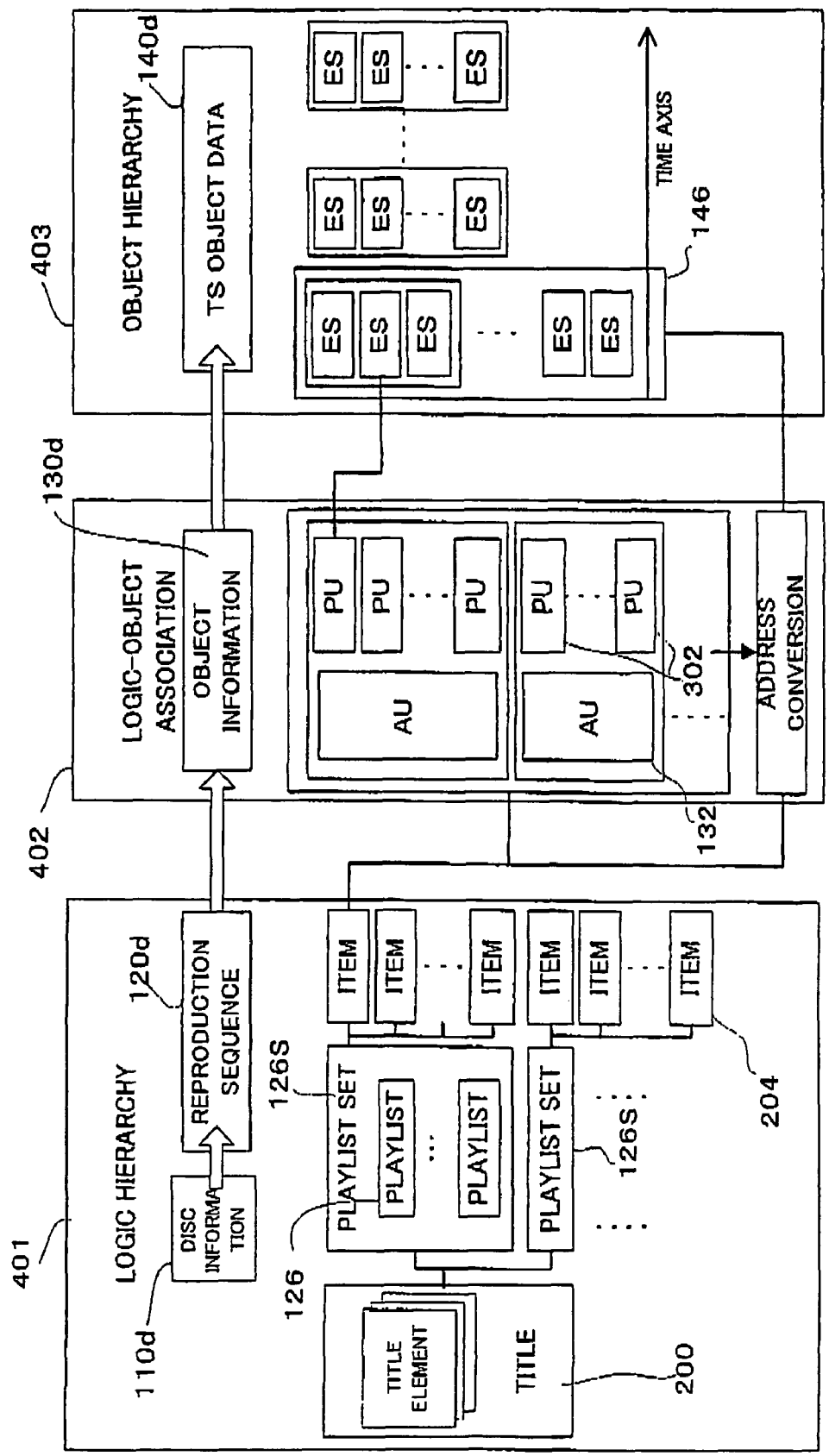
FIG. 29 is a view conceptually illustrating a general flow of an access during a reproduction in the embodiment, showing in association with a logic structure of an optical disc.

Next, with reference to FIG. 29, the access flow on reproduction by the information record reproduction apparatus 500, employing the AU information 132 and the PU information 302, is explained as one of the features of this embodiment, with the logical structure of the optical disc 100. FIG. 29 schematically illustrates an entire access flow on reproduction, in relation to the logical structure of the optical disc 100.

In FIG. 29, the logical structure of the optical disc 100 is categorized roughly into the following three hierarchies: a logic hierarchy 401; an object hierarchy 403; and a logic-object association hierarchy 402 mutually associating those two hierarchies.

Among them, the logic hierarchy 401 is a hierarchy for logically specifying various logical information to reproduce the desired title during the reproduction, as well as the play list (P list) to be reproduced and its constitutional contents. In the logic hierarchy 401, disc information 110d indicating the entire titles 200 and the like on the optical disc 100 is written within the disc information file 110 (see FIG. 3), and further, reproduction sequence information 120d of the entire contents on the optical disc 100 is written within the play list information file 120 (see FIG. 3). More specifically, the construction of one or more play list sets 126S is written, as the reproduction sequence information 120d, respectively for one or more title elements 200-2 included in each title 200. Furthermore, each play list set 126S includes one or more play lists 126, in each of which the construction of one or more items 204 (see FIG. 13) is written. Then, at the time of the access during the reproduction, the logic hierarchy 401 as described above specifies the title 200 to be reproduced, the play list 126 corresponding to this, and further the item 204 corresponding to this.

Next, the logic-object association hierarchy 402 is a hierarchy for specifying the attribute and the physical storage address of the TS object data 140d to be reproduced, so as to specify the combination and/or the construction of the TS object data 140d as the entity data and perform an address conversion to the object hierarchy 403 from the logic hierarchy 401, on the basis of the information specified in the logic hierarchy 401 as described above. More specifically, in the logic-object association hierarchy 402, the object information data 130d, which separates a group of the contents composing each item 204 into units of the AU 132 and which finely separates each AU 132 into units of the PU 302, is written in the object information file 130 (see FIG. 3).

Here, the "PU (Presentation Unit) 302" is a unit associating and uniting a plurality of elementary streams by the reproduction switchable unit. If there are three audio streams in the PU 302, the user can freely switch these three audio (e.g. audio for each language), during the reproduction of this vision.

On the other hand, the "AU (Associate Unit) 132" is a unit uniting a plurality of elementary streams such as video streams in the TS object used in one title, and made of one or more PUs 302. More specifically, it is a unit uniting the elementary stream packet IDs (ES_PID) for each TS object, indirectly via the PU 302. This AU 132 corresponds to an assembly made of a plurality of programs having a specific inter-relationship in view of the contents, such as a plurality of programs switchable to each other in the multi-source broadcasting. The PUs 302 belonged to the same AU 132 corresponds to one or more elementary stream assemblies each constructing a plurality of programs switchable to each other by the user operation during the reproduction.

Therefore, if the AU 132 to be reproduced is identified, and the PUs belonged to the AU are identified, the elementary stream to be reproduced is identified. That is, a desired elementary stream can be reproduced from the multi-recorded optical disc 100, without using the PAT or the PMT shown in FIG. 12.

Incidentally, a further specific data structure of the AU information 132I and the PU information 302I, each defining the AU 132 and the PU 302, is discussed later in detail.

The elementary stream to be actually reproduced herein is identified or designated by the ES_PID that is a packet ID (see FIG. 12) of the elementary stream, on the basis of the PU information 302. At the same time, the information indicating the start time point and the end time point of the reproduction is converted to the elementary stream address information, and thereby the contents in a specific area (or a specific time range) of a specific elementary stream is reproduced.

Thus, in the logic-object association hierarchy 402, an address conversion is performed from a logical address relating to each item 204 to a physical address relating to each PU 302.

Next, the object hierarchy 403 is a physical hierarchy to reproduce the actual TS object data 140*d*. In the object hierarchy 403, the TS object data 140*d* is written within the object data file 140 (see FIG. 3). More specifically, TS packets 146 constructing a plurality of elementary streams (ES) are multiplexed at every time point. The multiplexed packets are disposed on the time scale to form a plurality of elementary streams (see FIG. 11). Then, a plurality of TS packets multiplexed at each time point is associated with a PU 302 identified by the logic-object association hierarchy 402, for each elementary stream. Incidentally, it is possible to associate a plurality of PUs 302 with one elementary stream (e.g. one elementary stream relating to the same audio data is shared, or one elementary stream relating to the same sub-picture data is shared, among a plurality of switchable programs).

Thus, in the object hierarchy 403, the object data is actually reproduced, using the physical address obtained from the conversion in the logic-object association hierarchy 402.

As described above, the three hierarchies shown in FIG. 29 allow making an access to the optical disc 100 during the reproduction.

Incidentally, in FIG. 29 and in the explanation, both the Item other than the slave item and the slave item are included in the "Item 204" and illustrated for convenience. Namely, the association between the logical hierarchy 401 and the logic-object associating hierarchy 402 is as shown with the Item 204, even in the case of the Item other than the slave item, and in the case of the slave item.

(Structure of Each Information File)

Now, an explanation is made on a specific example of a data structure of various information files constructed on the optical disc 100 in this embodiment, i.e. the data structure of (1) the play list information file 120 and the disc information file 110 discussed with reference to FIG. 3, and (2) the object information file 130, with reference to FIG. 30 to FIG. 37.

(1) Disc Information File and Play List Information File

With reference to FIG. 30 to FIG. 36, an explanation is made on each constitutional element and a hierarchy structure therebetween or thereamong in specific examples of these files. FIG. 30 to FIG. 36 are conceptual diagrams, schematically showing the hierarchy structures of these files. Incidentally, in FIG. 30 to FIG. 36, the same file, data, information, and the like as those already explained with reference to FIG. 3 to FIG. 9 and the like carry the same reference numerals, and the detailed explanations of them are omitted.

Figure 30:
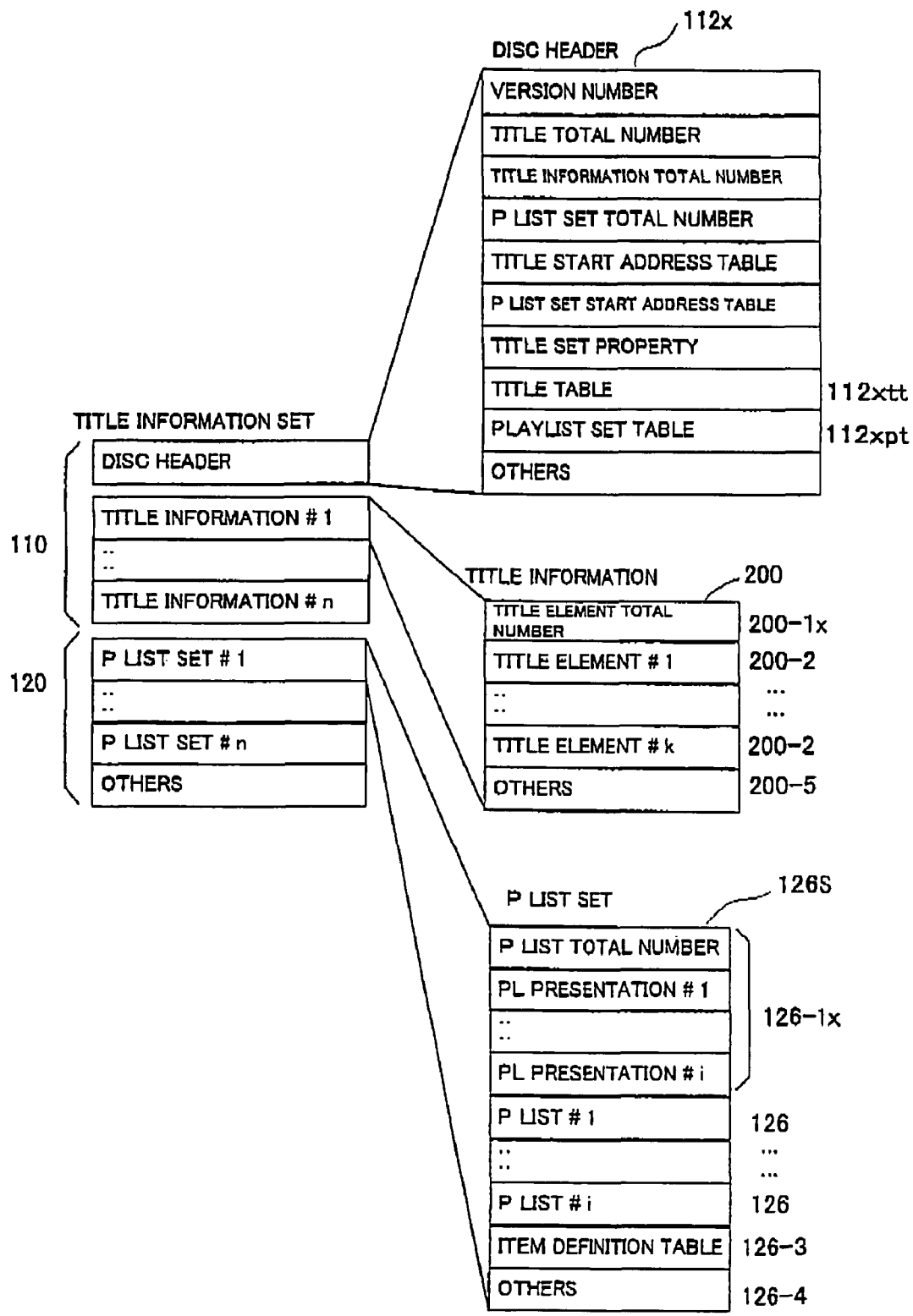
FIG. 30 is a conceptual diagram schematically illustrating a hierarchical structure in a specific example of a title information set in the embodiment.

Firstly, as shown in FIG. 30, a "title information set" associated with this specific example is an information set including the disc information file 110 and the play list information file 120, shown in FIG. 3 and the like.

The title information set is provided with: one disc header 112*x*; a plurality of title information 200 (title information #1, #n); a plurality of play list (P list) sets 126S (P list sets #1, . . . , #n); and other information.

(1-1) Disc Header:

Firstly, from among the title information set shown in FIG. 30, the disc header 112*x* is explained with reference to FIG. 30 and FIG. 31.

In FIG. 30, the disc header 112*x* is shown in a branched form on the upper right of the figure, and has a plurality of fields for various information, such as a version number, the title total number, the title information total number, and the play list (P list) set total number, in order from the top in FIG. 30, as information corresponding to the disc general information 112 shown in FIG. 3. The disc header 112*x* has: a title start address table, as a table for information corresponding to the title pointer 114-1 shown in FIG. 3; and a play list (P list) set start address table, as a table for information corresponding to the play list set pointer 124 shown in FIG. 3. The disc header 112*x* has a field for information which indicates a title set attribute for indicating the attribute of each title set. Moreover, the disc head 112*x* has a title table 112*xtt* and a play list set table 112*xpt*.

As described above, the disc header 112*x* having the plurality of fields and tables is to collectively manage a plurality of titles of the entire recording area on the disc.

Here, the "version number" is a version number in the standard, and according to ISO 646, it is regarded as a code "0070", for example. The "title total number" is the total number of the titles of the entire recording area on the disc, and the "title information total number" is the total number of the title information of the entire recording area on the disc. The "play list set total number" is the total number of the play list sets of the entire recording area on the disc, and the "title start address table" indicates the start address of each title, as a relative byte number from the head of the title set. This byte number is counted from zero, for example. The "play list set start address table" indicates the start address of each play list set, as a relative byte number from the head of the title set. This byte number is counted from zero, for example. The "title set attribute" indicates the attribute of the title set, such as the data length of the title set, the type of language used in the title set (Japanese, English, etc.), and the name of the title set.

Figure 31:
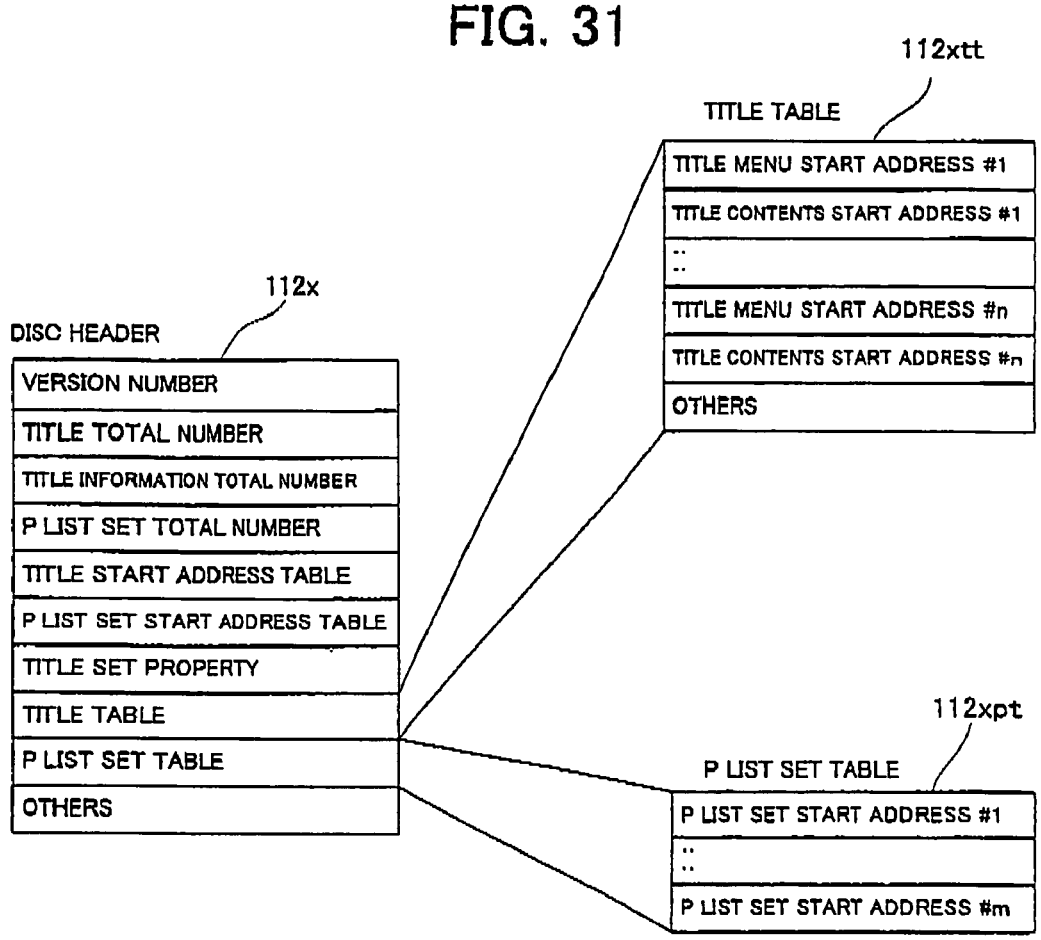
FIG. 31 is a conceptual diagram schematically illustrating a hierarchical structure in a specific example of a disc header in the embodiment.

In FIG. 31, the title table 112*xtt* is shown in a branched form on the upper right of the figure, and has a plurality of fields for recording a plurality of title menu start address information #1 ..., #n, in such a form that they make pairs for each number, in order from the top of the figure.

Here, the "title menu start address" indicates the start address of the title information including each title menu, as a relative byte number from the head of the title set. This byte number is counted from zero, for example. The title menu start address "0" is assigned to the disc menu about the entire disc. The "title contents start address" indicates the start address of the title information including each contents title, as a relative byte number from the head of the title set. Here, the "contents title" is a title for indicating the contents of each title. This byte number is counted from zero, for example. The title contents start address "0" is assigned to a first play title which is unconditionally reproduced at the initial stage of the title reproduction, for example.

In FIG. 31, the play list set table 112xpt is shown in a branched form on the lower right of the figure, and has a plurality of fields for recording a plurality of play list (P list) set start addresses #1, ..., #m.

Here, the "play list set start address" indicates the start address of each play list set, as a relative byte number from the head of the title set. This byte number is counted from zero, for example.

(1-2) Title Information:

Next, from among the title information set shown in FIG. 30, the title information 200 is explained with reference to FIG. 30 and FIG. 32.

In FIG. 30, the title information 200 is shown in a branched form on the center right of the figure, and has a field for recording information 200-1x which indicates the total number of the title elements corresponding to the title general information 200-1 shown in FIG. 4, and further, a plurality of fields for recording the plurality of title elements 200-2 (title elements #1, ..., #k) and the other information 200-5, in order from the top in FIG. 30.

Here, the "title element total number" indicates the total number of the title elements included in the title information.

Figure 32:
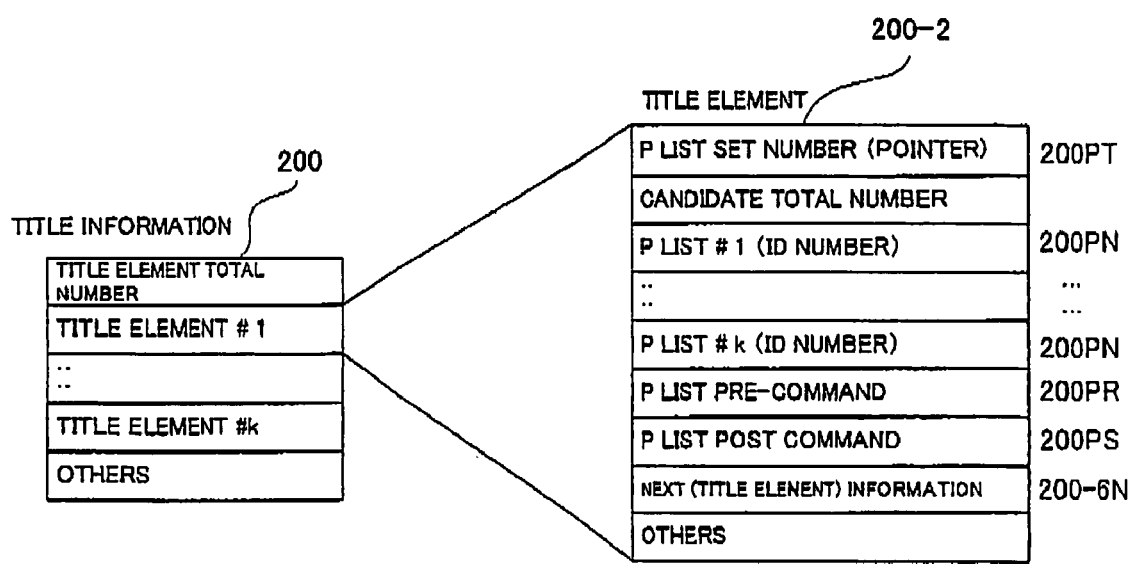
FIG. 32 is a conceptual diagram schematically illustrating a hierarchical structure in a specific example of title information in the embodiment.

In FIG. 32, each title element 200-2 is shown in a branched form on the right of the figure, and has a plurality of fields for recording the pointer 200PT in which a "play list set number" is written, the candidate total number, and P list identification information 200PN in which one or more available play list (P list) numbers (i.e. P lists #1, ..., #k) is written, in order from the top in FIG. 32. Moreover, it has a plurality of fields for recording the P list pre-command 200PR, the P list post command 200PS, the next information 200-6N and the like for indicating the title element to be reproduced next. Incidentally, the other information in the title element 200-2 is information about each title element, such as the title type, for example, a sequential type and a branch type or the like.

Here, the "pointer 200PT in which the play list set number is written" is a pointer for indicating the identification (ID) number of the play list set. The "candidate total number" indicates the total number of the play list which can be a selection candidate of the title element in the play list set specified by the pointer 200PT. The "P list identification information 200PN" indicates the ID (identification) number of one or more play lists which can be the selection candidate. By providing such P list identification information 200PN, it is possible to include the play list which can be the selection candidate for the reproduction of different titles, in one play list set, and it is possible to share the one play list set with different title elements. On the other hand, the "P list pre-command 200PR", the "P list post command 200PS", and the "next information 200-6N", and the like are the same as described above.

(1-3) Play List Set:

Next, from among the title information set shown in FIG. 30, the play list set 126S is explained with reference to FIG. 30 and FIG. 33 to FIG. 36.

In FIG. 30, the play list set 126S is shown in a branched form on the lower right of the figure, and has fields for recording information 126-1 which includes the play list (P list) total number and a plurality of play list (PL) presentations (PL presentations #1, ..., #i), as information corresponding to the play list set general information 126-1 shown in FIG. 5, in order from the top in FIG. 30. Moreover, the play list set 126S has a plurality of fields for recording the plurality of play lists (P lists) 126 (i.e. P lists #1, ..., #i), the item definition table 126-3, and the other information 126-4.

Here, the "play list total number" indicates the total number of the play lists in the play list set. The PL presentations #1, ..., #i are attribute information corresponding to the P lists #1, ..., respectively, and correspond to the attribute information shown in FIG. 20.

Figure 33:
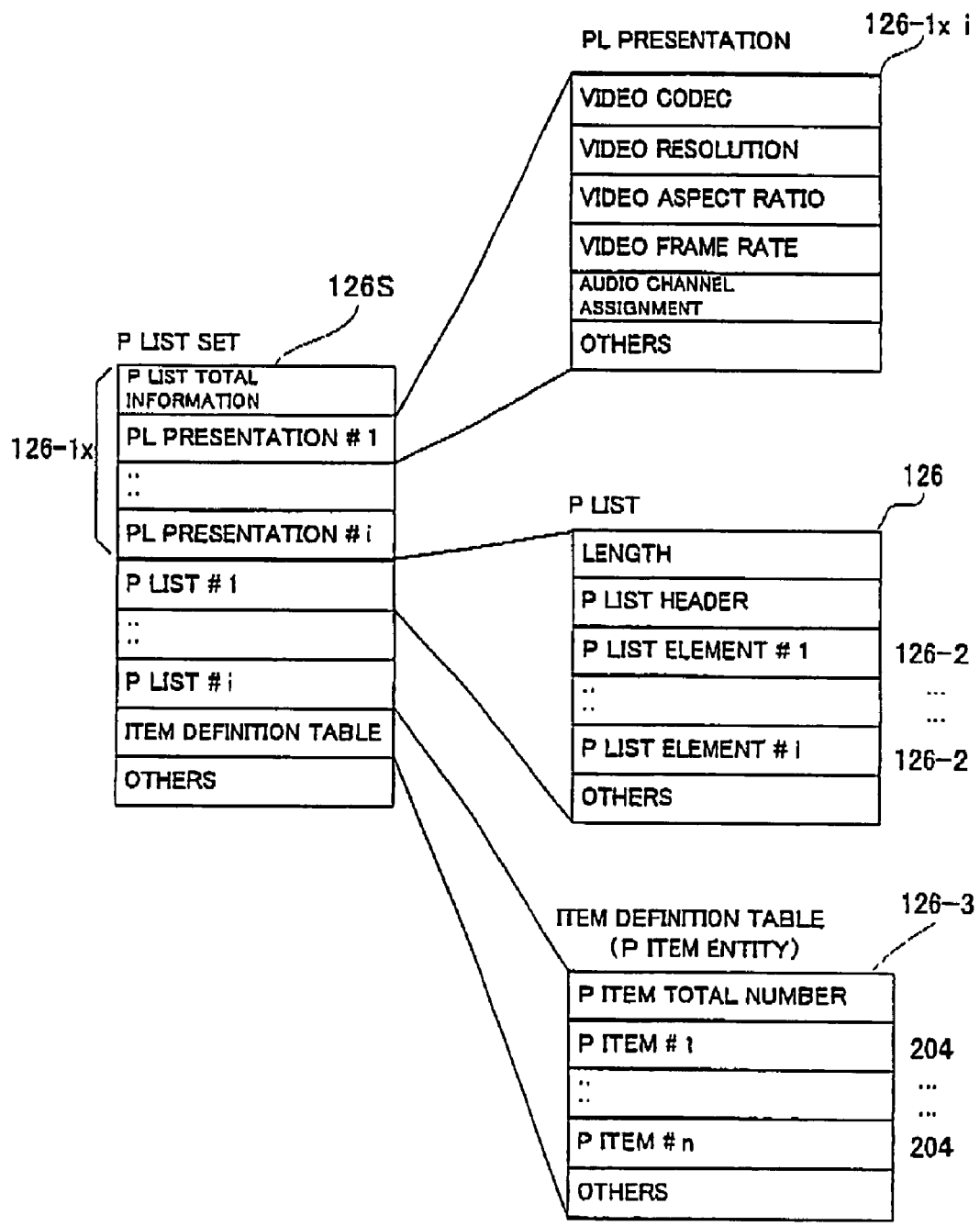
FIG. 33 is a conceptual diagram schematically illustrating a hierarchical structure in a specific example of a play list set in the embodiment.

As shown in FIG. 33, each PL presentation 126-1xi is shown in a branched form on the upper right of the figure, and has a plurality of fields for recording information which indicates a video codec, video resolution, a video aspect ratio, a video frame rate, an audio channel assignment and so on, in order from the top in FIG. 33.

Here, the "video codec" is used in recording the video information associated with the play list set, and thus indicates the type of the video codec to be used in reproducing it. The "video resolution" indicates video resolution used in recording the video information associated with the play list corresponding to the main pass (i.e. the video stream for providing the video) from among the play list set. The "video aspect ratio" indicates a video aspect ratio used in recording the video information associated with the play list corresponding to the main pass from among the play list set. The "video frame rate" indicates a video frame rate used in recording the video information associated with the play list corresponding to the main pass from among the play list set. The "audio channel assignment" indicates the assignment of an audio channel used in recording the audio information associated with the play list corresponding to the main pass from among the play list set.

In FIG. 33, each play list 126 is shown in a branched form on the center right of the figure, and has a plurality of fields for recording information which indicates the data length of the play list 126, a play list header, the plurality of play list elements 126-2 (i.e. P list elements #1, ..., #i) and the like, in order from the top in FIG. 33.

Here, the "length" of the play list indicates the length of the play list continuing to the next, with the byte number. This indicates the length of the data which does not include the field itself. The "play list header" indicates information about the total number of the play list elements included in the play list, the reproduction time length of the play list, the name of the play list, and the like.

Figure 34:
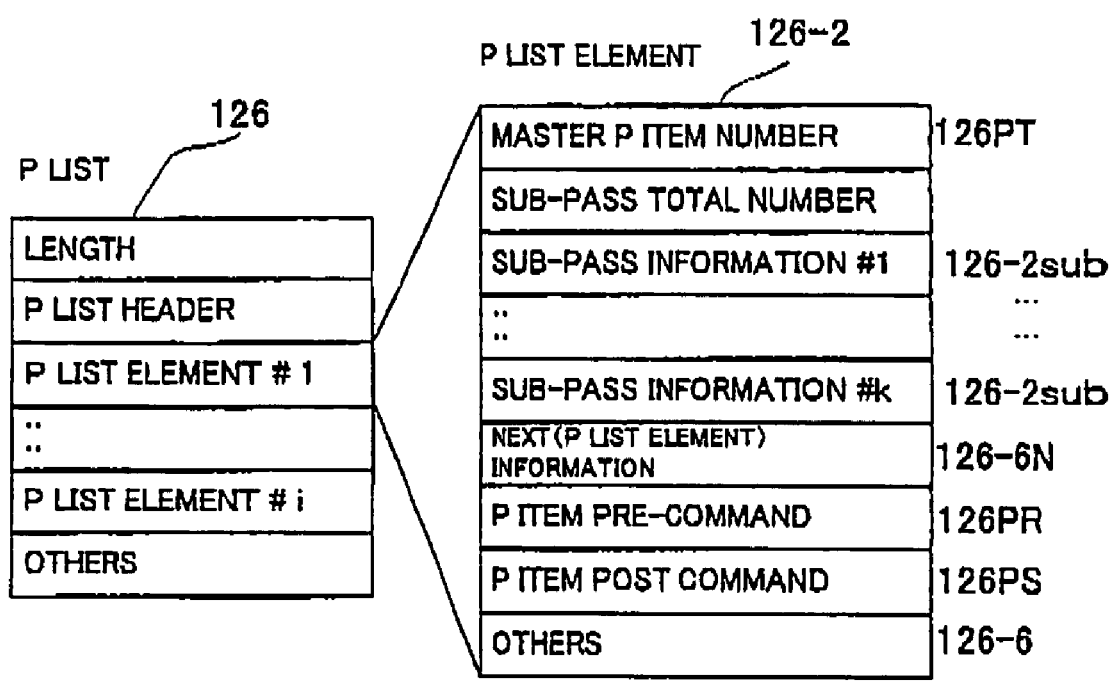
FIG. 34 is a conceptual diagram schematically illustrating a hierarchical structure in a specific example of a play list in the embodiment.

Moreover, in FIG. 34, each play list element 126-2 is shown in a branched form on the right of the figure, and has a plurality of fields for recording the pointer 126PT which indicates the item number of a master play item (master P item), the sub pass total number, a plurality of sub pass information 126-2sub (i.e. sub pass information #1, ..., #k), the next information 126-6N, the pre-command 126PR about the play item (P item), the post command 126PS about the play item (P item), and the other information 126-6, and the like.

Here, the "pointer 126PT", the "pre-command 126PR", and the "post command 126PS" are the same as described above. Moreover, the "sub pass total number" indicates the total number of the sub passes which exist in the play list element. The "next information 126-6N" indicates the play list element to be reproduced next.

Figure 35:
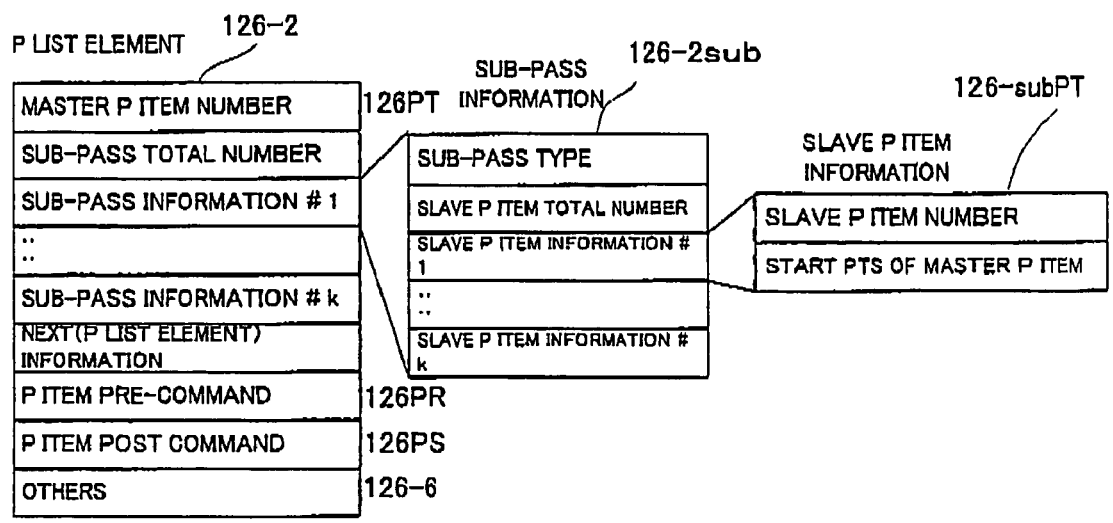
FIG. 35 is a conceptual diagram schematically illustrating a hierarchical structure in a specific example of a play list element in the embodiment.

Moreover, in FIG. 35, each sub pass information 126-2sub is shown in a form branched to the right toward the center, in the figure, and has a plurality of fields for recording a sub pass type, the slave play item (slave P item) total number, and a plurality of slave play item (slave P item) information 126-subPT (i.e. slave P item information #1, . . . , #k), in order from the top in the figure.

Here, the "sub pass type" indicates what type of display is performed by the sub pass, such as various menu display. The "slave P item total number" indicates the total number of slave play items of the sub pass.

Each slave play item (slave P item) information 126-subPT is shown in a form branched toward the right end from the center in the figure, and has a plurality of fields for recording a slave play item (slave P item) number and a start PTS of the master play item (master P item), in order from the top in the figure.

Here, the "slave P item number" indicates the ID (identification) number of the play item of the sub pass. The "start PTS (Presentation Time Stamp) of the master play item" indicates the reproduction time point of the slave item on the reproduction time scale of the master play item.

On the other hand, in FIG. 33, the item definition table 126-3 is shown in a branched form toward the lower right of the figure, and has a plurality of fields for recording the play item (P item) total number, and a plurality of play items (P items) 204 (i.e. P items #1, . . . , #n), and the like, in order from the top in the figure.

Here, the "play item total number" indicates the total number of the items 204 on the item definition table.

Figure 36:
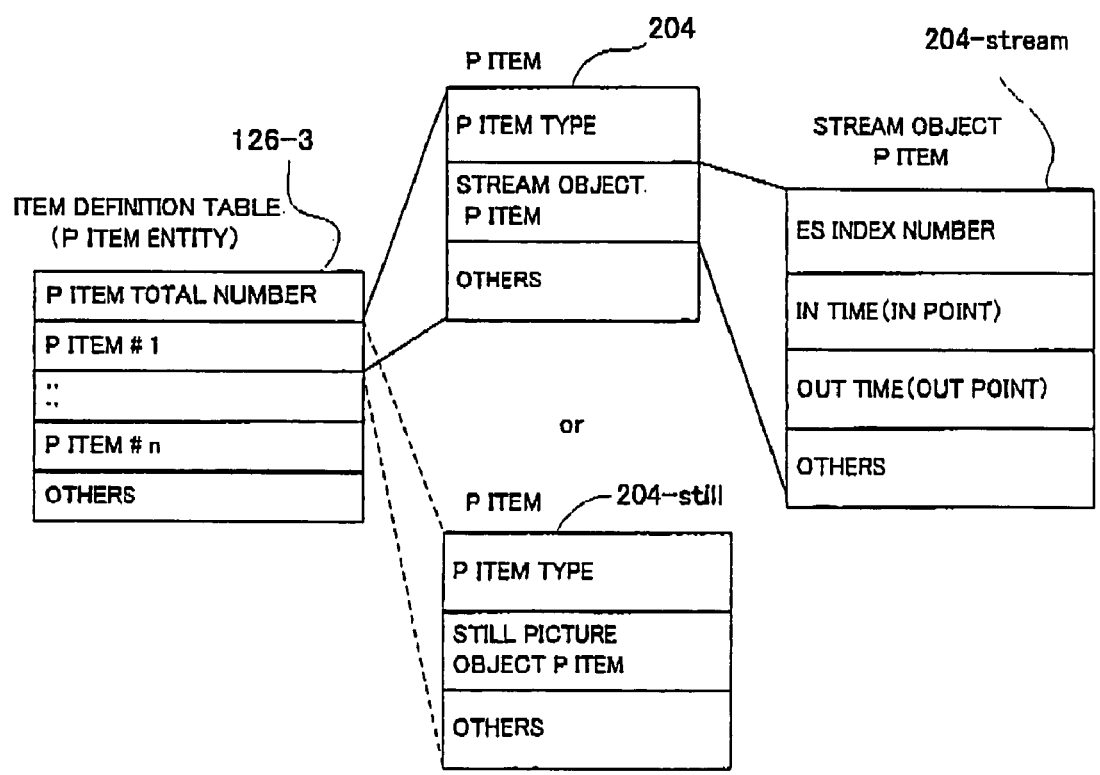
FIG. 36 is a conceptual diagram schematically illustrating a hierarchical structure in a specific example of an item definition table in the embodiment.

In FIG. 36, each item 204 is shown in a branched form to the upper right side toward the center of the figure, and has a plurality of fields for recording a play item (P item) type, a stream object play item (P item) 204-stream, and the like, in order from the top in the figure.

Here, the "play item (P item) type" indicates the type of the play item. For example, in the case of the item for the stream object for the moving picture or video, it is set to a code "00h", and in the case of the item for the stream object for the still picture, it is set to a code "10h". In the case of the item for the object for various menus, it is set to a code "20h".

Moreover, the stream object play item (P item) 204-stream is shown in a form branched to the right end from the center in the figure, and has information for indicating an ES (Elementary Stream) index number, an IN time (IN point), an OUT time (OUT point), and the like, which are related to each play item, in order from the top in the figure.

Here, the "ES index number" indicates the ID (identification) number and the type of the elementary stream to which the IN time and the OUT time are applied. Moreover, the "IN time (IN point)" and the "OUT time (OUT point)" are as descried above, and the reproduction time point and the end time point of the item are written on a time basis of 90 kHz, for example.

Incidentally, in FIG. 36, the item definition table 126-3 may include an item 204-still for the still picture object, in place of such an item 204 for the stream object, i.e. the item 204 for the moving picture or video. In this case, the item 204-still has information for indicating the type of the play item, a still picture object play item (P item), and the like.

Incidentally, the data amount of each of the title information set explained above may be a fixed byte or a variable byte.

Moreover, each field may have a structure in which a required number of each table can be added.

Particularly, in the embodiment, the slave play (P) item information 126-subPT shown in FIG. 35 specifies the slave item for displaying the "Dokodemo menu", which is explained with reference to FIG. 20 to FIG. 28. This slave item, as shown in FIG. 36, corresponds to the Item 204 indicated by the "master P item number" in the play list element 126-2. As a result, the reproduction of the title based on the video stream is executed as the main pass, in accordance with the stream object play item 204-stream (refer to the right end of FIG. 36) which specifies the Item 204. In parallel with this execution, the reproduction of the "Dokodemo menu" is performed as the sub pass, in accordance with the slave item information 126-subPTm (refer to the right end of FIG. 35) which specifies the slave item.

(2) Object Information File:

Next, with reference to FIG. 37, the object information file 130 when the object data for the "Dokodemo menu" is multiplexed and recorded as the sub picture stream together with the video stream constituting the video or the like, will be explained in detail by using one specific example. FIG. 37 schematically shows one specific example of the data structures of the AU (Associate Unit) table 131 (refer to FIG. 3) constructed in the object information file 130 and the ES (Elementary Stream) map table 134 (refer to FIG. 3) related to the AU table 134.

In this specific example, as shown in FIG. 37, the object information table is stored in the object information file 130. The object information table is provided with the AU table 131 shown in the upper part of FIG. 37 and the ES map table 134 shown in the lower part.

In the upper part of FIG. 37, the AU table 131 may have a structure that allows the required number of tables for each Field to be added. For example, if there are four AUs, it may have such a structure that the number of the Fields increases to four.

In the AU table 131, there are stored "AU table general information" in which the number of AUs and the pointer to each AU, and the like are written, and "the other information."

The AU table 131 describes therein the Index number (Index number= . . . ) of the corresponding ES map table 134, as the AU information 132I which indicates an ES table Index #m in each PU #m corresponding to each AU #n. Here, the "AU" is a unit corresponding to a "show" in TV broadcast, for example, as mentioned above (especially, in the case of "multi-vision" broadcasting, it is a unit of a group of a plurality of "visions" which is changeable or selectable), and it includes one or more PUs, each of which is a reproduction unit. Moreover, the "PU" is a group of mutually changeable elementary streams which are included in each AU, as described above, and the ES table Index #m corresponding to each PU is specified by the PU information 302I. For example, if multi-view contents are provided with the AU, the AU stores therein a plurality of PUs, and each PU stores therein the pointers to a plurality of elementary stream packet IDs which indicates the packets constituting the contents of each view. This indicates the Index number in the ES map table 134, as described later.

In the lower part of FIG. 37, in the ES map table 134, there are stored ES map table general information, a plurality of Indexes #m (m=1, 2, . . . ), and the "other information", for each Field.

The "ES map table general information" describes therein the size of the ES map table, the total number of Indexes, and the like.

The "Index #m" includes the elementary stream packet ID (ES_PID) of the entire elementary stream to be used for the reproduction, the corresponding Index number, and the address information of the elementary stream.

In the embodiment, for example, if the elementary stream is the video stream of the MPEG 2 as described above, only the TS packet number of the TS packet at the head of the I picture, and the corresponding display time length are written, as the address information, i.e. the ES address information 134d, on the ES map table 134, by which the data amount is tried to be reduced. On the other hand, with respect to the ES address information 134d of the sub picture stream, the data amount is further tried to be reduced by writing index number information 134e of the elementary stream of the SP data to which the SP control information is operated.

Because of the construction as described above, it is possible to obtain the elementary stream packet ID (ES_PID) of the actual elementary stream, from the Index number of the ES map 134 specified from the AU table 131. Moreover, since the address information of the elementary stream corresponding to the elementary stream packet ID can be obtained at the same time, it is possible to reproduce the object data on the basis of these information.

According to the data structure of the optical disc 100 explained above, even in adding a new title to the optical disc 100, necessary information can be easily added, which is useful. On the other hand, even if some information becomes unnecessary as a result of editing or the like, for example, what is to be done is simply not to refer to the information, and it is not necessary to actually delete the information from the table, which is useful, as well.

Incidentally, in FIG. 37, even the ES_PID that is not referred to from the AU table 131 in the upper part is described in each Index of the ES map table 134 in the lower part; however, it is not necessary to describe the ES_PID that is not referred to, in this manner. However, if the more versatile ES map table 134 is prepared in advance by describing the ES_PID that is not referred to in this manner, it is not necessary to reconstruct the ES map table, in reediting the content, such as trying the authoring operation again, which is advantageous.

Now, an explanation is given, regarding the reproduction order of various files or the like, in the reproduction of the optical disc 100 having such a data structure as the one specific example, explained with reference to FIG. 30 to FIG. 37.

Firstly, the disc header 112x is reproduced out of the title information set shown in FIG. 30. As a part of that, the title table 112xtt shown in FIG. 31 is reproduced, and from it, the title menu start address or title contents start address is obtained.

Next, in accordance with the obtained address information, the reproduction of the title information 200 shown in FIG. 30 is started. More specifically, the reproduction of the title element 200-2 shown in FIG. 32 is performed, to thereby obtain the play list set number. Moreover, the pointer 200PT to the play lists #1 to #k is obtained. Incidentally, by adopting such a construction that the play list 126 is specified by the pointer 200PT, it is possible to share, among the plurality of titles, the plurality of play lists which is in the play list set specified by the reproduction of the title element 200-2 in advance.

Next, the play list set table 112xpt shown in FIG. 31 is reproduced, to thereby obtain the play list set start address. On the basis of this, the reproduction of the play list set 126S shown in FIG. 33 is started, and the PL presentation 126-1xi is firstly reproduced.

Then, the PL presentation 126-1xi, one example of the required function information, is compared with the reproduction function (i.e. video performance, audio performance, and the like) of the information reproduction system during the reproduction of the optical disc 100, and thus, one optimum play list 126 is selected from the play list set 126S shown in FIG. 33.

Next, the selected play list 126 is reproduced. More specifically, the play list element 126-2 shown in FIG. 34 is reproduced. At this time, firstly, the pre command 126PR is executed, then, the master P item number shown in FIG. 35 is obtained. Then, the Item definition table shown in FIG. 36 is referred to, to thereby reproduce the relevant Item 204. The reproduction of this Item 204 is performed by reproducing the relevant TS object in accordance with the ES index number, the IN time, and the OUT time, which are obtained by reproducing the stream object P item 204-stream (see FIG. 37). Then, the post command 126PS shown in FIG. 34 is executed. Moreover, the play list element to be reproduced next is specified in accordance with the next information 126-6N, and its reproduction is repeated in the same manner.

Next, with reference to FIG. 38, one specific example of the object information file 130 when the object data for the "Dokodemo menu" is recorded as another object different from the video stream constituting the video or the like, will be explained. FIG. 38 schematically shows one specific example of the data structures of the AU (Associate Unite) table 131 (refer to FIG. 3) constructed in the object information file 130 and the ES map table 134 related to the AU table. In the embodiment, the video stream constituting the video or the like is recorded as an object #1 (TS object), and the object data for the "Dokodemo menu" is recorded as an object #2.

The Item information and the slave item information further have information for indicating the relevant object number in the object information file 130. The relevant object is specified from the relevant object number, the relevant AU number, and the like, and is reproduced by the above-described reproduction sequence (refer to FIG. 27 and FIG. 28). The object data for the "Dokodemo menu" which is not multiplexed nor recorded is maintained (or cached) in the memory 550 in reading.

Particularly in the embodiment, in parallel with the reproduction of the stream object P item 204-stream, shown in FIG. 36, for the main pass, the corresponding slave play (P) item information 126-subPT, shown in FIG. 35, is also reproduced for the sub pass. Then, in accordance with the IN time and the OUT time on the time axis, which are obtained by reproducing the master play (P) item information 126-2, or by using them as the displayable time length, the relevant TS object data for the "Dokodemo menu" is reproduced as the sub pass. By these, the "Dokodemo menu", explained with reference to FIG. 20 to FIG. 28, is reproduced as the sub pass.

As explained in detail with reference to FIG. 1 to FIG. 38, according to the embodiment, during the reproduction, display and output of the title by the Item, for example, the menu is reproduced by the corresponding slave item, and the reproduced menu is displayed and outputted selectively, by which it is possible to efficiently display the menu screen, such as the small window and the semitransparent superimpose display, with the title reproduction being continued.

Incidentally, in the aforementioned embodiment, the explanation is made on the optical disc 100 as an example of the information record medium and the recorder or player of the optical disc 100 as an example of the information record reproduction apparatus. Nevertheless, the present invention is not limited to the optical disc and the player or recorder thereof, but is applicable to various record media and the recorders or players thereof, supporting other high density recording or high transfer rate.

Figure 39:
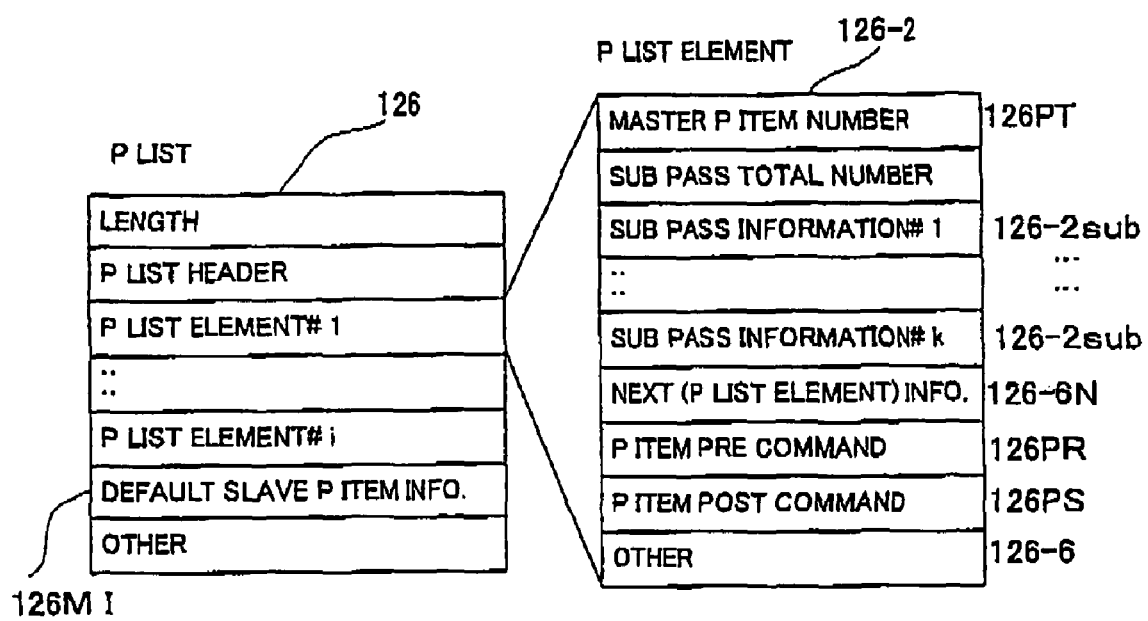
FIG. 39 is a conceptual diagram schematically showing a hierarchy structure in a modified example of the play list.

For example, as shown in FIG. 39, the play (P) list may be provided with default slave P item information 126MI comprising the slave P item number and the start PTS of the master P item, and the default slave P item information 126MI may be shared when there is no sub pass information in each P list element.

Moreover, the TS packet for the "Dokodemo menu" may be multiplexed and recorded in one TS object, together with the TS packet of the contents, or may be recorded in another TS object different from the object for the contents.

The present invention is not limited to the above-described embodiments, and various changes may be made, if desired, without departing from the essence or spirit of the invention which can be read from the claims and the entire specification. An information record medium, an apparatus for and a method of recording the information, an apparatus for and a method of reproducing the information, an apparatus for and a method of recording and reproducing the information, a computer program for controlling the record or the reproduction, and a data structure including a control signal, all of which involves such changes, are also intended to be within the technical scope of the present invention.

INDUSTRIAL APPLICABILITY

An information record medium, a apparatus for and a method of recording the information, an apparatus for and a method of reproducing the information, an apparatus for and a method of recording and reproducing the information, a computer program for controlling the record or the reproduction, and a data structure including a control signal, all of which are according to the present invention, can be applied to a high-density optical disc for consumer or industrial use, such as a DVD, on which various information, such as the video information, the audio information and the sub-picture information, can be recorded at high density and further can be applied to a DVD player, a DVD recorder, and the like. Moreover, they can be applied to an information record medium, an information record reproduction apparatus, or the like, which are mounted on or can be connected to various computer equipment for consumer or industrial use, for example.

We claim:

1. A non-transitory information record medium on which there are recorded:
   a series of content information which is constructed from at least one elementary stream and which is stored as a plurality of packets, each of the plurality of packets stores a fragment of the elementary stream;
   play list information for defining reproduction sequence of the content information by a unit of item, wherein the item constitutes the content information and is accessible upon reproducing; and
   object information for indicating a relationship between packets and the elementary stream of the content information,
   the play list information including: item information for specifying each item which constitutes the content information by indicating both of a reproduction start time and a reproduction end time of the item and for specifying one portion of the object information for the content information,
   the object information further including an address of the content information which is specified by the item information,
   each of the content information, the play list information and the object information being recorded into a different area, respectively,
   wherein
   there are recorded on the non-transitory information record medium: menu information, (i) which is constructed from at least one elementary stream, (ii) which is stored in the plurality of packets, each of the plurality of packets stores a fragment of the elementary stream, for displaying at least one menu-button, (iii) which includes information for indicating a coordinate of the menu-button which is displayed on a display-screen, (iv) which includes command information for indicating a command to be executed if the menu-button is executed, (v) which is recorded into same area as the content information is recorded, and (vi) which is superimposed on a display of the content information during a reproduction of the content information,
   the play list information further includes: slave item information for specifying other portion of the object information for the menu information as a slave item,
   the item information further includes information which indicates an identification information of the slave item information, and
   the object information further indicates a relationship between packets and the elementary stream of the menu information, and further includes an address of the menu information which is specified by the slave item information,
   the content information and the menu information is recorded such that the reproduction of the content information which is reproduced before the display of the menu information is kept, by controlling the content information and the menu information independently and separately, during the menu information is superimposed on the display of the content information.

2. An information reproduction apparatus for reproducing the non-transitory information record medium according to claim 1,
   the information reproduction apparatus comprising:
   a reproduction device capable of reproducing the content information, the menu information, the play list information and the object information;
   a displaying and outputting device capable of displaying and outputting the content information and the menu information; and
   a control device for controlling the reproduction device to reproduce the content information and the menu information, in accordance with the item information and the slave item information included in the play list information and the object information reproduced by the reproducing device.

3. A non-transitory computer-readable medium recording thereon a computer program for a reproduction control to control a computer disposed at the information reproduction apparatus according to claim 2,
   the program making the computer function as the reproduction device, the displaying and outputting device and the control device.

4. An information reproduction method of reproducing the non-transitory information record medium according to claim 1 on an information reproduction apparatus comprising: (i) a reproduction device capable of reproducing the content information, the menu information, the play list information and the object information; and (ii) a displaying and outputting device capable of displaying and outputting the content information and the menu information,
   the information reproduction method comprising:
   a first control process of controlling the reproducing device to reproduce the play list information and the object information; and
   a second control process of controlling the reproducing device to reproduce the content information and the menu information, in accordance with the item information and the slave item information included in the play list information and the object information reproduced by the reproducing device.

5. An information record apparatus, comprising:

a first record device for recording a series of content information which is constructed from at least one elementary stream and which is stored as a plurality of packets, each of the plurality of packets stores a fragment of the elementary stream;

a second record device for recording play list information for defining reproduction sequence of the content information by a unit of item, wherein the item constitutes the content information and is accessible upon reproducing; and a third record device for recording object information for indicating a relationship between packets and the elementary stream of the content information, the play list information including: item information for specifying each item which constitutes the content information by indicating both of a reproduction start time and a reproduction end time of the item and for specifying one portion of the object information for the content information, the object information further including an address of the content information which is specified by the item information, each of the content information, the play list information and the object information being recorded into a different area, respectively, wherein the first record device further records menu information, (i) which is constructed from at least one elementary stream, (ii) which is stored in the plurality of packets, each of the plurality of packets stores a fragment of the elementary stream, for displaying at least one menu-button, (iii) which includes information for indicating a coordinate of the menu-button which is displayed on a display-screen, (iv) which includes command information for indicating a command to be executed if the menu-button is executed, (v) which is recorded into same area as the content information is recorded, and (vi) which is superimposed on a display of the content information during a reproduction of the content information, the play list information further includes: slave item information for specifying other portion of the object information for the menu information as a slave item, the item information further includes information which indicates an identification information of the slave item information, and the object information further indicates a relationship between packets and the elementary stream of the menu information, and further includes an address of the menu information which is specified by the slave item information, the first record device records the content information and the menu information such that the reproduction of the content information which is reproduced before the display of the menu information is kept, by controlling the content information and the menu information independently and separately, during the menu information is superimposed on the display of the content information.

6. A non-transitory computer-readable medium recording thereon a computer program for a record control to control a computer disposed at the information record apparatus according to claim 5, the program making the computer function as the first record device, the second record device and the third record device.

7. An information record method, comprising:

a first record process of recording a series of content information which is constructed from at least one elementary stream and which is stored as a plurality of packets, each of the plurality of packets stores a fragment of the elementary stream;

a second record process of recording play list information for defining reproduction sequence of the content information by a unit of item, wherein the item constitutes the content information and is accessible upon reproducing; and a third record process of recording object information for indicating a relationship between packets and the elementary stream of the content information, the play list information including: item information for specifying each item which constitutes the content information by indicating both of a reproduction start time and a reproduction end time of the item and for specifying one portion of the object information for the content information, the object information further including an address of the content information which is specified by the item information, each of the content information, the play list information and the object information being recorded into a different area, respectively, wherein the first record process further records menu information, (i) which is constructed from at least one elementary stream, (ii) which is stored in the plurality of packets, each of the plurality of packets stores a fragment of the elementary stream, for displaying at least one menu-button, (iii) which includes information for indicating a coordinate of the menu-button which is displayed on a display-screen, (iv) which includes command information for indicating a command to be executed if the menu-button is executed, (v) which is recorded into same area as the content information is recorded, and (vi) which is superimposed on a display of the content information during a reproduction of the content information, the play list information further includes: slave item information for specifying other portion of the object information for the menu information as a slave item, the item information further includes information which indicates an identification information of the slave item information, and the object information further indicates a relationship between packets and the elementary stream of the menu information, and further includes an address of the menu information which is specified by the slave item information, the first record process records the content information and the menu information such that the reproduction of the content information which is reproduced before the display of the menu information is kept, by controlling the content information and the menu information independently and separately, during the menu information is superimposed on the display of the content information.

* * * * *